(12) United States Patent
Inoue et al.

(10) Patent No.: US 7,133,839 B2
(45) Date of Patent: Nov. 7, 2006

(54) METHOD, SYSTEM AND MEDIUM FOR SHARING AN IMAGE OF A VIRTUAL TRY-ON SCENE

(75) Inventors: Norio Inoue, Yokohama (JP); Katzumi Hayashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 10/359,676

(22) Filed: Feb. 7, 2003

(65) Prior Publication Data

US 2004/0044589 A1 Mar. 4, 2004

(30) Foreign Application Priority Data

Aug. 29, 2002 (JP) .............................. 2002-250203

(51) Int. Cl.
G06F 17/30 (2006.01)
G06Q 30/00 (2006.01)
(52) U.S. Cl. .......................................... 705/27; 705/26
(58) Field of Classification Search ................ 705/26, 705/27; 345/441, 663; 342/441, 663; 382/311
See application file for complete search history.

(56) References Cited

U.S. PATENT DOCUMENTS

| | | | |
|---|---|---|---|
| 5,383,111 A | | 1/1995 | Homma et al. |
| 6,310,627 B1 * | | 10/2001 | Sakaguchi ................... 345/630 |
| 6,901,379 B1 * | | 5/2005 | Balter et al. .................... 705/27 |
| 2001/0023413 A1 | | 9/2001 | Fukuma et al. |
| 2001/0026272 A1 * | | 10/2001 | Feld et al. .................... 345/419 |
| 2002/0024517 A1 | | 2/2002 | Yamaguchi et al. |
| 2002/0107758 A1 * | | 8/2002 | Takakura et al. .............. 705/26 |
| 2002/0156703 A1 * | | 10/2002 | Abekawa ....................... 705/27 |
| 2004/0148228 A1 * | | 7/2004 | Kwei ........................... 705/26 |
| 2005/0027612 A1 * | | 2/2005 | Walker et al. ................. 705/26 |

FOREIGN PATENT DOCUMENTS

JP 11-001813 1/1999

(Continued)

OTHER PUBLICATIONS

Burch, Audra D.S., "Try On Virtual Clothes In Mall With Fashion Trip Software," The Sun, Baltimore, MD, Nov. 2, 1998, p. 4.C.*

(Continued)

*Primary Examiner*—Jeffrey A. Smith
*Assistant Examiner*—Amee A. Shah
(74) *Attorney, Agent, or Firm*—Staas & Halsey LLP

(57) ABSTRACT

A state close to real shopping by plural persons is realized in on-line shopping as well. This invention includes if a registration request of a first user enabling browsing of an image of a virtual try-on scene is received, registering information concerning the first user, and if a browsing request of the image of the virtual try-on scene is received from a terminal of the first user registered as being capable of browsing the image of the virtual try-on scene, creating the image of the virtual try-on scene on the basis of at least one of the information concerning the registered first user and information concerning a specific person appearing on the virtual try-on scene and transmitting it to the terminal of the first user. By this, a user who attempts to perform virtual try-on can set and register the first user who can simultaneously or asynchronously browse the image of the virtual try-on scene on which the former user himself/herself, or another user, or the former user himself/herself and the other user appear. That is, it becomes possible for plural persons to share the virtual try-on scene.

5 Claims, 53 Drawing Sheets

FOREIGN PATENT DOCUMENTS

| | | |
|---|---|---|
| JP | 11-086142 | 3/1999 |
| JP | 11-265243 | 9/1999 |
| JP | 2001-022831 | 1/2001 |
| JP | 2001-160095 | 6/2001 |
| JP | 2001-216429 | 8/2001 |
| JP | 2001-229271 | 8/2001 |
| JP | 2001-249993 | 9/2001 |
| JP | 2001-273423 | 10/2001 |
| JP | 2001-283085 | 10/2001 |
| JP | 2001-319108 | 11/2001 |
| JP | 2001319108 A * | 11/2001 |
| JP | 2001-344474 | 12/2001 |
| JP | 2001-344482 | 12/2001 |
| JP | 2002-024640 | 1/2002 |
| JP | 2002-032589 | 1/2002 |
| JP | 2002-032640 | 1/2002 |
| JP | 2002-099840 | 4/2002 |
| JP | 2002-183525 | 6/2002 |
| JP | 2002-197320 | 7/2002 |
| KR | 2001025741 A * | 4/2001 |

OTHER PUBLICATIONS

Mai, Neo and Neo, Ken, "Virtual Closets, Virtual Makeovers," Computimes Malaysia, New York, NY, Mar. 22, 2001, p. 1.*

Authors unknown, "Fashion Trip Unveiled; ModaCAD Launches Revolutionary E-Business Product," Business Wire, New York, Aug. 18, 1999, p. 1.*

Nobutatsu Nakamura et al., "An Internet 3-D Multi-User System: Ladakh", The Information and Systems Society, The Institute of Electronics, Information and Communication Engineers, vol. J81-D-II, No. 5, pp. 982-991 (May 25, 1998).

Toshihiro Matsumoto et al., "A Web Shopping Site on 3-D Shared Virtual Environment "Palm Plaza"", Proceedings of the Institute of Electronics, Information and Communication Engineers, p. 360 (Mar. 7, 2001).

Toshihiro Matsumoto et al., "Assessment of the Web 3D System Palm Plaza for Electric Commerce", Proceedings of The 2001 Engineering Sciences Society Conference of IEICE, Proceedings of Basic and Boundary Society Conference, The Institute of Electronics, Information and Communication Engineers, p. 211 (Aug. 29, 2001).

"Try-on At Will", Monthly Computer Digest, TAC project Inc., vol. 27, No. 6, p. 94, (Jun. 10, 2001).

Japanese Office Action dated May 16, 2006.

Notification of final rejection issued from Japanese Patent Office on Aug. 15, 2006.

* cited by examiner

| USER ID | NAME | BIRTH DATE | ZIP CODE | ADDRESS | TEL. NO. | HEIGHT | BUST | WAIST | HIP | IMAGE DATA |
|---|---|---|---|---|---|---|---|---|---|---|
| 0x0001 | AKEMI INOUE | 19****** | 650-**** | KOBE-SHI… | 078-242-**** | 157 | ** | ** | ** | 0x0001.*** |
| 0x0002 | KAZUMI INOUE | 19****** | 650-**** | KOBE-SHI… | 078-242-**** | 160 | ** | ** | ** | 0x0002.*** |
| 0x0003 | NORIKA INOUE | 19****** | 650-**** | KOBE-SHI… | 078-242-**** | 125 | ** | ** | ** | 0x0003.*** |
| 0x0004 | NORIO INOUE | 19****** | 650-**** | KOBE-SHI… | 078-242-**** | 170 | ** | ** | ** | 0x0004.*** |
| 0x0005 | YUKIE NAKAMURA | 19****** | 211-**** | KAWASAKI-SHI… | 044-754-**** | 155 | ** | ** | ** | 0x0005.*** |
| 0x0006 | MAKIKO TANAKA | 19**** | *-** | SHINAGAWA-KU… | 03-- | 157 |  |  |  | 0x0006.*** |
| 0x0007 | KIYOMI TSUJIMOTO | 19**** | *-** | SAKAI-SHI… | 06-- | 160 |  |  |  | 0x0007.*** |
| 0x0008 | CHIKAGE OGI | 19**** | *-** | MINATO-KU… | 03-- | 148 |  |  |  | 0x0008.*** |
| 0x0009 | JUNICHIRO KOIZUMI | 19****** | *-** | YOKOSUKA-SHI… | 04**--** | 175 | ** | ** | ** | 0x0009.*** |
| 0x0010 | YASUO FUKUDA | 19**** | *-** | BUNKYO-KU… | 03-- | 165 |  |  |  | 0x0010.*** |
| 0x0011 | YOSHIRO MORI | 19**** | *-** | ITABASHI-KU… | 03-- | 180 |  |  |  | 0x0011.*** |
| 0x0012 | MUNEO SUZUKI | 19**** | *-**** | NEMURO-SHI… | 01*-*- | 162 |  |  |  | 0x0012.*** |
| 0x0013 | TAKAKO DOI | 19**** | *-**** | FUNABASHI-SHI… | 047*-- | 170 |  |  |  | 0x0013.*** |
| 0x0014 | NAOTO KAN | 19****** | *-** | YOKOHAMA-SHI… | 045-*-** | 168 | ** | ** | ** | 0x0014.*** |
| 0x0015 | YUKIO HATOYAMA | 19****** | *-** | ZUSHI-SHI… | 04**--** | 162 | ** | ** | ** | 0x0015.*** |

| BASKET ID 400 | NAME 402 | CREATOR ID 404 | CREATION DATE 406 | EXPIRATION DATE 408 | SCREEN URL(DIRECTORY) 410 | INDIVIDUAL /GROUP 412 | NO. OF USER ENTRIES 414 |
|---|---|---|---|---|---|---|---|
| 0x00000AA | AKEMI INOUE | 0x0001 | 20020401 | 20030331 | /~0x0001/Akemiinoue/ | INDIVIDUAL | 1 |
| 0x00000AB | FAMILY GROUP | 0x0001 | 20020410 | 20030409 | /~0x0001/group-kazoku/ | GROUP | 3 |
| 0x00000AC | PARTY OF CLOSE FOUR FRIENDS | 0x0001 | 20020410 | 20030409 | /~0x0001/group-4nin/ | GROUP | 4 |
| 0x00000AD | FRIENDS IN COMPANY | 0x0001 | 20020410 | 20030409 | /~0x0001/group-kaisya/ | GROUP | 3 |
| 0x00000AE | KAZUMI INOUE | 0x0002 | 20020411 | 20030410 | /~0x0002/Kazumiinoue/ | INDIVIDUAL | 1 |
| 0x00000AF | NORIKA INOUE | 0x0003 | 20020411 | 20030410 | /~0x0003/Norikainoue/ | INDIVIDUAL | 1 |
| 0x00000B0 | PARTY OF CLOSE TWO FRIENDS | 0x0002 | 20020411 | 20030410 | /~0x0002/group-2nin/ | GROUP | 2 |
| 0x00000B1 | NORIO INOUE | 0x0004 | 20020412 | 20030411 | /~0x0004/Norioinoue/ | INDIVIDUAL | 1 |
| 0x00000B2 | YUKIE NAKAMURA | 0x0005 | 20020413 | 20030412 | /~0x0005/Sachienakamura/ | INDIVIDUAL | 1 |
| 0x00000B3 | TEST | 0x0004 | 20020702 | 20030701 | /~0x0004/group-test/ | GROUP | 2 |
| 0x00000B4 | PARTY OF CLOSE THREE FRIENDS | 0x0005 | 20020702 | 20030701 | /~0x0005/group-3nin/ | GROUP | 3 |
| 0x00000B5 | TEST 2 | 0x0004 | 20020703 | 20030702 | /~0x0004/group-test2/ | GROUP | 2 |

| BASKET ID 500 | USER ID 502 | USER NAME 504 | E-MAIL ADDRESS 506 | ENTRY CREATION DATE 508 | SHARING CONDITION 510 | NO. OF TRY-ON ENTRIES 512 |
|---|---|---|---|---|---|---|
| 0x00000AB | 0x0001 | AKEMI INOUE | akemi@**.com | 20020410 | 11111 | 3 |
| 0x00000AB | 0x0002 | KAZUMI INOUE | kazumi@**.com | 20020411 | 12221 | 1 |
| 0x00000AB | 0x0003 | NORIKA INOUE | norika@**.com | 20020412 | 11110 | 0 |
| 0x00000AC | 0x0001 | AKEMI INOUE | akemi@**.com | 20020410 | 11111 | 3 |
| 0x00000AC | 0x0006 | MAKIKO TANAKA | makiko@**.co.jp | 20020411 | 11111 | 2 |
| 0x00000AC | 0x0007 | KIYOMI TSUJIMOTO | kiyomi@**.ne.jp | 20020412 | 11111 | 2 |
| 0x00000AC | 0x0008 | CHIKAGE OGI | chikage@**.co.jp | 20020413 | 11111 | 1 |
| 0x00000AD | 0x0001 | AKEMI INOUE | akemi@**.com | 20020410 | 11111 | 3 |
| 0x00000AD | 0x0009 | JUNICHIRO KOIZUMI | jun@**.ne.jp | 20020411 | 22221 | 3 |
| 0x00000AD | 0x0010 | YASUO FUKUDA | yas@**.com | 20020412 | 13331 | 1 |
| 0x00000B0 | 0x0002 | KAZUMI INOUE | kazumi@**.com | 20020411 | 12221 | 2 |
| 0x00000B0 | 0x0011 | YOSHIRO MORI | mori@**.co.jp | 20020412 | 11111 | 2 |
| 0x00000B3 | 0x0004 | NORIO INOUE | norio@**.co.jp | 20020702 | 12301 | 2 |
| 0x00000B3 | 0x0012 | MUNEO SUZUKI | mune@**.ne.jp | 20020703 | 11111 | 1 |
| 0x00000B4 | 0x0005 | YUKIE NAKAMURA | sachi@**.co.jp | 20020702 | 12201 | 3 |
| 0x00000B4 | 0x0013 | TAKAKO DOI | doi@***.ne.jp | 20020703 | 11111 | 2 |
| 0x00000B4 | 0x0014 | NAOTO KAN | can@**.com | 20020704 | 11111 | 1 |
| 0x00000B5 | 0x0004 | NORIO INOUE | norio@**.co.jp | 20020703 | 12301 | 2 |
| 0x00000B5 | 0x0015 | YUKIO HATOYAMA | yukio@**.com | 20020704 | 11111 | 1 |

FIG.5

| BASKET ID | ITEM NO. | USER ID | TRY-ON PART | COMMODITY INFO. | SHOPPING SITE CODE | COMMODITY CODE | COMMODITY TYPE | IMAGE DATA | PURCHASE STATUS |
| --- | --- | --- | --- | --- | --- | --- | --- | --- | --- |
| 0x00000AA | 0001 | 0x0001 | UPPER BODY | SHIRT | JP0016 | SH01 | GN-09 | SH01GN09.gif | BEING TRIED ON |
| 0x00000AA | 0002 | 0x0001 | LOWER BODY | SKIRT | FR0032 | 0012 | RD07 | 0012RD07.gif | BEING TRIED ON |
| 0x00000AA | 0003 | 0x0001 | FOOT | SHOES | BR0001 | 15993 | BK36 | 15993BK36.gif | BEING TRIED ON |
| 0x00000AB | 0001 | 0x0001 | UPPER BODY | SHIRT | IT0015 | S435 | YW09 | S435YW09.gif | BEING TRIED ON |
| 0x00000AB | 0002 | 0x0001 | LOWER BODY | SKIRT | FR0032 | 0012 | RD07 | 0012RD07.gif | BEING TRIED ON |
| 0x00000AB | 0003 | 0x0001 | FOOT | SHOES | BR0001 | 15993 | BK36 | 15993BK36.gif | BEING TRIED ON |
| 0x00000AB | 0004 | 0x0002 | UPPER BODY | T-SHIRT | KR0004 | TT099 | W-CM | TT099WCM.gif | BEING TRIED ON |
| 0x00000AC | 0001 | 0x0001 | UPPER BODY | T-SHIRT | GM0002 | T5678 | YW-M | T5678YWM.gif | ALREADY PURCHASED |
| 0x00000AC | 0002 | 0x0001 | LOWER BODY | SKIRT | IT0015 | S678 | BL07 | S678BL07.gif | ALREADY PURCHASED |
| 0x00000AC | 0003 | 0x0001 | FOOT | SANDALS | BR0001 | 45632 | RD36 | 45632RD36.gif | ALREADY PURCHASED |
| 0x00000AC | 0004 | 0x0006 | UPPER BODY | T-SHIRT | GM0002 | T5678 | RD-M | T5678RDM.gif | BEING TRIED ON |
| 0x00000AC | 0005 | 0x0006 | LOWER BODY | PANTS | FR0032 | 0123 | BL13 | 0123BL13.gif | BEING TRIED ON |
| 0x00000AC | 0006 | 0x0007 | UPPER BODY | SHIRT | KR0004 | SS707 | G-AM | SS707GAM.gif | BEING TRIED ON |
| 0x00000AC | 0007 | 0x0007 | LOWER BODY | PANTS | FR0032 | 4569 | WT11 | 4569WT11.gif | BEING TRIED ON |
| 0x00000AC | 0008 | 0x0008 | UPPER BODY | T-SHIRT | KR1122 | 75243 | G-AS | 75243GAS.gif | BEING TRIED ON |
| 0x00000AD | 0001 | 0x0001 | UPPER BODY | SHIRT | IT0015 | S435 | YW09 | S435YW09.gif | BEING TRIED ON |
| 0x00000AD | 0002 | 0x0001 | LOWER BODY | SKIRT | JP0016 | SK12 | RD-07 | SK12RD07.gif | BEING TRIED ON |
| 0x00000AD | 0003 | 0x0001 | FOOT | PUMPS | IT0015 | P908 | RD22 | P908RD22.gif | BEING TRIED ON |
| 0x00000AD | 0004 | 0x0009 | UPPER BODY | SHIRT | GM0002 | S9876 | BLAL | S9876BLAL.gif | ALREADY PURCHASED |
| 0x00000AD | 0005 | 0x0009 | LOWER BODY | PANTS | KR0004 | PP067 | B-AL | PP067BAL.gif | ALREADY PURCHASED |
| 0x00000AD | 0006 | 0x0009 | FOOT | SNEAKER | BR0001 | 14569 | WT26 | 14569WT26.gif | ALREADY PURCHASED |
| 0x00000AD | 0007 | 0x0010 | UPPER BODY | T-SHIRT | IT0015 | T010 | WTMM | T010WTMM.gif | BEING TRIED ON |
| 0x00000AE | 0001 | 0x0002 | UPPER BODY | T-SHIRT | KR0004 | TT099 | W-CM | TT099WCM.gif | BEING TRIED ON |
| 0x00000AF | 0001 | 0x0003 | UPPER BODY | T-SHIRT | KR0004 | TT099 | Y-CS | TT099YCS.gif | BEING TRIED ON |

FIG.6

| BASKET ID | ITEM NO. | UNIT PRICE | QUANTITY | TOTAL SUM | CT OF PRS | USER ID OF PIP | INPUT SUM | PAYMENT METHOD | INPUT DATE |
|---|---|---|---|---|---|---|---|---|---|
| 0x00000AB | 0004 | 2,500 | 1 | 2,500 | 2,500 | 0x0001 | 2,500 | CREDIT CARD | 20020412 |
| 0x00000AC | 0001 | 1,800 | 1 | 1,800 | 1,800 | 0x0001 | 1,800 | CREDIT CARD | 20020412 |
| 0x00000AC | 0002 | 6,500 | 1 | 6,500 | 6,500 | 0x0001 | 6,500 | CREDIT CARD | 20020412 |
| 0x00000AC | 0004 | 1,800 | 2 | 3,600 | 3,600 | 0x0006 | 3,600 | CASH ON DELIVERY | 20020412 |
| 0x00000AC | 0006 | 5,400 | 1 | 5,400 | 2,000 | 0x0007 | 2,000 | CREDIT CARD | 20020412 |
| 0x00000AC | 0006 | 5,400 | 1 | 5,400 | 5,400 | 0x0008 | 3,400 | BANK TRANSFER | 20020413 |
| 0x00000AC | 0008 | 2,800 | 1 | 2,800 | 2,800 | 0x0008 | 2,800 | CREDIT CARD | 20020413 |
| 0x00000AD | 0004 | 3,200 | 1 | 3,200 | 3,200 | 0x0010 | 3,200 | CHEQUE | 20020413 |
| 0x00000AD | 0005 | 4,800 | 2 | 9,600 | 9,600 | 0x0009 | 9,600 | CASH ON DELIVERY | 20020413 |
| 0x00000B0 | 0001 | 2,000 | 1 | 2,000 | 2,000 | 0x0002 | 2,000 | CREDIT CARD | 20020420 |

| DELIVERY DESTINATION ZIP CODE | DELIVERY DESTINATION ADDRESS | RECEIVER NAME | SUM STATUS |
|---|---|---|---|
| 650-**** | KOBE-SHI… | KAZUMI INOUE | ORDER ENABLED |
| 650-**** | KOBE-SHI… | AKEMI INOUE | ORDER ENABLED |
| 650-**** | KOBE-SHI… | AKEMI INOUE | ORDER ENABLED |
| *-** | SHINAGAWA-KU… | MAKIKO TANAKA | ORDER ENABLED |
| 650-**** | SAKAI-SHI… | KIYOMI TSUJIMOTO | INSUFFICIENT SUM |
| *-** | MINATO-KU… | CHIKAGE OGI | ORDER ENABLED |
| *-** | MINATO-KU… | CHIKAGE OGI | ORDER ENABLED |
| *-** | YOKOSUKA-SHI… | JUNICHIRO KOIZUMI | ORDER ENABLED |
| *-** | YOKOSUKA-SHI… | JUNICHIRO KOIZUMI | ORDER ENABLED |
| 650-**** | KOBE-SHI… | KAZUMI INOUE | ORDER ENABLED |

CT: CUMULATIVE TOTAL
PIP: PAYMENT INPUT PERSON
PRS: PAYMENT REGISTERED SUM

FIG.7

| ORDER NO. | ORDER DATE | SHOPPING SITE CODE | COMMODITY CODE | COMMODITY TYPE | QUANTITY | C.O.D. SUM | DD ZIP CODE | DD ADDRESS | RECEIVER NAME |
|---|---|---|---|---|---|---|---|---|---|
| 000001 | 20020412 | GM0002 | T5678 | YW-M | 1 | 0 | 650-**** | KOBE-SHI··· | AKEMI INOUE |
| 000002 | 20020412 | GM0002 | T5678 | RD-M | 2 | 3,600 | *-** | SHINAGAWA-KU··· | MAKIKO TANAKA |
| 000003 | 20020412 | IT0015 | S678 | BL07 | 1 | 0 | 650-**** | KOBE-SHI··· | AKEMI INOUE |
| 000004 | 20020413 | KR0004 | SS707 | G-AM | 1 | 0 | *-** | SAKAI-SHI··· | KIYOMI TSUJIMOTO |
| 000005 | 20020413 | KR1122 | 75243 | G-AS | 1 | 0 | *-** | MINATO-KU··· | CHIKAGE OGI |
| 000006 | 20020415 | GM0002 | S9876 | BLAL | 1 | 0 | *-** | YOKOSUKA-SHI··· | JUNICHIRO KOIZUMI |
| 000007 | 20020415 | KR0004 | PP067 | B-AL | 2 | 9,600 | *-** | YOKOSUKA-SHI··· | JUNICHIRO KOIZUMI |
| 000008 | 20020420 | JP0016 | TS05 | YW-CM | 1 | 0 | 650-**** | KOBE-SHI··· | KAZUMI INOUE |

FIG.8

DD: DELIVERY DESTINATION

SHARING CONDITION SETTINGS

USER ID    0x0001

NAME      AKEMI INOUE    ~260

E-MAIL     akemi@**.com

TRY-ON CONDITIONS (LOWER BODY INCLUDES FEET, HERE)

1. OPEN RANGE ON TRY-ON SCREEN
        ⊚WHOLE BODY  ⊚UPPER BODY  ⊚LOWER BODY   ~262

2. OPEN RANGE ON TRY-ON LIST
        ⊚WHOLE BODY  ⊚UPPER BODY  ⊚LOWER BODY   ~264
        ⊚NOTHING

3. RANGE OF SELF-TRY-ON CLOTHES UTILIZABLE (COPIABLE)
       BY ANOTHER PERSON   ~265
        ⊚WHOLE BODY  ⊚UPPER BODY  ⊚LOWER BODY
        ⊚NOTHING

4. RANGE AVAILABLE FOR ANOTHER USER TO TRY CLOTH
       ON SELF-IMAGE   ~266
        ⊚WHOLE BODY  ⊚UPPER BODY  ⊚LOWER BODY
        ⊚NOTHING

5. TRY-ON AVAILABLE MEMBER ON SHARING SCREEN
      (ONLY ADMINISTRATOR CAN MAKE THIS SETTING.)   ~267

☑MAKIKO TANAKA  ☑KIYOMI TSUJIMOTO  ☑CHIKAGE OGI

[ REGISTER ] ~268   [ CANCEL ] ~269

FIG.26

TRY-ON LIST FOR PARTY OF CLOSE FOUR FRIENDS

302

| | TRY-ON PERSON | PART | SHOP | COMMODITY | OPTIONS |
|---|---|---|---|---|---|
| ● | AKEMI INOUE | UPPER BODY | GEP | T-SHIRT | YELLOW/M |
| ◎ | AKEMI INOUE | LOWER BODY | COMSAN DU MODE | SKIRT | BLUE/7 |
| ◎ | AKEMI INOUE | FOOT | MONKEY & RIAN | SANDALS | RED/22.5cm |
| ◎ | MAKIKO TANAKA | UPPER BODY | GEP | T-SHIRT | RED/M |
| ◎ | MAKIKO TANAKA | LOWER BODY | CHRISTIAN BIOR | PANTS | BLUE/13 |
| ◎ | MAKIKO TANAKA | FOOT | NONE | | |
| ◎ | KIYOMI TSUJIMOTO | UPPER BODY | HAMES | SHIRT | GREEN/ADULT M |
| ◎ | KIYOMI TSUJIMOTO | LOWER BODY | CHRISTIAN BIOR | PANTS | WHITE/11 |
| ◎ | KIYOMI TSUJIMOTO | FOOT | NONE | | |
| ◎ | CHIKAGE OGI | UPPER BODY | VELLMARCH | T-SHIRT | GREEN/ADULT S |
| ◎ | CHIKAGE OGI | LOWER BODY | NONE | | |
| ◎ | CHIKAGE OGI | FOOT | NONE | | |

| 304 | 306 | 308 |
|---|---|---|
| STOP TRY-ON | COPY TRIED-ON COMMODITY | SHIFT TO TRY-ON SCREEN |

FIG.30

| | TRY-ON PERSON | PART | SHOP | COMMODITY | OPTIONS |
|---|---|---|---|---|---|
| ◎ | AKEMI INOUE | UPPER BODY | NONE | | |
| ◎ | AKEMI INOUE | LOWER BODY | COMSAN DU MODE | SKIRT | BLUE/7 |
| ◎ | AKEMI INOUE | FOOT | MONKEY & RIAN | SANDALS | RED/22.5cm |
| ◎ | MAKIKO TANAKA | UPPER BODY | GEP | T-SHIRT | RED/M |
| ◎ | MAKIKO TANAKA | LOWER BODY | CHRISTIAN BIOR | PANTS | BLUE/13 |
| ◎ | MAKIKO TANAKA | FOOT | NONE | | |
| ◎ | KIYOMI TSUJIMOTO | UPPER BODY | HAMES | SHIRT | GREEN/ADULT M |
| ◎ | KIYOMI TSUJIMOTO | LOWER BODY | CHRISTIAN BIOR | PANTS | WHITE/11 |
| ◎ | KIYOMI TSUJIMOTO | FOOT | NONE | | |
| ◎ | CHIKAGE OGI | UPPER BODY | VELLMARCH | T-SHIRT | GREEN/ADULT S |
| ◎ | CHIKAGE OGI | LOWER BODY | NONE | | |
| ◎ | CHIKAGE OGI | FOOT | NONE | | |

TRY-ON LIST FOR PARTY OF CLOSE FOUR FRIENDS /310
/-312

314 — STOP TRY-ON
316 — COPY TRIED-ON COMMODITY
318 — SHIFT TO TRY-ON SCREEN

FIG.31

TRY-ON LIST FOR PARTY OF CLOSE FOUR FRIENDS ⟋320

⟋322

| TRY-ON PERSON | PART | SHOP | COMMODITY | OPTIONS |
|---|---|---|---|---|
| AKEMI INOUE | UPPER BODY | GEP | T-SHIRT | YELLOW/M |
| MAKIKO TANAKA | UPPER BODY | GEP | T-SHIRT | RED/M |
| MAKIKO TANAKA | LOWER BODY | CHRISTIAN BIOR | PANTS | BLUE/13 |
| MAKIKO TANAKA | FOOT | NONE | | |
| KIYOMI TSUJIMOTO | UPPER BODY | HAMES | SHIRT | GREEN/ADULT M |
| KIYOMI TSUJIMOTO | LOWER BODY | CHRISTIAN BIOR | PANTS | WHITE/11 |
| KIYOMI TSUJIMOTO | FOOT | NONE | | |
| CHIKAGE OGI | UPPER BODY | VELLMARCH | T-SHIRT | GREEN/ADULT S |
| CHIKAGE OGI | LOWER BODY | NONE | | |
| CHIKAGE OGI | FOOT | NONE | | |

| STOP TRY-ON (324) | COPY TRIED-ON COMMODITY (326) | SHIFT TO TRY-ON SCREEN (328) |
|---|---|---|

FIG.32

TRY-ON LIST FOR PARTY OF CLOSE FOUR FRIENDS /330

| | TRY-ON PERSON | PART | SHOP | COMMODITY | OPTIONS |
|---|---|---|---|---|---|
| ◎ | AKEMI INOUE | UPPER BODY | GEP | T-SHIRT | YELLOW/M |
| ◎ | AKEMI INOUE | LOWER BODY | COMSAN DU MODE | SKIRT | BLUE/7 |
| ◎ | AKEMI INOUE | FOOT | MONKEY & RIAN | SANDALS | RED/22.5cm |
| ◎ | MAKIKO TANAKA | UPPER BODY | GEP | T-SHIRT | RED/M |
| ◎ | MAKIKO TANAKA | LOWER BODY | CHRISTIAN BIOR | PANTS | BLUE/13 |
| ◎ | MAKIKO TANAKA | FOOT | NONE | | |
| ◎ | KIYOMI TSUJIMOTO | UPPER BODY | GEP | T-SHIRT | WHITE/M |
| ◎ | KIYOMI TSUJIMOTO | LOWER BODY | CHRISTIAN BIOR | PANTS | WHITE/11 |
| ◎ | KIYOMI TSUJIMOTO | FOOT | NONE | | |
| ◎ | CHIKAGE OGI | UPPER BODY | VELLMARCH | T-SHIRT | GREEN/ADULT S |
| ◎ | CHIKAGE OGI | LOWER BODY | NONE | | |
| ◎ | CHIKAGE OGI | FOOT | NONE | | |

[ STOP TRY-ON ] /334   [ COPY TRIED-ON COMMODITY ] /336   [ SHIFT TO TRY-ON SCREEN ] /338

FIG.33

COPY OF TRY-ON COMMODITY

NOW, COPY OF

TRY-ON PERSON: AKEMI INOUE   COMMODITY: GEP   T-SHIRT (YELLOW/M)

WILL BE CARRIED OUT.   ~350

TO WHICH PERSON DO YOU WANT TO TRY ON?

☐ MAKIKO TANAKA
☑ KIYOMI TSUJIMOTO   ~352
☐ CHIKAGE OGI

[COPY] 354   [CANCEL] 356

FIG.35

TRY-ON LIST FOR PARTY OF CLOSE FOUR FRIENDS ~360

~362

| TRY-ON PERSON | PART | SHOP | COMMODITY | OPTIONS |
|---|---|---|---|---|
| AKEMI INOUE | UPPER BODY | GEP | T-SHIRT | YELLOW/M |
| AKEMI INOUE | LOWER BODY | COMSAN DU MODE | SKIRT | BLUE/7 |
| AKEMI INOUE | FOOT | MONKEY & RIAN | SANDALS | RED/22.5cm |
| MAKIKO TANAKA | UPPER BODY | GEP | T-SHIRT | RED/M |
| MAKIKO TANAKA | LOWER BODY | CHRISTIAN BIOR | PANTS | BLUE/13 |
| MAKIKO TANAKA | FOOT | NONE | | |
| KIYOMI TSUJIMOTO | UPPER BODY | GEP | T-SHIRT | YELLOW/M |
| KIYOMI TSUJIMOTO | LOWER BODY | CHRISTIAN BIOR | PANTS | WHITE/11 |
| KIYOMI TSUJIMOTO | FOOT | NONE | | |
| CHIKAGE OGI | UPPER BODY | VELLMARCH | T-SHIRT | GREEN/ADULT S |
| CHIKAGE OGI | LOWER BODY | NONE | | |
| CHIKAGE OGI | FOOT | NONE | | |

[STOP TRY-ON] 364   [COPY TRIED-ON COMMODITY] 366   [SHIFT TO TRY-ON SCREEN] 368

FIG.36

04/10/2002 PURCHASING TRY-ON LIST FOR FAMILY GROUP ~390

| TRY-ON PERSON | SHOP | COMMODITY | OPTIONS | UNIT PRICE | CUMULATIVE TOTAL OF PAYMENT REGISTERED SUMS | INSUFFICIENT SUM | RECEPTION DEADLINE OF PAYMENT REGISTRATION | PURCHASE STATUS | |
|---|---|---|---|---|---|---|---|---|---|
| AKEMI INOUE | CHANNEL | SHIRT | GREEN/9 | 5,800 | 0 | 5,800 | — | BEING TRIED ON | CHECK OUT |
| AKEMI INOUE | CHRISTIAN BIOR | SKIRT | RED/7 | 4,600 | 0 | 4,600 | — | BEING TRIED ON | CHECK OUT |
| AKEMI INOUE | MONKEY & RIAN | SHOES | BLACK/22.5cm | 7,500 | 0 | 7,500 | — | BEING TRIED ON | CHECK OUT |
| KAZUMI INOUE | HAMES | T-SHIRT | WHITE/KIDS M | 2,300 | 0 | 2,300 | — | BEING TRIED ON | CHECK OUT |

~392  ~394

[CHECK OUT FOR RESPECTIVE TRY-ON PERSONS] ~396    [KEEP TRY-ON] ~398

FIG.39

04/12/2002 PURCHASING TRY-ON LIST FOR PARTY OF CLOSE FOUR FRIENDS ~4000

| TRY-ON PERSON | SHOP | COMMODITY | OPTIONS | UNIT PRICE | CUMULATIVE TOTAL OF PAYMENT REGISTERED SUMS | INSUFFICIENT SUM | PAYMENT REGISTRATION | RECEPTION DEADLINE OF PAYMENT | PURCHASE STATUS | 4002 / 4004 |
|---|---|---|---|---|---|---|---|---|---|---|
| AKEMI INOUE | GEP | T-SHIRT | YELLOW/M | 1,800 | 0 | 1,800 | — | | ALREADY PURCHASED | CHECK OUT |
| AKEMI INOUE | COMSAN DU MODE | SKIRT | BLUE/7 | 6,500 | 0 | 6,500 | — | | ALREADY PURCHASED | CHECK OUT |
| AKEMI INOUE | MONKEY & RIAN | SANDALS | RED/22.5cm | 2,800 | 0 | 2,800 | — | | BEING TRIED ON | CHECK OUT |
| MAKIKO TANAKA | GEP | T-SHIRT | RED/M | 1,800 | 0 | 1,800 | — | | ALREADY PURCHASED | CHECK OUT |
| MAKIKO TANAKA | CHRISTIAN BIOR | PANTS | BLUE/13 | 5,800 | 0 | 5,800 | — | | BEING TRIED ON | CHECK OUT |
| KIYOMI TSUJIMOTO | HAMES | SHIRT | GREEN/ADULT M | 5,400 | 0 | 5,400 | — | | BEING TRIED ON | CHECK OUT |
| KIYOMI TSUJIMOTO | CHRISTIAN BIOR | PANTS | WHITE/11 | 6,200 | 0 | 6,200 | — | | BEING TRIED ON | CHECK OUT |
| CHIKAGE OGI | VELLMARCH | T-SHIRT | GREEN/ADULT S | 2,800 | 0 | 2,800 | — | | BEING TRIED ON | CHECK OUT |

CHECK OUT FOR RESPECTIVE TRY-ON PERSONS ~4006    KEEP TRY-ON ~4008

FIG.40

1. PLEASE CONFIRM CONTENTS OF YOUR PAYMENT.

~4400

| SHOP | COMMODITY | OPTIONS | UNIT PRICE | QUANTITY | SUBTOTAL | PAYMENT SUM | CUMULATIVE TOTAL OF PAYMENT REGISTERED SUMS | INSUFFICIENT SUM |
|---|---|---|---|---|---|---|---|---|
| HAMES | SHIRT | GREEN/ADULT M | 5,400 | 1 | 5,400 | 2,000 | 2,000 | 3,400 |

2. PLEASE SELECT PAYMENT METHOD.

~4402

PAYMENT METHOD: [VIVA CARD ▶]

CARD NO.: [ ]

TERM OF VALIDITY: [--- ▶] [--- ▶]

3. PLEASE SELECT DELIVERY DESTINATION ADDRESS.

WHEN THE DELIVERY DESTINATION IS DIFFERENT FROM THE REGISTERED ADDRESS, PLEASE SELECT "OTHER". INCIDENTALLY, THE DESTINATION OF THE BILL FOR THE SUM IS NOT CHANGED (IT IS THE REGISTERED ADDRESS.)

⦿ THE SAME AS REGISTERED ADDRESS
○ OTHER

NAME: [ ]      ADDRESS: [              ~4404 ]

ZIP CODE: [ ]     TEL. NO.: [ ]

[REGISTER PAYMENT]~4406     [CANCEL]~4408

*YOU CAN NOT ORDER SINCE TOTAL OF PAYMENT SUMS DOES NOT REACH THE COMMODITY PRICE.

FIG.44

```
PAYMENT REGISTRATION IS COMPLETED.                    /-4500
AFTER THE TOTAL SUM REACHES THE COMMODITY PRICE, YOU CAN ORDER.
                                                              /-4502
COMMODITY:              HAMES SHIRT (GREEN/ADULT M) × 1   ¥5,400
                                                              /-4504
DELIVERY DESTINATION ADDRESS:  〒***-**** SAKAI-SHI···  KIYOMI TSUJIMOTO

PAYMENT:                KIYOMI TSUJIMOTO        ¥2,000 (VIVA CARD)
                                    SUM         ¥2,000
                   /-4506           INSUFFICIENT SUM ¥3,400    \-4506

RECEPTION DEADLINE FOR PAYMENT REGISTRATION: LAST THREE DAYS
```

FIG.45

```
THANK YOU FOR YOUR ORDER.  \-4900

/-4902
COMMODITY:              HAMES SHIRT (GREEN/ADULT M) × 1   ¥5,400
                                                              /-4904
DELIVERY DESTINATION ADDRESS:  〒***-**** SAKAI-SHI···  KIYOMI TSUJIMOTO

PAYMENT:                KIYOMI TSUJIMOTO    ¥2,000 (VIVA CARD)
                        CHIKAGE OGI         ¥3,400 (BANK TRANSFER)
                                    TOTAL ¥5,400
                                                  \-4906
```

FIG.49

```
PLEASE SELECT TRY-ON PERSON TO BE PAID.    /-5100

●AKEMI INOUE   SHIRT (¥5,800), SKIRT (¥4,600), SHOES (¥7,500)
◎KAZUMI INOUE  T-SHIRT (¥2,300)

/-5102          /-5104                           /-5106
 ┌──────────┐  ┌──────────────┐                 ┌──────────┐
 │ KEEP TRY-ON│  │RETURN TO TRY-│                 │   PAY    │
 │            │  │  ON LIST     │                 │          │
 └──────────┘  └──────────────┘                 └──────────┘
```

FIG.51

| 04/13/2002 PURCHASING TRY-ON LIST FOR PARTY OF CLOSE FOUR FRIENDS 4600 | | | | | | | | |
|---|---|---|---|---|---|---|---|---|
| TRY-ON PERSON | SHOP | COMMODITY | OPTIONS | UNIT PRICE | CUMULATIVE TOTAL OF PAYMENT REGISTERED SUMS | INSUFFICIENT SUM | RECEPTION DEADLINE OF PAYMENT REGISTRATION | PURCHASE STATUS 4602 |
| AKEMI INOUE | GEP | T-SHIRT | YELLOW/M | 1,800 | 0 | 1,800 | — | ALREADY PURCHASED CHECK OUT 4604 |
| AKEMI INOUE | COMSAN DU MODE | SKIRT | BLUE/7 | 6,500 | 0 | 6,500 | — | ALREADY PURCHASED CHECK OUT |
| AKEMI INOUE | MONKEY & RIAN | SANDALS | RED/22.5cm | 2,800 | 0 | 2,800 | — | BEING TRIED ON CHECK OUT |
| MAKIKO TANAKA | GEP | T-SHIRT | RED/M | 1,800 | 0 | 1,800 | — | ALREADY PURCHASED CHECK OUT |
| MAKIKO TANAKA | CHRISTIAN BIOR | PANTS | BLUE/13 | 5,800 | 0 | 5,800 | — | BEING TRIED ON CHECK OUT |
| KIYOMI TSUJIMOTO | HAMES | SHIRT | GREEN/ADULT M | 5,400 | 2,000 | 3,400 | LAST TWO DAYS | BEING TRIED ON CHECK OUT |
| KIYOMI TSUJIMOTO | CHRISTIAN BIOR | PANTS | WHITE/11 | 6,200 | 0 | 6,200 | — | BEING TRIED ON CHECK OUT |
| CHIKAGE OGI | VELLMARCH | T-SHIRT | GREEN/ADULT S | 2,800 | 0 | 2,800 | — | BEING TRIED ON CHECK OUT |

[ CHECK OUT FOR RESPECTIVE TRY-ON PERSONS ] 4606      [ KEEP TRY-ON ] 4608

FIG.46

DELIVERY DESTINATION ADDRESS: 〒*-** SAKAI-SHI... KIYOMI TSUJIMOTO ~4800

1. PLEASE CONFIRM CONTENTS OF YOUR PAYMENT.

| | | | | | | | CUMULATIVE TOTAL | |
| | | | UNIT | | | PAYMENT | OF PAYMENT | INSUFFICIENT |
| SHOP | COMMODITY | OPTIONS | PRICE | QUANTITY | SUBTOTAL | SUM | REGISTERED SUMS | SUM |
| HAMES | SHIRT | GREEN/ADULT M | 5,400 | 1 | 5,400 | 3,400 | 5,400 | 0 |

~4802

2. PLEASE SELECT PAYMENT METHOD.

PAYMENT METHOD: [VIVA CARD ▼]  ~4804
CARD NO.: [         ]
TERM OF VALIDITY: [--- ▼] [--- ▼]

[ORDER] ~4806    [CANCEL] ~4808

*SINCE TOTAL OF THE PAYMENT SUMS REACHES THE COMMODITY PRICE, YOU CAN ORDER IT.  ~4810

FIG.48

DELIVERY DESTINATION ADDRESS: NOT FIXED —5300

HISTORY OF PAYMENT REGISTRATION (0) —5302

—5304

| SHOP | COMMODITY | OPTIONS | UNIT PRICE | QUANTITY | SUBTOTAL |
|---|---|---|---|---|---|
| CHANNEL | SHIRT | GREEN/9 | 5,800 | 1 | 5,800 |
| CHRISTIAN BIOR | SKIRT | RED/7 | 4,600 | 1 | 4,600 |
| MONKEY & RIAN | SHOES | BLACK/22.5cm | 7,500 | 1 | 7,500 |

TOTAL 17,900 —5306
CUMULATIVE TOTAL OF PAYMENT REGISTERED SUMS 0 —5308
INSUFFICIENT SUM 17,900 —5310

—5316 KEEP TRY-ON
—5318 RETURN TO TRY-ON LIST
PAYMENT SUM —5312
REGISTER PAYMENT —5314

—5320 PERSONS
REGISTER SHARED PAYMENT —5322

AT PRESENT, TWO MEMBERS ARE REGISTERED IN THIS SHARING GROUP.
WHEN YOU JOINTLY AND EQUALLY PURCHASE THESE COMMODITIES,
THE PAYMENT SUM PER ONE PERSON IS ¥8950. —5324

FIG.53

THANK YOU FOR YOUR ORDER. —5600

COMMODITY:
CHANNEL SHIRT (GREEN/9) × 1 ¥5,800
CHRISTIAN BIOR SKIRT (RED/7) × 1 ¥4,600 —5602
MONKEY & RIAN SHOES (BLACK/22.5cm) × 1 ¥7,500
TOTAL ¥17,900

DELIVERY DESTINATION ADDRESS: 〒650-**** KOBE-SHI··· AKEMI INOUE —5604

PAYMENT: AKEMI INOUE ¥17,900 (VIVA CARD) —5606
TOTAL ¥17,900

FIG.56

| | | | | | | |
|---|---|---|---|---|---|---|
| 1. PLEASE CONFIRM CONTENTS OF YOUR PAYMENT. | | | | ~5500 | | |
| SHOP | COMMODITY | OPTIONS | UNIT PRICE | QUANTITY | SUBTOTAL | |
| CHANNEL | SHIRT | GREEN/9 | 5,800 | 1 | 5,800 | |
| CHRISTIAN BIOR | SKIRT | RED/7 | 4,600 | 1 | 4,600 | |
| MONKEY & RIAN | SHOES | BLACK/22.5cm | 7,500 | 1 | 7,500 | |

|  |  |
|---|---|
| TOTAL | 17,900 ~5502 |
| PAYMENT SUM | 17,900 ~5504 |
| CUMULATIVE TOTAL OF PAYMENT REGISTERED SUMS | 17,900 ~5506 |
| INSUFFICIENT SUM | 0 ~5508 |

2. PLEASE SELECT PAYMENT METHOD.

PAYMENT METHOD: VIVA CARD ▼

CARD NO.: [         ]   /-5510

TERM OF VALIDITY: [ --- ▼ ] [ --- ▼ ]

3. PLEASE SELECT DELIVERY DESTINATION ADDRESS.

WHEN THE DELIVERY DESTINATION IS DIFFERENT FROM THE REGISTERED ADDRESS, PLEASE SELECT "OTHER".
INCIDENTALLY, THE DESTINATION OF THE BILL FOR THE SUM IS NOT CHANGED.
(IT IS THE REGISTERED ADDRESS.)

⦿ THE SAME AS REGISTERED ADDRESS
◎ OTHER

NAME: [                    ]   /-5512

ZIP CODE: [         ]

ADDRESS: [                           ]

TEL. NO. [            ]

[ ORDER ] /-5514    [ CANCEL ] /-5516

/-5518
*SINCE TOTAL OF THE PAYMENT SUMS REACHES THE COMMODITY PRICE, YOU CAN ORDER IT.

FIG.55

TRY-ON LIST FOR AKEMI INOUE — 6100

| | PART | SHOP | COMMODITY | OPTIONS — 6102 |
|---|---|---|---|---|
| ● | UPPER BODY | CHANNEL | SHIRT | GREEN/9 |
| ◎ | LOWER BODY | CHRISTIAN BIOR | SKIRT | RED/7 |
| ◎ | FOOT | MONKEY & RIAN | SHOES | BLACK/22.5cm |

[ STOP TRY-ON ] — 6104      [ SHIFT TO TRY-ON SCREEN ] — 6106

FIG.61

TRY-ON LIST FOR AKEMI INOUE — 6200

| | PART | SHOP | COMMODITY | OPTIONS — 6202 |
|---|---|---|---|---|
| ◎ | UPPER BODY | NONE | | |
| ◎ | LOWER BODY | CHRISTIAN BIOR | SKIRT | RED/7 |
| ◎ | FOOT | MONKEY & RIAN | SHOES | BLACK/22.5cm |

[ STOP TRY-ON ] — 6204      [ SHIFT TO TRY-ON SCREEN ] — 6206

FIG.62

METHOD, SYSTEM AND MEDIUM FOR SHARING AN IMAGE OF A VIRTUAL TRY-ON SCENE

TECHNICAL FIELD OF THE INVENTION

The present invention relates to an information processing technique for virtual try-on in which clothes as commodities are put on and taken off in a virtual space in computers, and an information processing technique for related settlement of accounts.

BACKGROUND OF THE INVENTION

Japanese patent application laid-open No. 2001-022831 discloses the following technique. Namely, to provide commodity information with a satisfactory combination with a commodity selected by the user and matched with the favorite of the user based on the transaction history in various business partners of the user, when the user determines a commodity having the satisfactory combination with a commodity selected by the user and further determines a commodity matched with the favorite of the user, the average favorite, the favorite for each purpose and the recent favorite are taken into account as the many-sided favorites, and commodity information is provided as a coordinated example suitable for the user, without registering information to link commodities to each other in advance by the information provider.

Japanese patent application laid-open No. H11-086142 discloses the following technique. Namely, a model image is shown on an indicator, image information of one merchandise group that is designated from plural merchandise groups is transferred from a database, which stores image information of merchandise about clothing together with its merchandise data to display it on the indicator of the display terminal, the merchandise image of a merchandise that is designated from plural merchandises included in a designated merchandise group is tried on a model image to display it as a try-on model image on the indicator. As a succeeding processing, the registration of the merchandise that is tried on by the try-on model image is determined, the merchandise data of the merchandise registration of which is determined are sent to a main body, in accordance with a closing operation of the display terminal to perform merchandise registration processing.

Japanese patent application laid-open No. H11-001813 discloses the following technique. Namely, disclosed is a coordination-supporting device or the like, which enables that a customer can easily select the detailed shapes of a favorite dress and/or raw materials to be applied, even when not having the professional knowledge of a fashion or even when not advised by a person having the professional knowledge of the fashion.

Japanese patent application laid-open No. H11-265243 discloses the following technique. Namely, a seller's side is provided with a database for storing the measured value of each portion of a commodity to be used for virtual try-on and the measured value of each portion of the body of a purchaser, and a virtual system application for obtaining the measured value of the size of each portion of the commodity and the measured value of the size of each portion of the body of the purchaser corresponding to the commodity when a purchaser purchases the commodity to be tried-on in a virtual store provided at the seller's side by operating a terminal at the purchaser's side, comparing the obtained measured values, judging the fit condition of the commodity to the purchaser, and presenting the judged result to the terminal at the purchaser's side as the result of the virtual try-on.

U.S. Pat. No. 6,310,627, which corresponds to Japanese patent application laid-open No. 11-203347, discloses the following technique. Namely, garment pattern paper information corresponding to clothes (trial clothes) selected for trial and standard human body information related with the body shape of a standard human body model is respectively read from a memory, and body shape information, cloth information and sewing information inputted through a keyboard 5 or a mouse 6 are read from an RAM 3, and a garment picture generating unit prepares a garment picture showing clothes suited for the body shape of a person for trial. Thus, the prepared garment picture and the person picture of the person for trial on are applied to the trial dressing picture generating unit, and the person picture and the garment picture are chromakey composed, so that a composite picture (trial dressing picture) can be prepared.

U.S. Pat. No. 5,383,111, which corresponds to Japanese patent No. 2,860,690, discloses the following technique. Namely, a commodity guidance method is provided, which comprises the steps of: specifying a key commodity; based on the specified key commodity, specifying a coordinated commodity matched with a commodity combined with the key commodity; and outputting the specified coordinated commodity.

Japanese patent application laid-open No. 2001-160095 discloses the following technique. Namely, a virtual mall system connected to the Internet includes a store/commodity database and a user database. The three-dimensional model data of each commodity, which is on sale in each store, is registered in the store/commodity database, and the personality figure prescription data of each user is registered in the user database, and the person figure of the user is created on the basis of the personality figure prescription data. When a commodity is selected with an external computer, the image data on the personality figure on which the commodity is put on trial is transmitted to the external computer.

Japanese patent application laid-open No. 2001-216429 discloses the following technique. Namely, a customer connects to the homepage of a mediator, selects a commodity registered in a server and virtually tries it on a registered virtual fitting model. In the case of virtual try-on, the customer can get an advise with diagnostic software prepared on the basis of the data of a color coordinator and stylist and when virtual fitting is performed, the list of maker names, purchased article names and prices is displayed. Then, the customer inputs order information, the mediator transmits the data of the customer required for a contract to each of sellers via the Internet and the seller sends the commodity to the customer.

Japanese patent application laid-open No. 2001-216429 discloses the following technique. Namely, the member is treated as a star and made to enjoy shopping like a TV drama and graphics persons of respective countries are employed to give dramatic thrilling elements. The social situation of the user and the study of conversation are incorporated. A virtual system provides a two-way chat on screens between friends using a keyword, shopping with a family, a wedding dress, ornaments, a tuxedo, and changing of dresses for a bridal, and atmosphere and picture software for a ceremonial hall and makes a primary contract after repetitive confirmation. System software enables the member to try a favorite thing repeatedly as desired, put on ornaments and others to enjoy a gorgeous atmosphere, and virtually experience desired foreign countries and desired stores on the screen.

US patent application publication No. US 2001-0023413-A1, which corresponds to Japanese patent application laid-open No. 2001-330806, discloses the following technique. Namely, this system enables an individual person to access a homepage opened by a spectacle store through the Internet by using a Web browser of a personal computer owned by the individual person, to select the spectacle frame provided by the homepage, to synthesize the selected spectacle frame with a face image and to display the frame and the image on a monitor screen.

Japanese patent application laid-open 2001-344474 discloses the following technique. Namely, since a three-dimensional object puts on a commodity, which differs in value with the figure of a customer such like a clothing commodity, and it is enabled that it is seen from various view points, a purchase taking into account the value of an individual customer, which was impossible in conventional on-line shopping, is enabled to reduce commodities sent back. Also, since clothing commodities can be worn one over another, the state of total coordination can be also confirmed. Further, a customer object can be remodeled conformity with the figure of the customer.

Japanese patent application laid-open 2001-344482 discloses the following technique. Namely, this try-on system, using a composite photograph, has means which registers and stores customer-side images and desired commodities, means which registers and stores commodity images and commodity information of a side providing the commodities, means which retrieves a commodity that a customer side desires from the registered and stored commodity images and commodity information, means which puts the retrieved commodity image and commodity information together with the customer-side image, and means which provides the obtained composite image for the customer side.

Japanese patent application laid-open 2002-24640 discloses the following technique. Namely, an experiencing web site comprises a database for storing the dress or the like presented by the fashion magazine or the like, a database for storing information related to the user, and a web server. The experience web site is previously related to the fashion magazine or the like. The user has a computer for accessing the experience web site. Virtual experience execution unit for adding the dress or the like to the body of the user to produce an experiencing composite image are provided for the user computer side or the experience web site side. A virtual fitting page is presented to the user that has accessed the site on the Internet based on his/her experience desiring will for the dress or the like presented by the fashion magazine or the like, thereby a fitting experience can be virtually done.

Japanese patent application laid-open 2002-32640 discloses the following technique. Namely, virtual stores and virtual market of specialty stores are provided on the Internet. Taste and data of the customer are registered and the store side collects data of taste, the style or the like of the customer in a form of questionnaires to make a personal file. The data are integrated to create a sense for artificial reality so that the customer can see dressed himself or herself walking or running from many directions. The customer is identified through his or her terminal device to go into a virtual store and selects clothes from a menu to wear them on trial, and thus the customer can quickly select and order his or her favorite clothes. Clothes and accessories of models who have appeared in a fashion show are tried on himself or herself or his or her family members or friends and their styles are objectively observed to enjoy amusement or make an order.

Japanese patent application laid-open 2002-32589 discloses the following technique. Namely, a user of this system inputs data on the height, chest circumference, waist circumference, arm measurement, and the like through the Internet to obtain Internet order size as detailed data on the figure. An order purchase wisher can order only by inputting order contents and the Internet order size and obtains the same finish with ordinary ordering. New seasonal clothes, clothes in new fashions and those displayed for sale can partially be adjusted, so products similar to made-to-order clothes can be obtained. Further, virtual try-on can be made if necessary by using a virtual space.

US patent application publication No. US 2002-0024517-A1 discloses the following technique. Namely, an object such as a man's body, an article, or the like is photographed by a plurality of sets of multiple-eye stereoscopic camera (for example, 9 video camera disposed in 3×3 matrix) installed in a store or the like, and outputted dynamic picture image data is transmitted to a modeling server through a network. The modeling server forms a three-dimensional model of the object from the dynamic picture image. This three-dimensional model is formed so as to move based on a motion of the object when photographing. A user system receives the three-dimensional model, and takes it into a virtual three-dimensional space of applications such as a virtual fitting of cloths, an experience game, or the like to move it.

At present, there are already Internet sites in which customers perform virtual try-on in on-line shopping and can decide about the purchase. Among them, there is one in which a purchase can be made after an imitation imitating a customer's own figure and even a face is made to appear on the screen, and virtual try-on is performed to make a judgment on suitableness.

However, in the above described background art, the person himself/herself or a third person individually sees the screen on which virtual try-on is performed and considers the purchase, and that is quite different from the shopping done in general. That is, the foregoing background art can not realize such a situation that plural persons are allowed to mutually see their try-on states of commodities, coordinates for plural persons, such as pair look, are checked, or a person purchases a commodity in a case where the commodity tried on by another person suits the person's taste.

SUMMARY OF THE INVENTION

An object of the invention is therefore to provide a new information processing technique for realizing a state close to real shopping by plural persons in on-line shopping.

Another object of the invention is to provide an information processing technique, which enables various payment modes of a commodity.

According to a first aspect of the invention, a method for browsing an image of a virtual try-on scene of a specific person by a plurality of persons comprises: in a case where a registration request enabling a first user to browse the image of the virtual try-on scene is received, registering information concerning the first user into a storage device; and in a case where a browsing request of the image of the virtual try-on scene is received from a terminal of the first user registered as being capable of browsing the image of the virtual try-on scene, generating an image of a virtual try-on scene on the basis of at least one of the information concerning the first user registered in the storage device and information concerning the specific person appearing on the virtual try-on scene and transmitting it to the terminal of the first user. By this, for example, a user who attempts to perform virtual try-on can set and register the first user who can simultaneously or asynchronously browse the image of the virtual try-on scene on which the former user, or another user, or the former user and the other user appear.

The first aspect of the invention may further comprise the steps of: in a case where a setting request for enabling the virtual try-on of a second user is received, registering information indicating that the second user can perform the virtual try-on into the storage device; and in a case where setting information concerning the virtual try-on of the second user is received from a terminal of the second user, registering the setting information concerning the virtual try-on by the second user into the storage device. By this, for example, a user who attempts to perform the virtual try-on can register, for example, another user who appears on the virtual try-on scene together. Also, the user appearing on the virtual try-on scene can set conditions at the time of appearing on the virtual try-on scene, for example, the lower body is hidden.

In the first aspect of the invention, the information concerning the specific person may include the setting information concerning the virtual try-on of the second user. By this, the condition set by each user appearing on the virtual try-on scene is reflected in the image of the virtual try-on scene for each user who is allowed to browse.

In the first aspect of the invention, the setting information concerning the virtual try-on of the second user may include setting information concerning a virtual try-on operation by the first user to the image of the second user. By this, it becomes possible for each user appearing on the virtual try-on scene to perform a setting concerning the virtual try-on operation (for example, putting on and taking off clothes) by the other user to the user's own image. For example, it becomes possible to perform such a setting as "virtual try-on operation by another user to the upper body is not allowed".

The first aspect of the invention may further comprise a step of, in a case where a virtual try-on operation instruction according to the setting information concerning the virtual try-on operation is received from the terminal of the first user, generating an image of the virtual try-on scene on the basis of at least the virtual try-on operation instruction, and transmitting it to the terminal of the first user. By this, the setting concerning the virtual try-on operation is reflected in the image generation processing corresponding to the operation of each user on the virtual try-on scene.

According to a second aspect of the invention, an information processing method for settlement of a commodity used for virtual try-on of a specific person comprises the steps of: in a case where a request to cause the specific person to virtually try on a commodity is received from a terminal of a user, storing at least information concerning the specific person and information concerning the commodity into a try-on information storage; and in a case where a settlement request specifying the commodity or the specific person is received from the terminal of the user, storing information of a user as a payer into a settlement information storage correspondingly to the specified commodity, or the commodity or commodity group on which the specific person virtually tries. By this, it becomes possible to make settlement for each virtual try-on person and each commodity. That is, it becomes possible to collectively make settlement for commodities on which the user himself/herself or another user virtually tries, or to individually make settlement for each commodity.

The second aspect of the invention may further comprise a step of, in a case where information of a payment sum of the user as the payer is received from the terminal of the user, storing the information of the payment sum correspondingly to at least the user into the settlement information storage. By this, it becomes possible to register information on how much does which user pay for which settlement, and settlement by plural users, that is, joint purchase becomes possible.

The second aspect of the invention may further comprise a step of, in a case where instruction information of payment sharing is received from the terminal of the user, storing the information of a payment sum calculated on the basis of the instruction information of the payment sharing into the settlement information storage correspondingly to at least the user. By this, the joint purchase can be efficiently made. For example, in an equal split by four users, a sum of one-fourth of a commodity order sum is registered as a payment sum of at least the user selecting the equal split.

The second aspect of the invention may further comprise a step of receiving a settlement request concerning the specified commodity, the commodity or the commodity group on which the specific person virtually tries until the total of payment sums of plural users as payers reaches an order sum of the specified commodity, or the commodity or the commodity group on which the specific person virtually tries, or for a predetermined period after first reception of the settlement request, and in a case where the total of the payment sums of the plural users as the payers reaches the order sum of the specified commodity, or the commodity or the commodity group on which the specific person virtually tries, performing an order processing of the specified commodity, the commodity or the commodity group on which the specific person virtually tries. By this, at the time of the joint purchase, the plural users share expenses and can perform payment registration for a certain specific period until the total reaches the order sum. Also, it becomes possible to prevent an order in a state where there is an insufficient sum at the time of the joint purchase.

An information processing method according to a third aspect of the invention comprises the steps of: requesting an image of a virtual try-on scene of a specific person for a server; and receiving the image of the virtual try-on scene generated on the basis of at least one of information concerning a requesting user and information of the specific person appearing on the virtual try-on scene from the server, and displaying it on a display device. By this, it becomes possible for the user to simultaneously or asynchronously browse the image of the virtual try-on scene on which the user himself/herself, or another user, or the user himself/herself and the other user appear.

A settlement processing method according to a fourth aspect of the invention comprises the steps of: receiving at least information concerning a specific person having performed virtual try-on and information of a virtual tried-on commodity associated with the specific person from a server and displaying it on a display device; and transmitting a settlement request specifying the virtual tried-on commodity or the specific person to the server. For example, it becomes possible for a user attempting to make settlement to request to collectively make settlement for the commodities on which the user himself/herself or the other user virtually tries, or to individually make settlement for the respective commodities.

An information processing method for settlement of a commodity according to a fifth aspect of the invention comprises the steps of: in a case where a request for associating a commodity with a specific person is received from a terminal of a user, storing at least information concerning the specific person and information concerning the commodity into a commodity information storage; and in a case where a settlement request specifying a commodity or the specific person is received from the terminal of the user, associating information of the user as a payer with a specified commodity, or the commodity or commodity group associated with the specific person and storing it into a settlement information storage.

It is also possible to prepare a program for causing a computer to execute the information processing method of the invention, and the program is stored in a storage medium or a storage device, for example, a flexible disk, a CD-ROM, a magneto-optical disk, a semiconductor memory, or a hard disk. Also, there is also a case where the program is distributed as a digital signal through a network. Also, data in the middle of processing is temporarily stored in a memory of a computer.

BRIEF DESCRIPTION OF THE DRAWINGS

FIG. 3 is a drawing showing an example of a table structure and stored data of a user management DB;

FIG. 4 is a drawing showing an example of a structure of a packet management table and stored data;

FIG. 5 is a drawing showing an example of a structure of a user entry table and stored data;

FIG. 6 is a drawing showing an example of a structure of a try-on entry table and stored data;

FIG. 7 is a drawing showing an example of a structure of a purchase management table and stored data;

FIG. 8 is a drawing showing an example of a structure of an order table and stored data;

FIG. 26 is a drawing showing an example of a sharing condition setting page;

FIG. 30 is a drawing showing a first example of a try-on list page;

FIG. 31 is a drawing showing a second example of the try-on list page;

FIG. 32 is a drawing showing a third example of the try-on list page;

FIG. 33 is a drawing showing a fourth example of the try-on list page;

FIG. 35 is a drawing showing an example of a tried-on commodity copy page;

FIG. 36 is a drawing showing a fifth example of the try-on list page;

FIG. 39 is a drawing showing a first example of a purchasing try-on list page;

FIG. 40 is a drawing showing a second example of the purchasing try-on list page;

FIG. 44 is a drawing showing a first example of a "payment registration for selected commodity" page;

FIG. 45 is a drawing showing a first example of a "payment confirmation for selected commodity" page;

FIG. 46 is a drawing showing a third example of the purchasing try-on list page;

FIG. 48 is a drawing showing a second example of the "payment registration for selected commodity" page;

FIG. 49 is a drawing showing a second example of the "payment confirmation for selected commodity" page;

FIG. 51 is a drawing showing an example of a paid try-on person selection page;

FIG. 53 is a drawing showing an example of a "payment for selected try-on person" page;

FIG. 55 is a drawing showing an example of a "payment registration for selected try-on person" page;

FIG. 56 is a drawing showing an example of a "payment confirmation for selected try-on person" page;

FIG. 61 is a drawing showing a first example of a private try-on list page; and FIG. 62 is a drawing showing a second example of the private try-on list page.

DETAILED DESCRIPTION OF THE PREFERRED EMBODIMENTS

Figure 1:
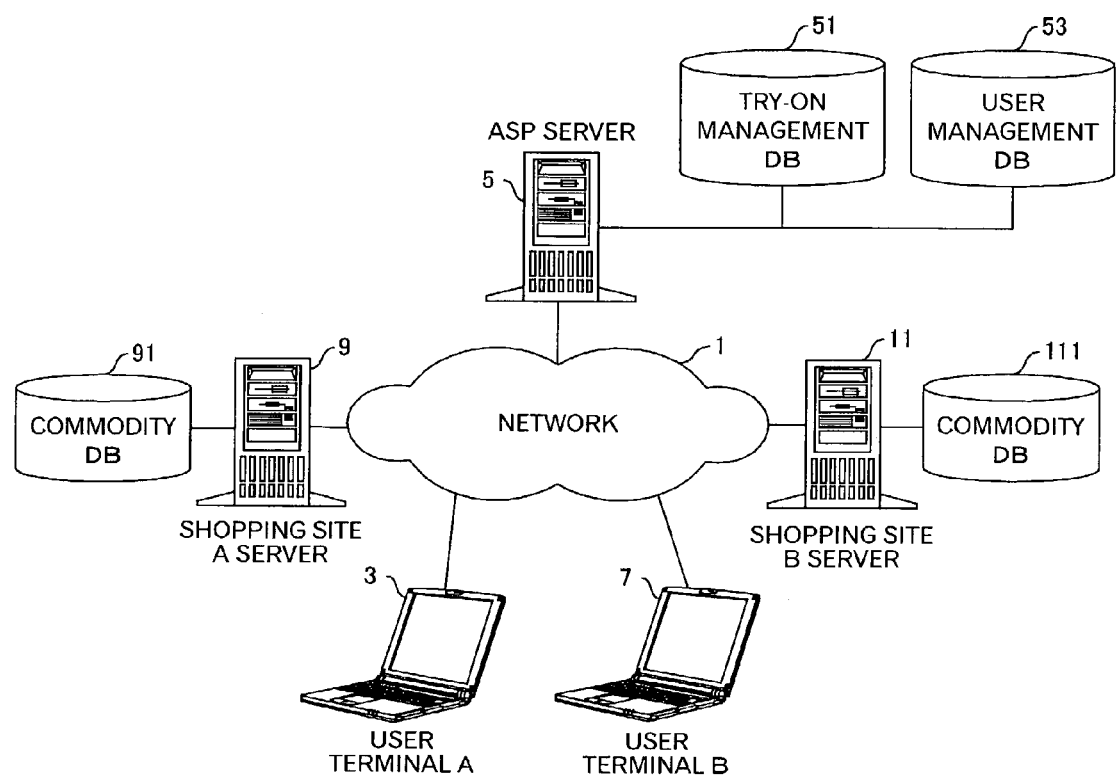
FIG. 1 is a drawing showing a system outline in an embodiment of the invention.

FIG. 1 shows a drawing for a system configuration according to an embodiment of the invention. A user terminal A (3) and a user terminal B (7), such as, for example, personal computers, are provided with a Web browser function and a mailer function, although not shown, and are connected to the Internet by wireless or wire to be capable of browsing homepages and transmitting and receiving e-mail.

A network 1, such as, for example, the Internet, is connected with the one or plural user terminals A (3) and user terminals B (7), one or plural Application Service Provider (ASP) servers 5 for performing a virtual try-on processing or the like, and one or plural shopping sites A servers 9 and shopping site B servers 11, such as, for example, servers of on-line shops (shopping sites) of clothes.

The ASP server 5 is connected with a try-on management database (DB) 51 storing data relating to virtual try-on and a user management DB 53 storing information of users performing virtual try-on. A commodity database DB storing information of handled commodities is managed in each of the shopping sites, the shopping site A server 9 is connected with a commodity DB 91, and the shopping site B server 11 is connected with a commodity DB 111.

The number of users and the number of shopping sites joining in the on-line shopping and virtual try-on service are not limited, and, accordingly, the numbers of user terminals and shopping site servers are also not limited. Also, plural ASPs may respectively provide virtual try-on service.

Also, although not shown, in communication via the network 1, it is assumed that equipments and functions necessary to connect with the Internet and to transmit and receive e-mail, such as a domain name server (DNS), a mail server, a firewall and the like, are used.

FIGS. 2 to 8 show examples of table structures and stored data in the respective DBs.

Figure 2:
FIG. 2 is a drawing showing an example of a table structure and stored data of a commodity DB.

The commodity DB managed by the shopping site, such as the commodity DB 91 or the commodity DB 111, includes a commodity management table such as shown in FIG. 2, for example. The example of the commodity management table shown in FIG. 2 includes a column 200 of commodity codes, a column 202 of commodity types, a column 204 of commodity information, a column 206 of colors, a column 208 of sizes, a column 210 of materials, a column 212 of image data, and a column 214 of unit prices.

In this table, a record is specified by a value in the column 200 of the commodity codes and a value in the column 202 of the commodity types. Although the values in the column 200 of the commodity codes and/or the values in the column 202 of the commodity types may be those originally set by each shopping site or manufacturer, it is necessary that the kind, color, shape, size, and texture and/or raw material of a commodity can be specified in this embodiment by determining the value in the column 200 of the commodity codes and the value in the column 202 of the commodity types. Also, the quantity of stock of respective commodities in each shopping site and/or manufacturer may be registered in this table. With respect to data types of files registered in the column 212 of the image data, both two-dimensional data and three-dimensional data may be adopted according to a screen configuration displayed when virtual try-on is performed.

Next, FIG. 3 shows an example of a table structure and stored data in the user management DB 53. The example of the user management table shown in FIG. 3 includes a column 300 of user IDs, a column 302 of names, a column 304 of birth dates, a column 306 of zip codes, a column 308 of addresses, a column 310 of telephone numbers, a column 312 of heights, a column 314 of busts, a column 316 of waists, a column 318 of hips, and a column 320 of image files.

Attribute information of respective users joining in the virtual try-on service is stored in this table. A record is specified by a value in the column 300 of the user IDs as a main key. Each of the columns is constituted by attributes used in a display processing of an image of a virtual try-on scene (also called a virtual try-on screen), a payment registration processing in a commodity order, or the like. The size of a commodity virtually tried on may be automatically set on the basis of a value in the column 312 of the heights, a value in the column 314 of the busts, a value in the column 316 of the waists, and a value in the column 318 of the hips. With respect to a data format of a file registered in the column 320 of personal images, both two-dimensional data and three-dimensional data may be adopted according to a screen configuration displayed when virtual try-on is performed. However, it is assumed that information is included which can specify a part of a body to which a commodity is virtually tried on. For example, in the case where an operation for virtually trying on a T-shirt to the upper body is performed, information of the T-shirt is associated with information expressing the upper body of an image of the user performing the virtual try-on, and the image is generated which is seen such that the user wears the T-shirt on the upper body. The fitting technique in the virtual space is described, for example, in U.S. Pat. No. 6,310,627, which is incorporated herein by reference.

Next, FIGS. 4 to 8 show examples of table structures and stored data in the try-on management DB 51. The try-on management DB 51 includes, for example, a basket management table shown in FIG. 4, a user entry table shown in FIG. 5, a try-on entry table shown in FIG. 6, a purchase management table shown in FIG. 7, and an order table shown in FIG. 8. In this embodiment, it is assumed that a commodity which is virtually tried on in a virtual try-on scene enters a virtual try-on basket prepared for every virtual try-on scene, and the management of the virtually tried-on commodity and the information of the corresponding user is realized by managing the information concerning the try-on basket.

FIG. 4 shows an example of the basket management table. The example of the basket management table shown in FIG. 4 includes a column 400 of basket IDs, a column 402 of names, a column 404 of creator IDs, a column 406 of creation dates, a column 408 of expiration dates, a column 410 of screen URLs (Uniform Resource Locator) (directory), a column 412 for indicating the distinction between an individual and a group, and a column 414 of numbers of user entries.

Information of respective baskets, that is, respective virtual try-on scenes is stored in this table. In the case where an operation for newly setting a virtual try-on scene is performed by a user, a record is added to this table. A unique ID generated by the ASP server 5 is registered in the column 400 of the basket IDs, and the record is specified by a value in the column 400 of the basket IDs. A name of a basket is registered in the column 402 of the names. In the case of a private basket, a name of a creator is registered, and in the case of a group basket, a group name is registered. A user ID of a user performing an operation for creating a basket is registered in the column 404 of the creator IDs, and this user becomes an administrator of the basket. A date when a basket is generated is registered in the column 406 of the creation dates, and a date, which becomes an expiration date of a basket is registered in the column 408 of the expiration dates. When this date has come, the record is deleted to erase the virtual basket. In the example of FIG. 4, although data in which the basket is effective for one year is registered, the expiration date of the basket may be longer or shorter. Also, the expiration date may be changed for every basket. Information for browsing a virtual try-on screen by a Web browser is registered in the column 410 of the screen URLs (directory). Information registered here is a part of the URL (directory common to the same group), and the URL actually used by a user is separately generated for each user by using the directory information. A value indicating that the basket is used by one person (that is, an individual) or plural persons (that is, a group) is registered in the column 412 for indicating the distinction between the individual and the group. The number of persons using the basket is registered in the column 414 of the numbers of the user entries. One basket creator is first registered, and when a user using the basket is registered, the number is increased one by one. The position, size and the like of a person (that is, a user image) when a virtual try-on screen is displayed, are determined on the basis of these numerical values.

FIG. 5 shows an example of the user entry table. The example of the user entry table shown in FIG. 5 includes a column 500 of basket IDs, a column 502 of user IDs, a column 504 of user names, a column 506 of E-mail addresses, a column 508 of entry creation dates, a column 510 of sharing conditions, and a column 512 of numbers of try-on entries. This table stores information as to which user uses which basket. In the case where a user is registered as a user of a basket, a record is added to this table. While there is also a case where one user uses plural baskets, one basket is associated with users, the number of which is indicated by a value in the column 412 of the numbers of user entries in the basket management table (FIG. 4) described above. Thus, a record is specified by a value in the column 500 of the basket IDs and a value in the column 502 of the user IDs. Since a private basket has a one-to-one relation to a user, it is not registered in this table, however, it may be registered similarly to a group basket.

A name of a user is registered in the column 504 of the user names, and although it is used at the time of display of the virtual try-on screen, it may be normalized and may be derived from the user management table (FIG. 3). An e-mail address of a user is registered in the column 506 of the E-mail addresses, and a date when a user is registered as a user of a basket, that is, a creation date of the record is registered in the column 508 of the entry creation dates. In accordance with the record addition of this table, a value in the column 412 of the numbers of the user entries for the corresponding basket (record) of the basket management table (FIG. 4) is increased. In the column 510 of the sharing conditions, although the details are described later, values indicating conditions under which the respective users use baskets, such as a range in which the personal image is allowed to be seen by the other users, or a try-on operation by the other users, are registered. The number of commodities on which each user is virtually trying is registered in the column 512 of the numbers of the try-on entries.

FIG. 6 shows an example of the try-on entry table. The example of the try-on entry table shown in FIG. 6 includes a column 600 of basket IDs, a column 602 of item numbers (NO.), a column 604 of user IDs, a column 606 of try-on parts, a column 608 of commodity information, a column 610 of shopping site codes, a column 612 of commodity codes, a column 614 of commodity types, a column 616 of image data, and a column 618 of purchase statuses. This table stores information as to which user using which basket virtually tries on what commodity. A record is generated when a user performs virtual try-on, and is specified by a value in the column 600 of the basket IDs and a value in the column 602 of the item numbers (NO.). A number generated by the ASP server 5 is registered in the column 602 of the item numbers (NO.) so that it becomes unique in the basket.

An ID of a user virtually trying on a commodity is registered in the column 604 of the user IDs, and information indicating that virtual try-on is performed to which part of a body of a user is registered in the column 606 of the try-on parts. A commodity name is registered in the column 608 of the commodity information and is used at the time of display of a virtual try-on scene. However, it may be normalized and may be derived from the commodity management table (FIG. 2). Codes for specifying commodities are registered in the column 610 of the shopping site codes, the column 612 of the commodity codes, and the column 614 of the commodity types. Although an image of a commodity displayed on a virtual try-on screen is registered in the column 616 of the image data, similarly to the column 608 of the commodity information, it may be normalized. A value indicating whether or not a virtually tried-on commodity is already purchased is registered in the column 618 of the purchase statuses. That is, even if a commodity in a basket is purchased, the commodity is not taken out from the basket. When it is compared to actual shopping, its mode is such that a sample of a commodity is taken to a cashier and is purchased. The sample in the actual shopping can be repeatedly used, and similarly, a virtual tried-on commodity can be purchased any number of times.

FIG. 7 shows an example of the purchase management table. The example of the purchase management table shown in FIG. 7 includes a column 700 of basket IDs, a column 702 of item numbers (NO.), a column 704 of commodity unit prices, a column 706 of quantities, a column 708 of total sums, a column 710 of cumulative totals of the payment registered sum, a column 712 of user IDs of the payment input person, a column 714 of input sums, a column 716 of payment methods, a column 718 of input dates, a column 720 of delivery destination zip codes, a column 722 of delivery destination addresses, a column 724 of receiver names, and a column 726 of sum statuses. Information concerning the purchase (that is, price payment registration) of a commodity, which is virtually tried on, is stored in this table. In the case where a user performs price payment registration of a commodity on which the user himself/ herself or another user virtually tries, a record is added to this table. A price payment is not necessarily made for a certain commodity by one user only once, and there is also a case where the payment is made by plural users each determining a payment sum. Thus, history data of price payment registration is registered in this table, and a main key for specifying a record does not exist. In the case where it is sufficient if reference can be made to only the newest data, a record may be overwritten, and the column 700 of the basket IDs and the column 702 of the item numbers (NO.) may be made main keys.

A unit price of a commodity for which a user has performed price payment registration is registered in the column 704 of the commodity unit prices. The number of commodities is registered in the column 706 of the quantities, and a value obtained by multiplying a value in the column 704 of the commodity unit prices by a value in the column 706 of the quantities is registered in the column 708 of the total sums. That is, this value becomes the order sum of the commodity. The accumulating total of sums in price payment registration made by one or plural users for the commodity are registered in the column 710 of the cumulative totals of the payment registered sum. For example, with respect to the purchase of a certain commodity, first, in the case where a first user performs price payment registration of one thousand yen, a record is added to this table, and a value of "1,000" is registered in the column 710 of the cumulative totals of the payment registered sum of the record. Next, in the case where a second user performs price payment registration of two thousand yen for the purchase of the same commodity, a record is further added to this table, and a value of "3,000" is registered in the column 710 of the cumulative totals of the payment registered sum of the record.

An ID of a user performing the price payment registration is registered in the column 712 of the user IDs of the payment input person, and the sum to be paid by the user through the price payment registration is registered in the column 714 of the input sums. A price payment method, such as a credit card or bank transfer, is registered in the column 716 of the payment methods, and a date when price payment registration is made is registered in the column 718 of the input dates. With respect to the price payment by plural users, in the case where a period in which price payment registration is received is set, the time limit of the price payment registration is set on the basis of a value in the column 718 of the input dates at the record concerning the first price payment registration.

A zip code and an address as a delivery destination of a commodity, and a name of a receiver are registered in the column 720 of the deliver destination zip codes, the column 722 of the deliver destination addresses, and the column 724 of the receiver names. For example, in the case where price payment by plural users is performed, these values are registered at the time of the first price payment registration. By this, another user can know that the price payment registration is started for whom, and it is possible to judge whether or not price payment registration should be additionally performed. A value indicating whether or not a value in the column 710 of the cumulative totals of the payment registered sum reaches a value in the column 708 of the total sums is registered in the column 726 of the sum statuses. In this example of this table, in the case where a value in the column 710 of the cumulative totals of the payment registered sum reaches a value in the column 708 of the total sums, "order enabled" is registered, and in the case where it does not yet reach, "insufficient sum" is registered. In this embodiment, an order processing is performed for a commodity for which a value in the column 726 of the sum statuses is "order enabled". In the case where the order processing is performed, a processing such as to delete or invalidate a corresponding record is performed.

FIG. 8 shows an example of the order table. The example of the order table shown in FIG. 8 includes a column 800 of order numbers, a column 802 of order dates, a column 804 of shopping site codes, a column 806 of commodity codes, a column 808 of commodity types, a column 810 of quantities, a column 812 of C.O.D sums, a column 814 of delivery destination zip codes, a column 816 of delivery destination addresses, and a column 818 of receiver names. Information relating to an ordered commodity and a delivery destination of the commodity are stored in this table. In the case where an order for a commodity is given to a manufacturer or a shopping site, a record is added to this table, and the record is specified by a value in the column 800 of the order numbers as a main key.

A date when an order is given is registered in the column 802 of the order dates. Values (i.e. codes) for specifying the ordered commodity (i.e. commodity to be delivered) are registered in the column 804 of the shopping site codes, the column 806 of the commodity codes, and the column 808 of the commodity types. The number of commodities to be delivered is registered in the column 810 of the quantities. In the case where a price payment method is "cash on delivery", the sum to be received at the time of delivery is registered in the column 812 of the C.O.D sums. A zip code and an address as a delivery destination of a commodity and a name of a receiver are registered in the column 814 of the delivery destination zip codes, the column 816 of the delivery destination addresses, and the column 818 of the receiver names. For example, as in the purchase of a present, even in the case where a receiver does not perform a commodity purchase processing, when the payment method is registered as "cash on delivery", the receiver is charged. Thus, when the price payment registration is received, in the case where a user performing the price payment registration and a receiver of the commodity are different persons, "cash on delivery" may not be able to be selected as the price payment method.

Next, a screen transition of the system shown in FIG. 1 will be described by using FIGS. 9 and 10. Screens (i.e. screen names) surrounded by dotted lines in these drawings express screens managed by a server other than the ASP server 5. Screens surrounded by solid lines with shadows express screens displayed as main screens on a browser, and screens surrounded by normal solid lines express pup-up display screens as sub-screens. Since the details of configurations of the respective screens and processes are described later, here, the total transition of the screens will be described. It is assumed that data (for example, HTML (Hyper Text Markup Language) files and image files simultaneously displayed) for each screen is generated by a server such as the ASP server 5, is transmitted to, for example, the user terminal A (3) or the user terminal B (7), and is displayed on a screen by the browser of the user terminal A (3) or the user terminal B (7).

Figure 12:
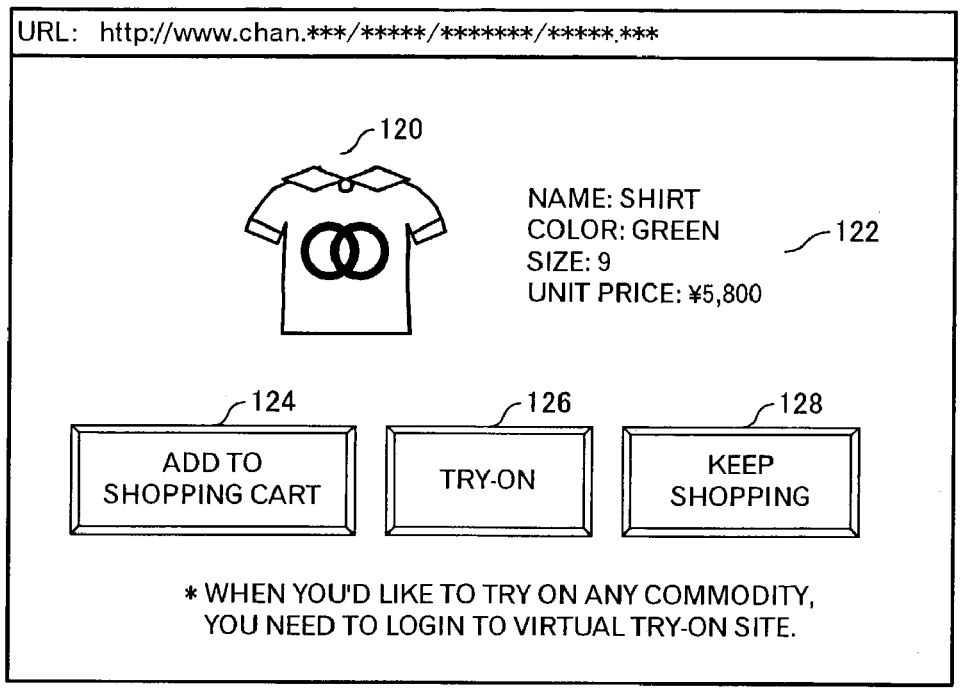
FIG. 12 is a drawing showing an example of a selected commodity display page.
Figure 14:
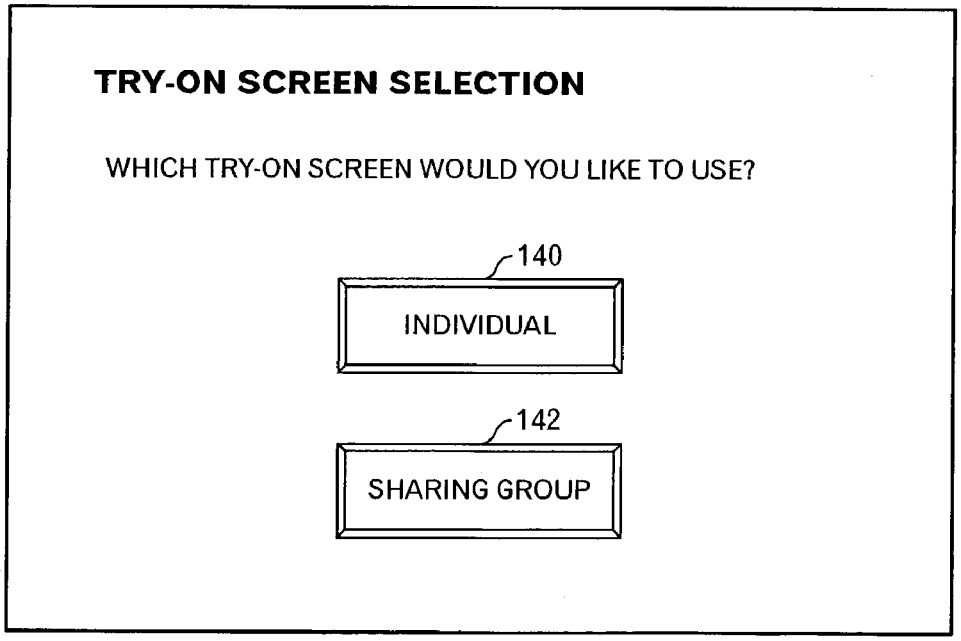
FIG. 14 is a drawing showing an example of a try-on screen selection page.

First, on a commodity selection screen (P900: FIG. 12) on a shopping site, a selection and virtual try-on (hereinafter referred to as try-on) operation for a commodity is received. For example, in the case where the shopping site A server 9 or the shopping site B server 11 receives operation input data from a user terminal, the processing proceeds to one in the ASP server 5. The ASP server 5 causes a login screen (P902) to be displayed in order to specify a user. In the case where the login processing is ended, a screen (P904: FIG. 14) for causing to select a try-on screen is displayed. This screen has such a structure as to prompt a user to select a try-on operation performed on the try-on screen for an individual or a try-on operation performed on the try-on screen for plural persons (that is, sharing group).

Figure 10:
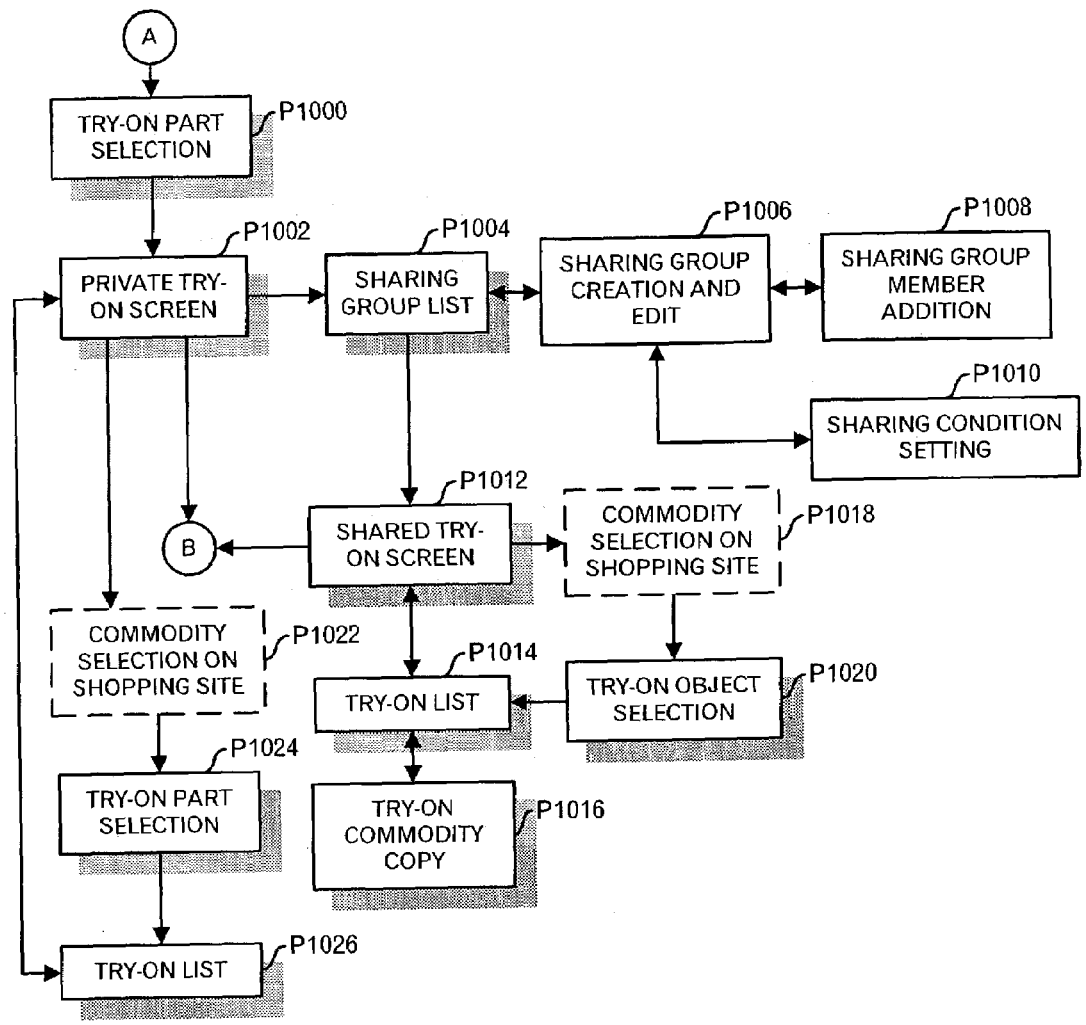
FIG. 10 is a drawing showing a second portion of the screen transition in the embodiment of the invention.
Figure 16:
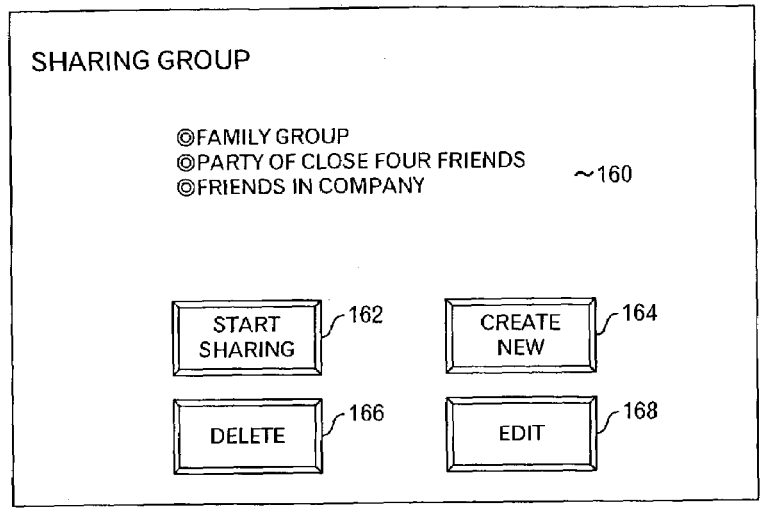
FIG. 16 is a drawing showing an example of a sharing group list page.
Figure 18:
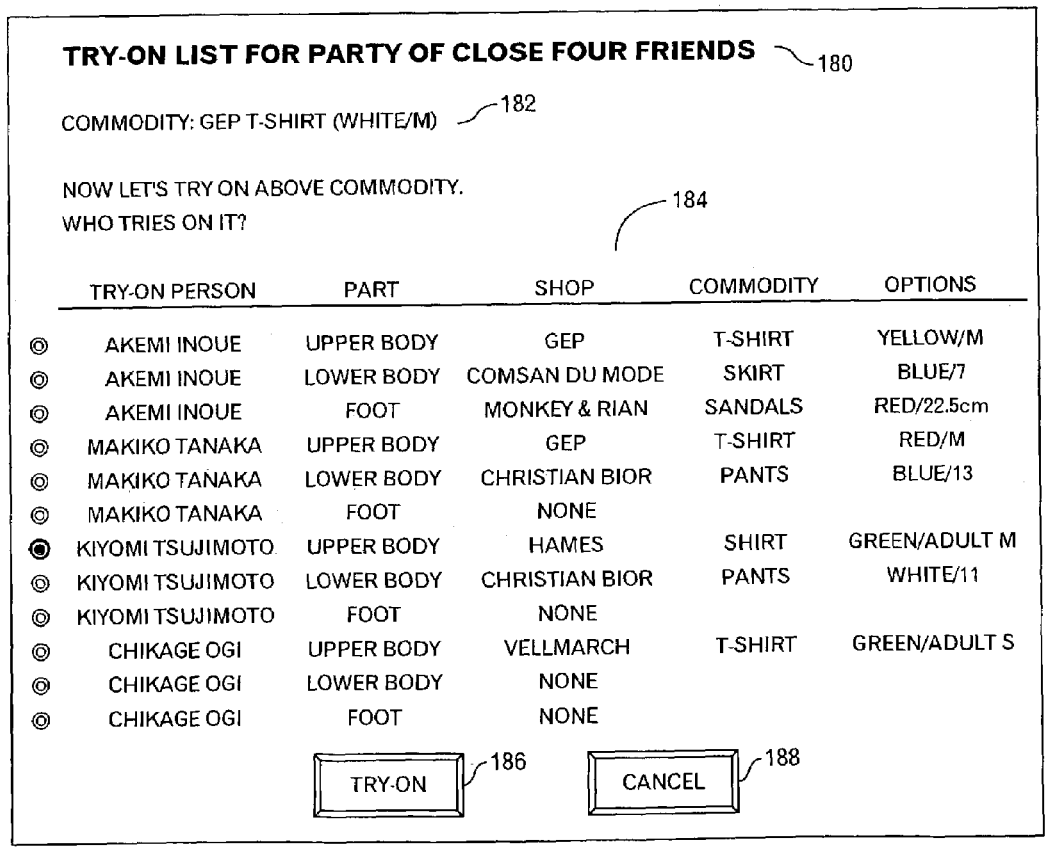
FIG. 18 is a drawing showing an example of a try-on person selection page.
Figure 22:
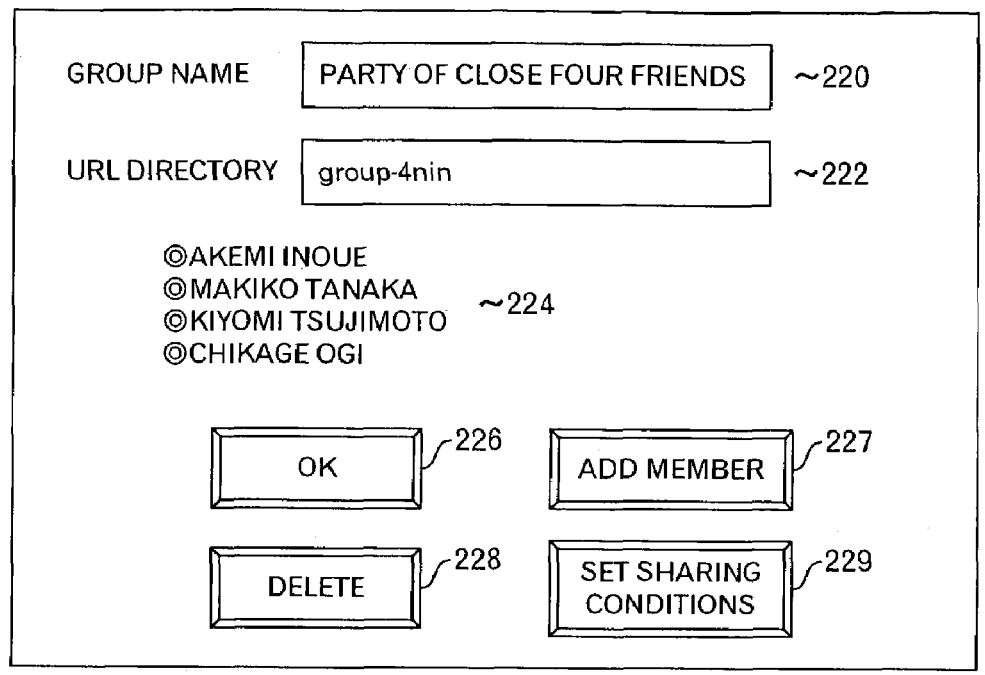
FIG. 22 is a drawing showing an example of a sharing group creation and edit page.
Figure 24:
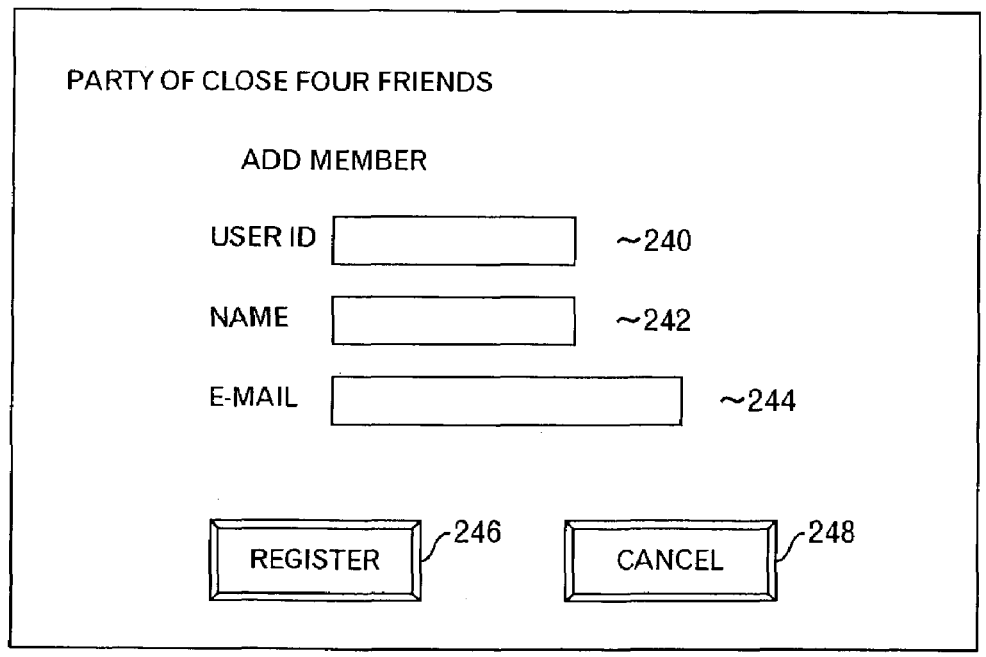
FIG. 24 is a drawing showing an example of a sharing group member addition page.

In the case where the user selects the try-on screen for the individual, the processing proceeds to a screen transition of FIG. 10 through terminal A. In the case where the user selects the try-on screen for the sharing group, a sharing group list screen (P906: FIG. 16) is displayed. From the sharing group list screen (P906), a user can shift to a sharing group creation and edit screen (P908: FIG. 22), and can further shift to a sharing group member addition screen (P910: FIG. 24) or a sharing condition setting screen (P912; FIG. 26). In the case where a user selects a sharing group among sharing groups displayed by a list on the sharing group list screen (P906), a try-on object (part) selection screen (P914: FIG. 18) is displayed. This screen prompts the user to select a user in the group and his or her part (for example, the upper body, etc.) to which a selected commodity is tried on. In the case where a try-on object (part) is selected and inputted, a shared try-on screen (P916: FIG. 18) is displayed. Here, data of the selected commodity is associated with the part of the user performing try-on, and an image in which try-on is completed is displayed on the screen. The user may adjust a try-on state of the commodity tried on.

The shared try-on screen (P916) includes a "select other commodity" button, a "try-on list" button, a "share screen" button, a "buy" button, and an "end" button. In the case where the "select other commodity" button is pressed, the processing proceeds to a server of a shopping site, and a commodity selection screen (P918) is displayed. This commodity selection screen on the shopping site may be the same as the screen P900 or may be a screen of another shopping site. When the user makes a selection of a commodity and performs a try-on operation, the try-on object (part) selection screen (P914) is again displayed and it prompts the user to select a user and his or her part to which the selected commodity is tried on.

In the case where the "try-on list" button is pressed on the shared try-on screen (P916), a try-on list screen (P920: FIG. 30) is displayed. This screen includes a list indicating which user tries on what commodity to which part. In the case where a line of the list (a part of a user and a commodity) is selected and a "copy tried-on commodity" button is pressed, the processing proceeds to a tried-on commodity copy screen (P922: FIG. 35). The tried-on commodity copy screen (P922) includes a list of users, and in the case where selection input of a user who is made to try on the same commodity is performed, the try-on list screen (P920) is again displayed. Here, a list reflecting the try-on (i.e. copy of commodity) for the selected user is displayed.

In the case where the "share screen" button is pressed on the shared try-on screen (P916), the processing returns to the sharing group list screen (P906), and a selection of a sharing group and/or an operation of creation, edit, or the like are received.

In the case where the "end" button is pressed on the shared try-on screen (P916), the try-on state is saved, and the processing is ended. A screen for causing a selection as to whether saving should be performed may be displayed, and a corresponding processing may be performed in accordance with an input of the user.

In the case where the "buy" button is pressed on the shared try-on screen (P916), a purchasing try-on list screen (P924: FIG. 39) is displayed. This screen includes, as a list, try-on states and sums of commodities tried on, and includes a "check out for respective try-on persons" button and a "check out" button (or link) for each commodity.

In the case where the "check out for respective try-on persons" button is pressed, a paid try-on person selection screen (P926: FIG. 51) is displayed. This screen prompts a user to select a user (that is, try-on person) for whom the former user considers to settle the account. In the case where the selection input for the try-on person is performed, a "payment for selected try-on person" screen (P928: FIG. 53) is displayed. This screen includes information of the tried-on commodity of the selected try-on person, and the user can input quantity etc. The "payment for selected try-on person" screen (P928) includes a "register payment" button, and in the case where the user presses the "register payment" button, a "payment registration for selected try-on person" screen (P930: FIG. 55) is displayed. On this screen, the input of a payment method, a delivery destination of a commodity and the like is accepted, and in the case where the "order" button is pressed, a "payment confirmation for selected try-on person" screen (P932: FIG. 56) indicating that payment registration is received is displayed.

Figure 42:
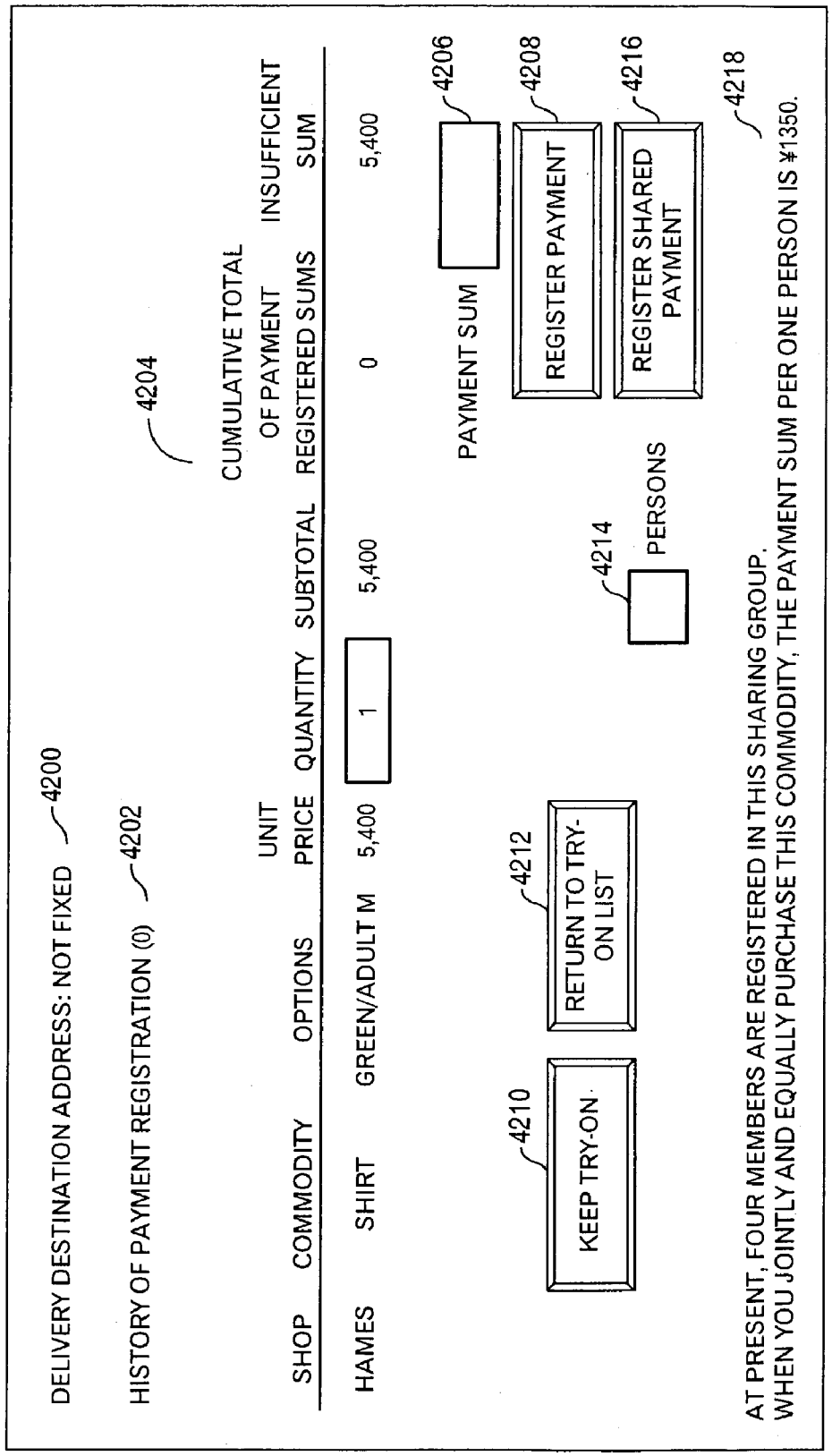
FIG. 42 is a drawing showing a first example of a "payment for selected commodity" page.

In the case where the "check out" button (or link) for each commodity is pressed on the purchasing try-on list screen (P924), a "payment for selected commodity" screen (P934) of the selected commodity is displayed. This screen includes information such as the price of the selected commodity, and the user can input quantity etc. The "payment for selected commodity" screen (P934: FIG. 42) includes a "register payment" button, and in the case where the user presses the "register payment" button, a "payment registration for selected commodity" screen (P936: FIG. 44) is displayed. On this screen, the input of a payment method, a delivery destination of a commodity, and the like is accepted, and in the case where the "order" button is pressed, a "payment confirmation for selected commodity" screen (P938: FIG. 45) indicating that the payment registration is received is displayed.

Figures 58, 59:
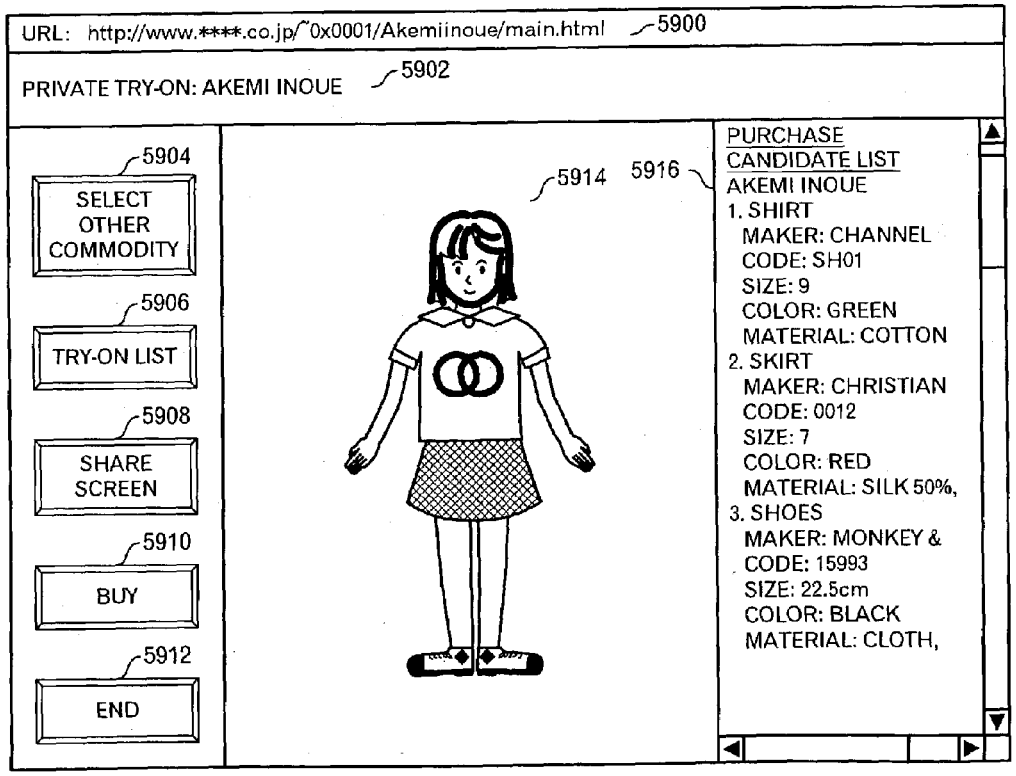
FIG. 58 is a drawing showing an example of a try-on part selection page.
FIG. 59 is a drawing showing an example of a private try-on page.

Next, by using FIG. 10, a screen transition subsequent to the shift through the terminal A will be described. In the case where the user selects the private try-on screen on the screen (P904 in FIG. 9) for causing to select the try-on screen, a try-on part selection screen (P1000: FIG. 58) is displayed. In the case where selection input is performed to specify a part to which the selected commodity is made to be tried on, a private try-on screen (P1002: FIG. 59) is displayed. Here, the try-on part is associated with the data of the selected commodity, and an image in which try-on is completed may be displayed on the screen. Also, the user may adjust the try-on state of the commodity tried on.

The private try-on screen (P1002) includes a "select other commodity" button, a "try-on list" button, a "share screen" button, a "buy" button, and an "end" button. In the case where the "select other commodity" button is pressed, the processing proceeds to processing in a server of a shopping site, and a commodity selection screen (P1022) is displayed. This commodity selection screen on the shopping site may be the same as the screen P900 (FIG. 9) or a screen of another shopping site. When the user makes a selection of a commodity and an input of a try-on operation, the try-on part selection screen (P1024) is again displayed and prompts the user to select a part to which the selected commodity is tried on.

In the case where the selection input of the try-on part is made on the try-on part selection screen (P1024), or in the case where the "try-on list" button is pressed on the private try-on screen (P1002), a try-on list screen (P1026: FIG. 61) is displayed. This screen includes a list as to what commodity is tried on to which part.

In the case where the "share screen" button is pressed on the private try-on screen (P1002), a sharing group list screen (P1004) is displayed. From the sharing group list screen (P1004), the screen shifts to a sharing group creation and edit screen (P1006), and can further shift to a sharing group member addition screen (P1008) and a sharing condition setting screen (P1010). In the case where the user selects a sharing group among sharing groups shown in a list on the sharing group list screen (P1004), a shared try-on screen (P1012) is displayed. This screen has the same configuration as the shared try-on screen P916 (FIG. 9), and when the "select other commodity" button is pressed, the processing proceeds to a commodity selection screen (P1018) on a shopping site. When the user makes a selection of a commodity and an input of a try-on operation, a try-on object (part) selection screen (P1020) is displayed and prompts the user to select a user and his or her part to which the selected commodity is tried on.

In the case where the "try-on list" button is pressed on the shared try-on screen (P1012), a try-on list screen (P1014) is displayed. This screen includes a list as to which user tries on what commodity to which part. In the case where a line (a part of a user and a commodity) of the list is selected and the "copy tried-on commodity" button is pressed, the screen shifts to a tried-on commodity copy screen (P1016). The tried-on commodity copy screen (P1016) includes a list of users, and in the case where an operation of selecting a user who is made to try on the same commodity is received, the try-on list screen (P1014) is again displayed. Here, a list reflecting the try-on (i.e. copy of the commodity) for the selected user is displayed.

In the case where the "end" button is pressed on the private try-on screen (P1002) or the shared try-on screen (P1012), a try-on state is saved and the processing is ended. Similarly to the above, a screen for causing a selection as to whether saving should be performed may be displayed, and a processing may be performed in accordance with the user's instruction.

In the case where the "buy" button is pressed on the private try-on screen (P1002) or the shared try-on screen (P1012), the screen shifts to the purchasing try-on list screen (P924) (FIG. 9) through terminal B.

Figure 11:
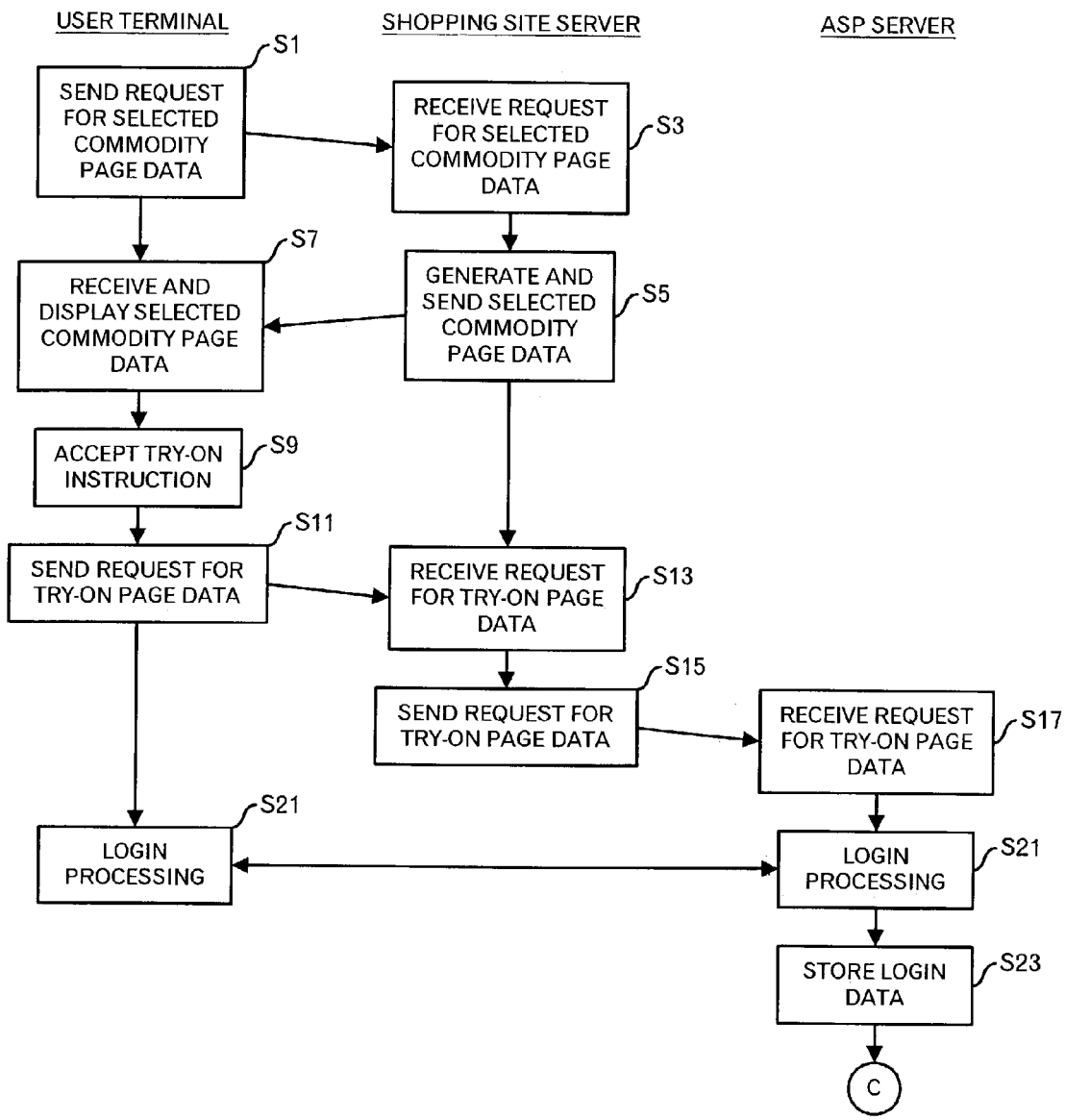
FIG. 11 is a drawing showing a first portion of a processing flow in the embodiment of the invention.

Next, the operation of the system shown in FIG. 1 will be described by using FIGS. 11 to 62.

In on-line shopping, a user operates, for example, the user terminal A (3) (or the user terminal B (7)), and selects a commodity as a purchase candidate. The user terminal A (3) having accepted the commodity selection operation transmits a request for selected commodity page data to, for example, the shopping site A server (9) (or the shopping site B server (11)) (step S1). The shopping site A server (9) receives the request for the selected commodity page data from the user terminal A (3) (step S3), and stores, for example, a commodity number and a commodity type into a storage device. The shopping site A server (9) uses the commodity number and the commodity type to search the commodity DB 91, and on the basis of the result, generates the selected commodity page data and transmits it to the user terminal A (3) (step S5). The user terminal A (3) receives the selected commodity page data from the shopping site A server (9), and displays it on a display device (step S7).

FIG. 12 shows an example of a selected commodity page. The example of the selected commodity page shown in FIG. 12 includes a commodity image 120, commodity data 122, a "add to shopping cart" button 124, a "try-on" button 126, and a "keep shopping" button 128. The commodity image 120 is an image of a selected commodity, which is obtained by displaying a file registered in the column 212 of the image data in the commodity DB 91 (FIG. 2). The image data may include two-dimensional data or three-dimensional data.

The commodity data 122 includes, as a commodity type, a color, a size and a unit price, a value in the column 204 of the commodity information, a value in the column 206 of the colors, a value in the column 208 of the sizes, and a value in the column 214 of the unit prices in the commodity DB 91. A value in the column 210 of the materials and other data may be included.

In the case where the "add to shopping cart" button 124 is pressed by the user, the data of the commodity is stored in an on-line purchase data storage unit of the server (for example, the shopping site A server (9)) managing the homepage. That is, there occurs a state in which the commodity is added to a virtual shopping cart. In the case where the "keep shopping" button 128 is pressed by the user, the processing returns to an on-line shopping page (not shown) before the selection of the commodity. In the case where the "try-on" button 126 is pressed by the user, the processing subsequent to step S9 of FIG. 11 is performed.

The user terminal A (3) accepts a try-on instruction by the user (step S9) and transmits a request for try-on page data to the shopping site A server (9) (step S11). The shopping site A server (9) receives the request for the try-on page data from the user terminal A (3) (step S13), and stores, for example, the commodity number and the commodity type into the storage device. The shopping site A server (9) transmits the try-on page data request to the ASP server 5 (step S15). The ASP server 5 receives the try-on page data request from the shopping site A server (9), and stores the shopping site code, the commodity number, and the commodity type into the storage device (step S17).

The ASP server 5 carries out a login processing of a user by a not-shown login page or the like to identify the user (step S21). The ASP server 5 may be made to cooperate with the shopping site A server (9), and the shopping site A server (9) may receive the login of the user in advance, and may transmit the login data (for example, the user ID, etc.) to the ASP server 5 in accordance with the try-on instruction. When the login processing is completed, the ASP server 5 stores the login data into the storage device (step S23). The processing proceeds to processing of FIG. 13 through terminal C.

Next, the ASP server 5 transmits the request for the commodity data to the shopping site A server (9) (step S25). The shopping site A server (9) receives the request for the commodity data from the ASP server 5 (step S27), and stores, for example, the commodity code and the commodity type into the storage device. The shopping site A server (9) uses the commodity number and the commodity type to search the commodity DB 91, and transmits the resultant extracted commodity data to the ASP server 5 (step S29). The ASP server 5 receives the commodity data from the shopping site A server (9), and stores it into the storage device (step S31). Before the login judgment at step S19, the ASP server 5 may receive the commodity data from the shopping site A server (9).

The ASP server 5 uses the user ID previously stored in the storage device or stored in the storage device at the step S23 to perform a search processing of the basket management table (FIG. 4) in the try-on management DB 51 (step S33). As the search content, a record, which includes the ID of the login user as the creator ID is extracted. That is, the data of a try-on scene (that is, basket), which was created by the login user in the past is extracted. It is judged whether or not there is data of an existing try-on scene (step S35), and in the case where it is judged that there is no data, the processing proceeds to processing of FIG. 57 through terminal D. In the case where it is judged that there is data, the ASP server 5 generates page data for selecting the sharing group or individual, and transmits it to the user terminal A (3) (step S37). The user terminal A (3) receives the page data for selecting the sharing group or individual from the ASP server 5 and displays it on the display device (step S39).

Figure 9:
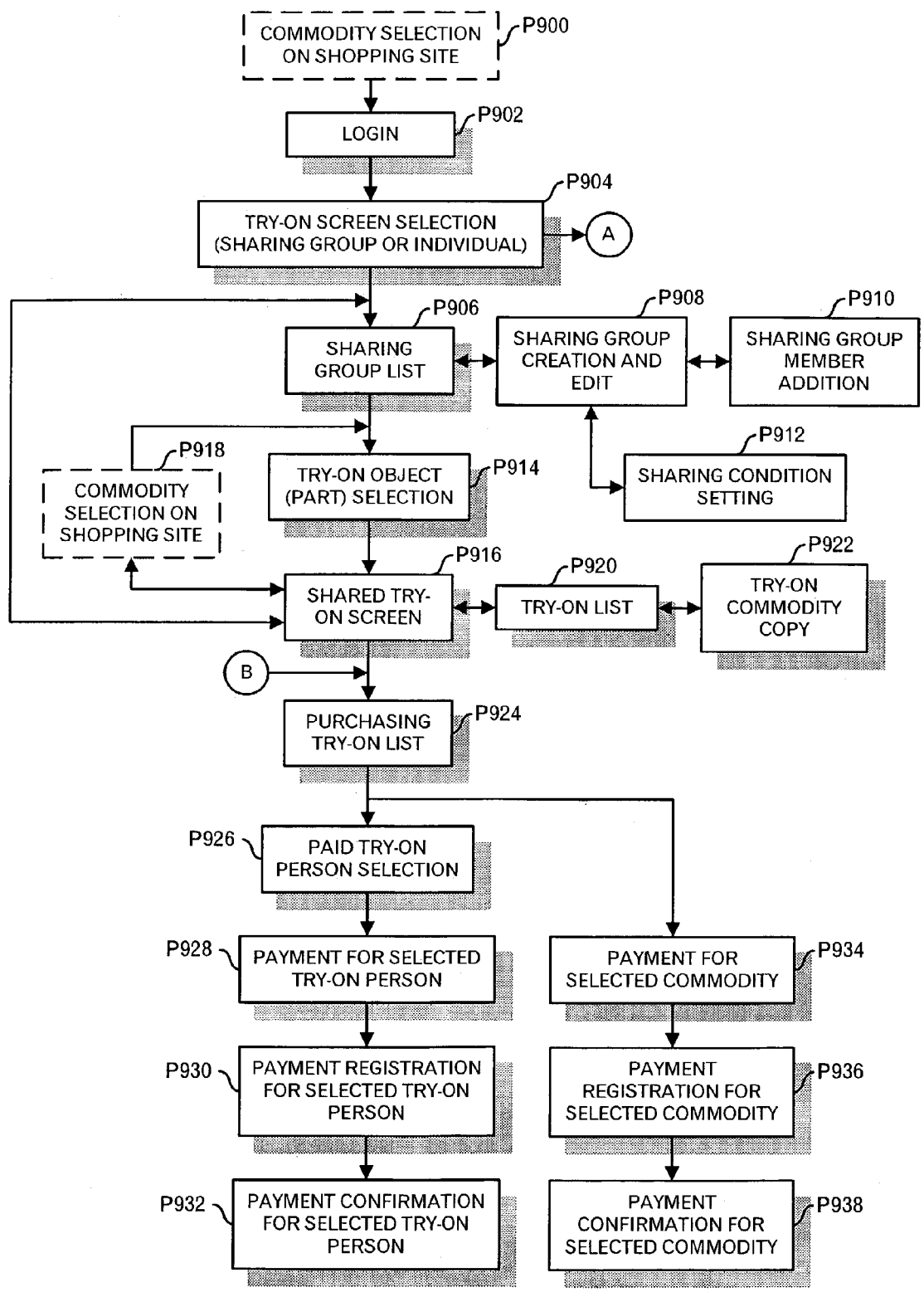
FIG. 9 is a drawing showing a first portion of a screen transition in the embodiment of the invention.

FIG. 14 shows an example of the page for selecting the sharing group or individual, which is also shown in FIG. 9 as the try-on screen selection screen P904. The example of this page shown in FIG. 14 includes an "individual" button 140 and a "sharing group" button 142. The "individual" button 140 is a button for shifting to a private try-on scene, and the "sharing group" button 142 is a button for shifting to a sharing group try-on scene for performing try-on by plural persons. In this embodiment, since the private try-on scene is first generated, and then, the sharing group try-on scene is generated, there is a case where only the private try-on scene is registered, and the sharing group try-on scene is not registered. In such a case, the color of the "sharing group" button 142 is displayed to be thin (gray out), and any processing is not made to be performed even if it is pressed. Also, the "sharing group" button 142 may not be displayed at such a case.

Figure 13:
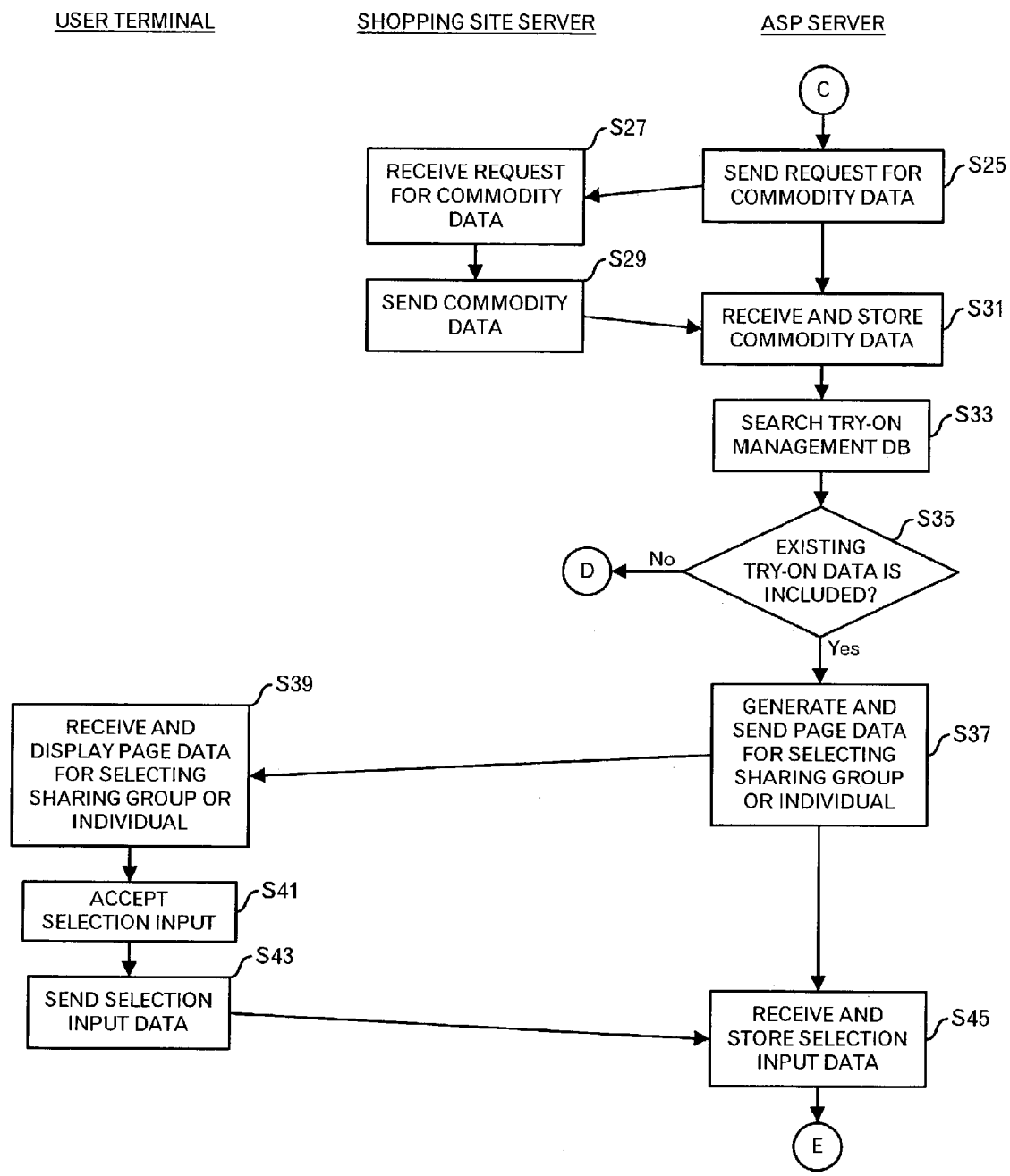
FIG. 13 is a drawing showing a second portion of the processing flow in the embodiment of the invention.

Returning to the processing flow of FIG. 13, the user terminal A (3) accepts selection input (individual or sharing group) from the user (step S41). The user terminal A (3) transmits the selection input data received from the user to the ASP server 5 (step S43). The ASP server 5 receives the selection input data from the user terminal A (3), and stores it into the storage device (step S45). The processing proceeds to processing of FIG. 15 through terminal E.

The ASP server 5 judges whether or not the received selection input data is the selection of the sharing group (step S47). That is, it is judged whether or not the "sharing group" button 142 is pressed on the page for selecting the sharing group or individual (FIG. 14). In the case where it is judged that it is not the selection of the sharing group, the processing proceeds to processing of FIG. 57 through terminal F. In the case where it is judged that it is the selection of the sharing group, the ASP server 5 uses the data extracted at the step S33 to generate the sharing group list page data, and transmits it to the user terminal A (3) (step S49). The user terminal A (3) receives the sharing group list page data from the ASP server 5 and displays it on the display device (step S51).

FIG. 16 shows an example of a sharing group list page. The example of the sharing group list page shown in FIG. 16 includes a sharing group list 160, a "start sharing" button 162, a "create new" button 164, a "delete" button 166, and an "edit" button 168. The sharing group list 160 includes names of the sharing groups in which a login user is an administrator, and any one of the names can be selected by a radio button. In the case where one sharing group is selected from the sharing group list 160 and the "start sharing" button 162 is pressed, an instruction to start a sharing try-on processing in the sharing group is resultantly selected and inputted by the user.

In the case where the "create new" button 164 is pressed, an instruction to create a new sharing group is resultantly selected and inputted by the user. In the case where one sharing group is selected from the sharing group list 160 and the "delete" button 166 is pressed, an instruction to delete the registration of the sharing group is resultantly selected and inputted by the user, and similarly, in the case where the "edit" button 168 is pressed, an instruction to change information of the sharing group is resultantly selected and inputted by the user.

Figure 15:
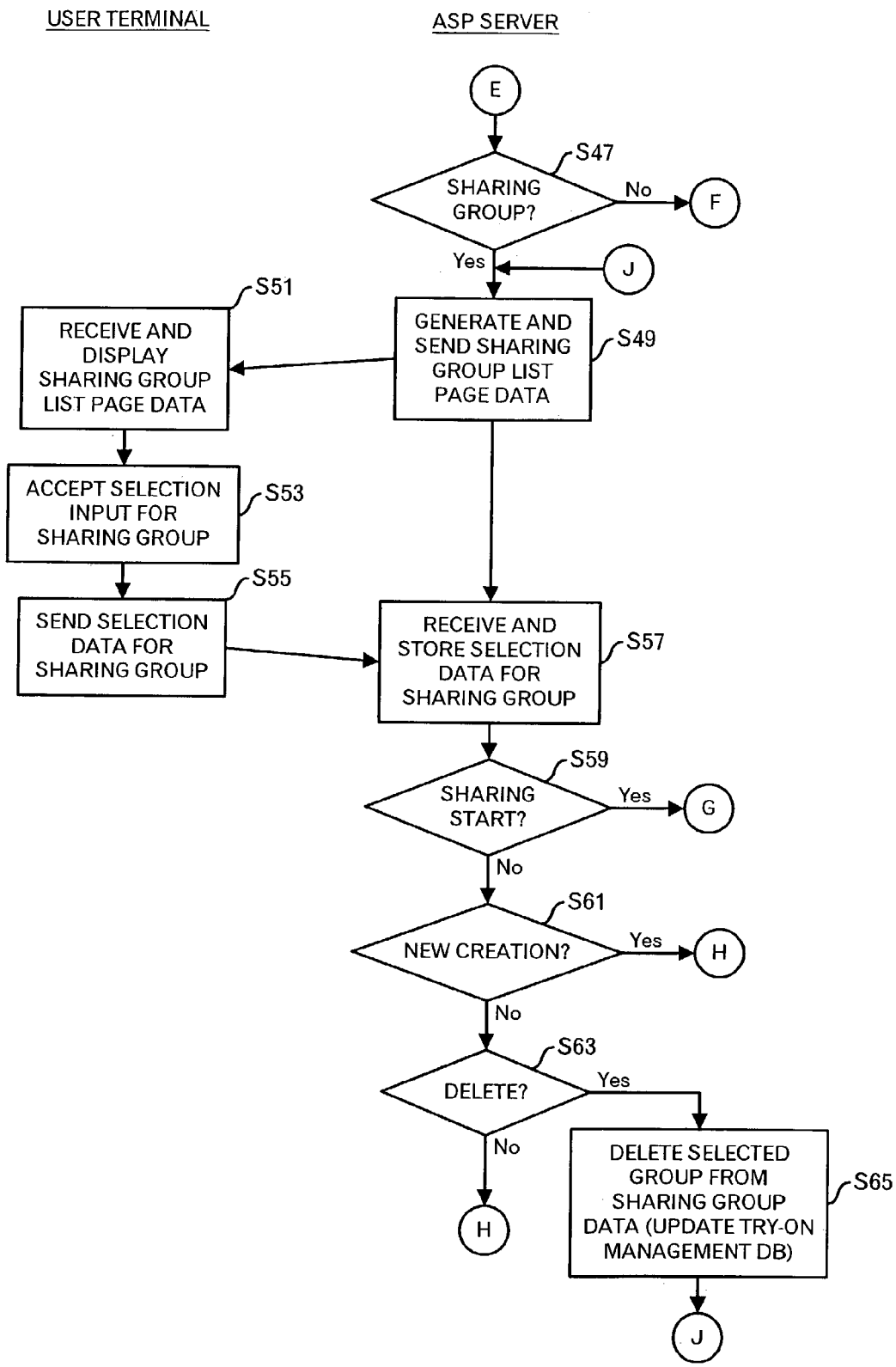
FIG. 15 is a drawing showing a third portion of the processing flow in the embodiment of the invention.

Returning to the processing flow of FIG. 15, the user terminal A (3) accepts the selection input by the user on the sharing group list page (FIG. 16) (step S53), and transmits the received selection data to the ASP server 5 (step S55). The ASP server 5 receives the selection data from the user terminal A (3) and stores it into the storage device (step S57). The ASP server 5 makes following judgments as to the instruction of the user on the basis of the received selection data. First, it is judged whether or not the instruction is sharing start, that is, whether or not one sharing group is selected from the sharing group list 160 on the sharing group list page (FIG. 16) and the "start sharing" button 162 is pressed (step S59). In the case where it is judged that it is the sharing start, the processing proceeds to processing of FIG. 17 through terminal G.

In the case where it is judged that it is not the sharing start, it is judged whether or not the instruction is new creation, that is, whether or not the "create new" button 164 is pressed on the sharing group list page (FIG. 16) (step S61). In the case where it is judged that it is the new creation, the processing proceeds to processing of FIG. 21 through terminal H.

In the case where it is judged that it is not the new creation, it is judged whether or not the instruction is deletion, that is, whether or not one sharing group is selected from the sharing group list 160 on the sharing group list page (FIG. 16) and the "delete" button 164 is pressed (step S63). In the case where it is judged that it is not the deletion, it is a case of the edit of the selected sharing group, and the processing proceeds to processing of FIG. 21 through terminal H.

In the case where it is judged that it is the deletion, the selected sharing group is deleted from the sharing group data. That is, the corresponding record is deleted from the try-on management DB 51. There is a case where a relation such as a parent-child relationship is set in the basket management table (FIG. 4), the user entry table (FIG. 5), the try-on entry table (FIG. 6), and the purchase management table (FIG. 7), and at the time of the record deletion, it is necessary to delete corresponding records as well so as not to cause inconsistency.

In this embodiment, in the respective tables, all records including the same basket ID as the basket ID of the sharing group to be deleted have only to be deleted. In the case of deletion, although not shown, a reconfirmation page may be displayed, and reconfirmation may be asked for the user. After the end of the deletion processing, the processing returns to the step S49 through terminal J. That is, after the result of the deletion processing is reflected, generation and transmission of the sharing group list page data is performed.

By using FIG. 17, a description will be given of a processing (processing subsequent to the terminal G) in the case where it is judged at the step S59 that it is the sharing start. The ASP server 5 generates try-on person selection page data and transmits it to the user terminal A (3) (step S67). The user terminal A (3) receives the try-on person selection page data from the ASP server 5 and displays it on the display device (step S69).

FIG. 18 shows an example of a try-on person selection page. The example of the try-on person selection page shown in FIG. 18 includes a try-on list name 180 (here, sharing group name), commodity information 182, a try-on list 184, a "try-on" button 186 and a "cancel" button 188. The try-on list (i.e. sharing group) name 180 shows a name of the sharing group selected by the user at the step S53. The commodity information 182 includes information of a commodity to be tried on, such as a name of a manufacturer or a shop, and a commodity type.

The try-on list 184 includes a try-on person name, a part, a shop, a commodity and an option, and shows list information to indicate what commodity (such as yellow M-size T-shirt, or the like) of what place (e.g. shop) is tried on to which part (such as upper body, or the like) of which person (i.e. which user). Each line can be selected by a radio button. In the case where a line is selected and the "try-on" button 186 is pressed, a try-on instruction is resultantly selected and inputted by the user. In the case where the "cancel" button 188 is pressed, the processing may return to the display of the sharing group list page (FIG. 16) or may proceed to the next without causing anyone to perform try-on. Also, a setting may be made such that a T-shirt can not be tried on to the lower body.

Figure 17:
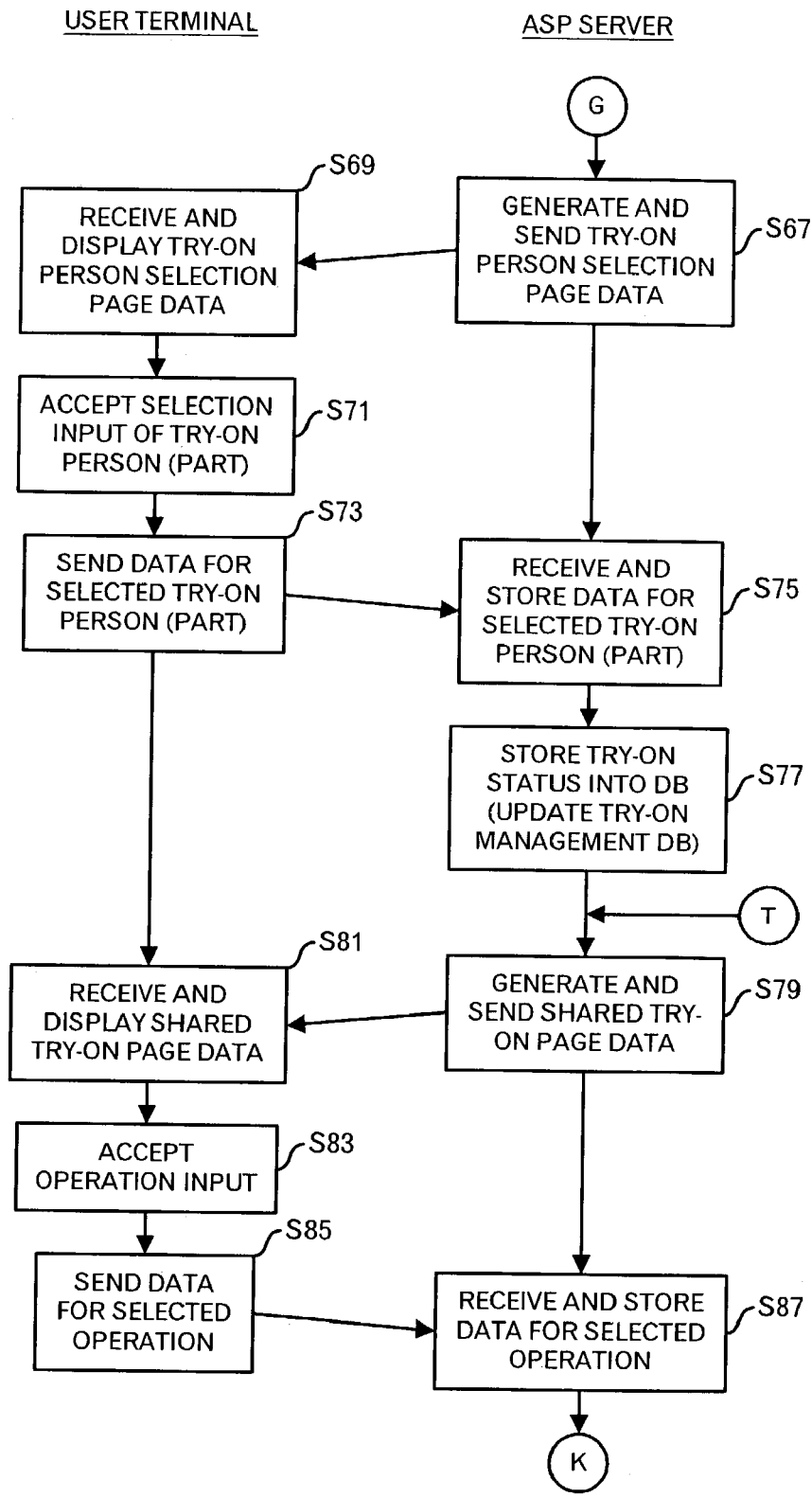
FIG. 17 is a drawing showing a fourth portion of the processing flow in the embodiment of the invention.

Returning to the processing flow of FIG. 17, the user terminal A (3) accepts a try-on person (here, part) selection input by the user (step S71), and the user terminal A (3) transmits data of the selected try-on person (here, part) to the ASP server 5 (step S73). The ASP server 5 receives the data of the selected try-on person (here, part) from the user terminal A (3) and temporarily stores it into the storage device (step S75).

Further, the ASP server 5 uses the received data to update the try-on entry table (FIG. 6) in the try-on management DB 51 (step S77). At this time, in the case where it is necessary to keep consistency with the purchase management table (FIG. 7) (for example, in the case where a commodity for which try-on is stopped is not purchased), if there is a record (that is, a record whose value of the basket ID and value of the item number (No.) are the same as ones of a record updated in the try-on entry table) of the purchase management table corresponding to a record updated (erased by overwriting) in the try-on entry table, it is deleted.

In the case where try-on is performed to a part to which try-on has not been performed, a record is added to the try-on entry table, and a value in the column 512 of the numbers of try-on entries for the corresponding record (that is, specified by the basket ID and the user ID) in the user entry table (FIG. 5) is incremented by one.

After the end of the DB update processing, the ASP server 5 generates shared try-on page data and transmits it to the user terminal A (3) (step S79). The user terminal A (3) receives the shared try-on page data from the ASP server 5 and displays it on the display device (step S81).

Figure 19:
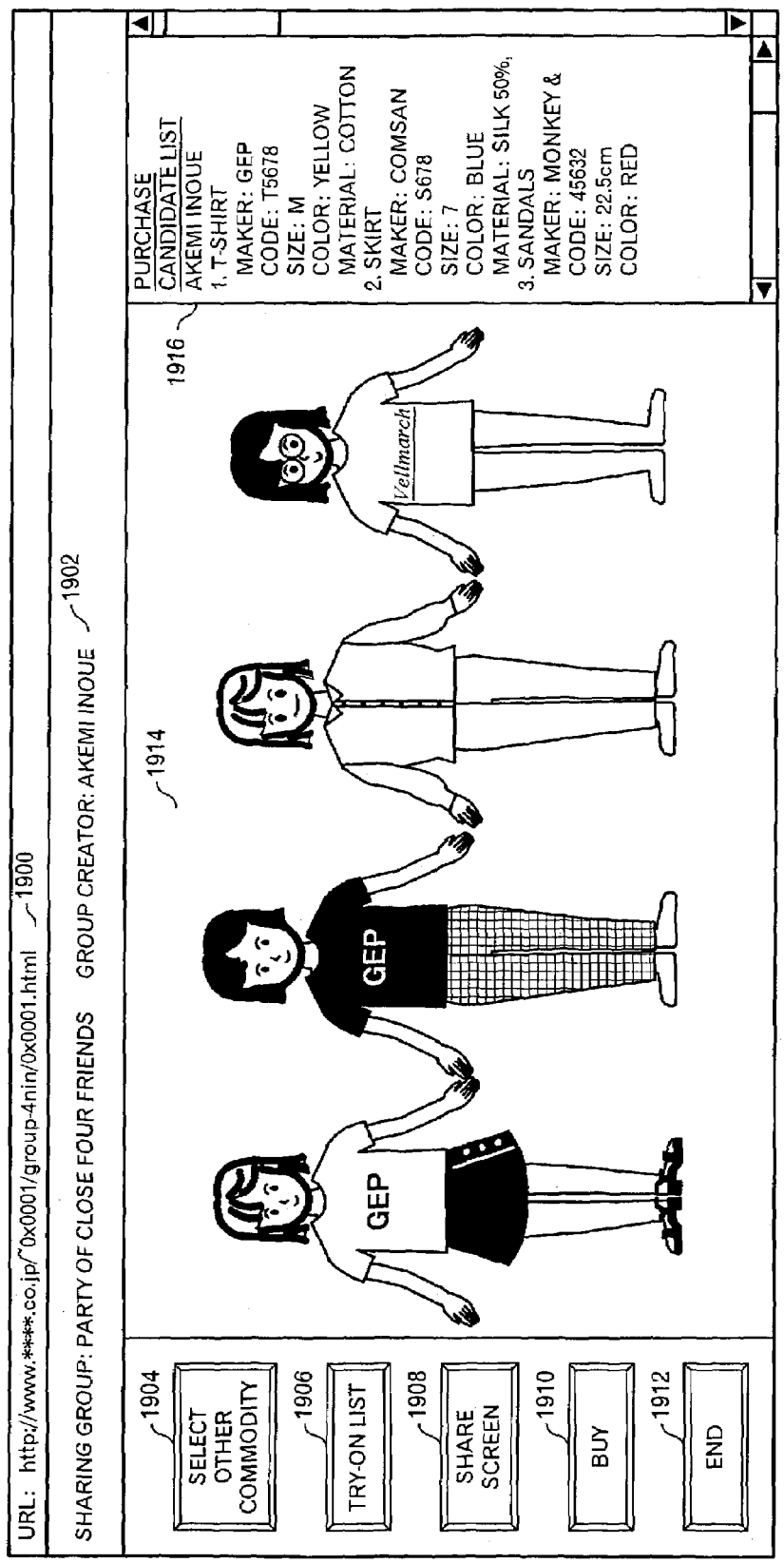
FIG. 19 is a drawing showing a first example of a shared try-on page.

FIG. 19 shows an example of a shared try-on page. The example of the shared try-on page shown in FIG. 19 includes a URL 1900, a page title 1902, an "select other commodity" button 1904, a "try-on list" button 1906, a "share screen" button 1908, a "buy" button 1910, an "end" button 1912, a virtual try-on image 1914, and a purchase candidate list 1916.

The URL 1900 indicates an address of this page. At the time of a sharing start, a creator (that is, administrator) of the sharing group notifies another user of this address, and the other user uses this address to browse the page so that sharing is performed.

In this embodiment, since settings of an image display, a try-on operation and the like are performed for each user, the address denoted by this URL 1900 varies for each user. For example, in the example shown in FIG. 19, a directory indicated by a portion of "/~0x0001/group-4nin/" is common to users belonging to this group, and a portion of "0x0001.html" (page file) is generated for each user ID. Thus, the administrator of the sharing group notifies the other sharing user of the common directory, and the other sharing user browses the shared try-on page by using the URL including the notified common directory and the user ID.

When a sharing user is added, there is also a case where a URL for the added user is generated and notice mail is automatically transmitted.

The user notified of the URL of the shared try-on page, other than the administrator, uses the browser of the terminal (for example, the user terminal B (7)) operated by himself or herself to access the shared try-on page. That is, the user terminal B (7) transmits a request for the shared try-on page data to the ASP server 5.

The ASP server 5 receives the request for the shared try-on page data from the user terminal B (7), and after the login processing is performed, it proceeds to the processing of the step S79. Then, at the step S81, the shared try-on page is displayed on the display device of the user terminal B (7), so that the user other than the administrator can browse the shared try-on page.

The page title 1902 indicates a sharing group name and a name of a group creator, and the user can understand which shared try-on page is browsed. In the case where the "select other commodity" button 1904 is pressed, an instruction to shift to a homepage managed by a shopping site (for example, the shopping site A server (9)) is resultantly selected and inputted by the user in order to select a commodity, which has not been tried on. Also, a list of tie-up shopping sites may be displayed, or a direct transition to a shopping site previously registered by the user may be performed.

In the case where the "try-on list" button 1906 is pressed, an instruction to shift to the try-on list page is resultantly selected and inputted by the user in order to perform an operation of getting on and off a commodity. In the case where the "share screen" button 1908 is pressed, an instruction to temporarily shift to the sharing group list page (FIG. 16) is resultantly selected and inputted by the user in order to shift to another sharing try-on scene.

When plural users are browsing the shared try-on page of the same sharing group at the same time, there is also a case where it is not desirable to shift to another shared try-on page by an individual judgment. In this case, when the "share screen" button 1908 is pressed on the shared try-on page, it may not shift to the sharing group list page (FIG. 16), but may shift to the sharing group creation and edit page (FIG. 22 described later) of the sharing group.

In the case where the "share screen" button 1908 is pressed by a sharing member other than the administrator, an instruction to shift to a sharing condition setting page (FIG. 26 described later) concerning the member is resultantly selected and inputted by the user. On the page which the sharing member other than the administrator browses, a button name to be displayed on the "share screen" button 1908 may be changed to "set sharing conditions" and may be displayed.

In the case where the "buy" button 1910 is pressed, an instruction to shift to a page on which the account of a tried-on commodity is settled is resultantly selected and inputted by the user. In the case where the "end" button 1912 is pressed, an instruction to end the try-on or browsing is resultantly selected and inputted by the user.

In this embodiment, the virtual try-on image 1914 includes images of users as members of the same sharing group and images of tried-on commodities. In the example shown in FIG. 19, although all the images of four users and tried-on commodities can be browsed, according to sharing settings of the respective users, there is also a case where for example, a part of the upper half of the body or the like of a certain user is not seen.

The purchase candidate list 1916 includes information of commodities tried-on by the respective users, and in cooperation with the virtual try-on image 1914, it is possible to understand who tries on what commodity and how is the appearance.

In this embodiment, although a user performs an operation of getting on and off a commodity on the try-on list page, the operation of getting on and off may be performed by a drag-and-drop operation of a mouse for the commodity image of the virtual try-on image 1914. In this case, it is necessary to manage layer and position information of the respective commodity images and user images by, for example, JAVA (Trademark of Sun Microsystems).

Figure 20:
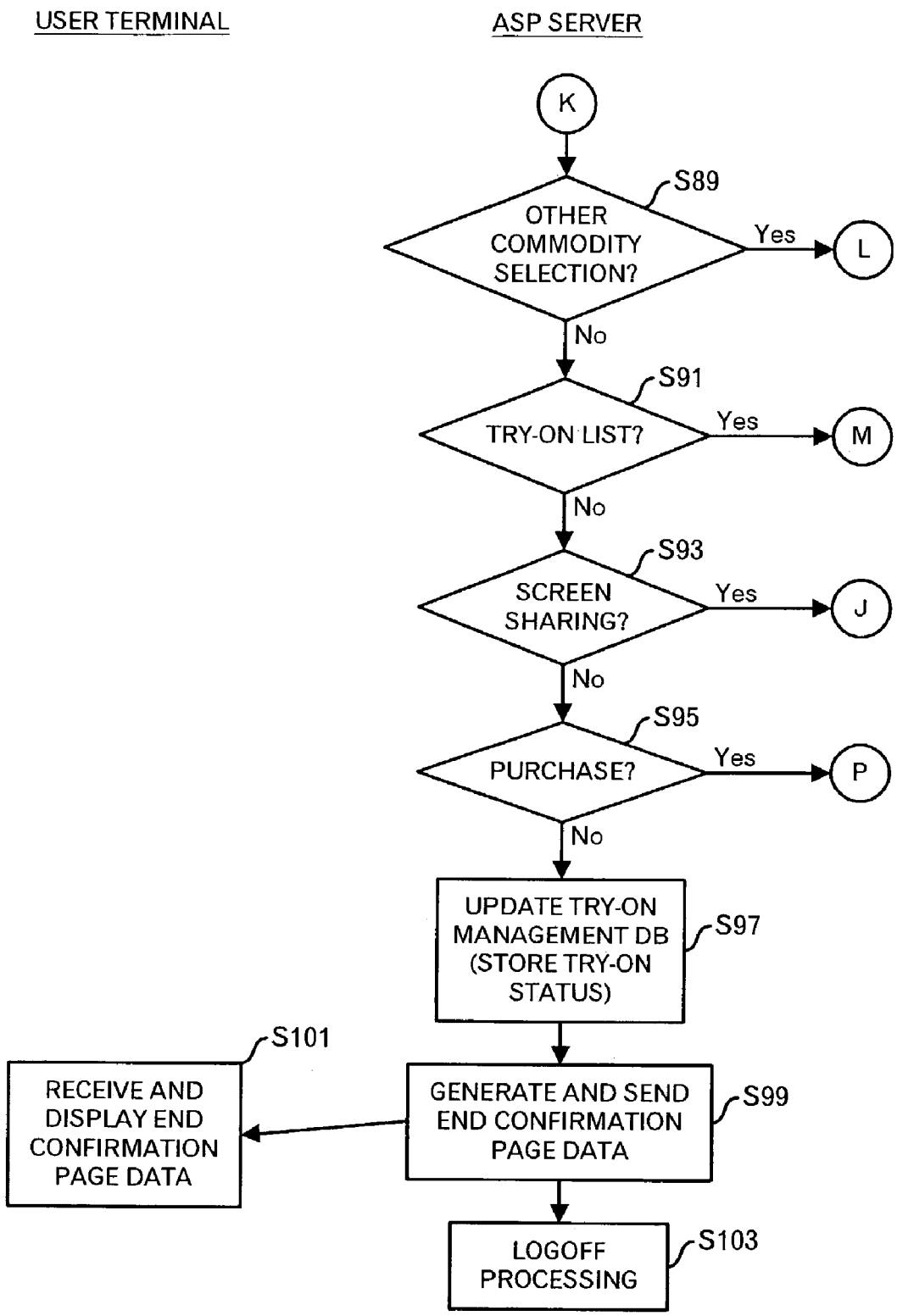
FIG. 20 is a drawing showing a fifth portion of the processing flow in the embodiment of the invention.

Returning to the processing flow of FIG. 17, the user terminal A (3) accepts an operation input by the user on the shared try-on page (step S83). The user terminal A (3) transmits the accepted selection operation data to the ASP server 5 (step S85). The ASP server 5 receives the selection operation data of the user on the shared try-on page from the user terminal A (3), and temporarily stores it into the storage device (step S87). The processing proceeds to processing of FIG. 20 through terminal K.

On the basis of the selection operation data received at the step S87, the ASP server 5 makes following judgments as to the instruction of the user. First, it is judged whether or not the instruction is other commodity selection, that is, whether or not the "select other commodity" button 1904 is pressed on the shared try-on page (FIG. 19) in order to shift to a commodity selection page managed by a shopping site (for example, the shopping site A server (9)) (step S89). In the case where it is judged that it is the other commodity selection, the processing proceeds to processing of FIG. 37 through terminal L.

In the case where it is judged that the instruction is not the other commodity selection, it is judged whether or not the instruction is a display instruction of a try-on list, that is, whether or not the "try-on list" button 1906 is pressed on the shared try-on page (FIG. 19) (step S91). In the case where it is judged that it is the display instruction of the try-on list, the processing proceeds to processing of FIG. 29 through terminal M.

In the case where it is judged that it is not the display instruction of the try-on list, it is judged whether or not the instruction is screen sharing, that is, whether or not the "share screen" button 1908 is pressed on the shared try-on page (FIG. 19) in order to shift to another shared try-on page (step S93). In the case where it is judged that it is the screen sharing, the processing returns to the processing of the step S49 through the terminal J (FIG. 15).

In the case where it is judged that the "share screen" button 1908 is pressed by a sharing member other than the administrator, a processing to shift to a sharing condition setting page (FIG. 26 described later) concerning the member is performed.

In the case where it is judged that it is not the screen sharing, it is judged whether or not the instruction is commodity purchase, that is, whether or not the "buy" button 1910 is pressed on the shared try-on page (FIG. 19) in order to perform a payment processing (step S95). In the case where it is judged that it is the commodity purchase, the processing proceeds to processing to FIG. 38 through terminal P.

In the case where it is judged that it is not the commodity purchase, it is a case of an end (case where the "end" button 1912 is pressed), and the ASP server 5 updates the try-on management DB 51 as a saving processing of the try-on state (step S97). This saving processing may be carried out only when the group creator presses the end button. Also, in the case where an end is desired without saving, a confirmation of execution of the saving processing may be sought from the user before updating the try-on management DB 51.

The ASP server 5 generates not-shown end confirmation page data, and transmits it to the user terminal A (3) (step S99). The user terminal A (3) receives the end confirmation page data from the ASP server 5, and displays it on the display device (step S101). Also, a "cancel" button may be provided on the end confirmation page, and in the case where the "cancel" button is pressed, the processing may return to the shared try-on page (FIG. 19). After the end confirmation page data is transmitted, the ASP server 5 performs a logoff processing of the user (step S103).

Next, by using FIG. 21, a description will be given of a processing (i.e. processing subsequent to the terminal H) of a case where it is judged at the step S61 (FIG. 15) that it is the new creation or the judgment is made at the step S63 (FIG. 15) such that it is not the deletion (but edit). The ASP server 5 generates data of a sharing group creation and edit page, and transmits it to the user terminal A (3) (step S105). The user terminal A (3) receives the data of the sharing group creation and edit page from the ASP server 5 and displays it on the display device (step S107).

FIG. 22 shows an example of the sharing group creation and edit page. The example of the sharing group creation and edit page shown in FIG. 22 includes a group name input column 220, a URL directory input column 222, a member list 224, an "OK" button 226, a "add member" button 227, a "delete" button 228, and a "set sharing conditions" button 229.

This page is used at the time of creation of a virtual basket for the group and its setting change, and in accordance with an operation by the user on this page, an addition and update processing of corresponding records of the basket management table (FIG. 4) and the user entry table (FIG. 5) in the try-on management DB 51 is performed.

A value in the column 402 of the names of the basket management table (FIG. 4) is indicated in the group name input column 220 in a state where it can be edited. It is a blank column in the case of new creation of a sharing group, and a name of the new sharing group is inputted. Similarly, in the URL directory input column 222, a value in the column 410 of the screen URLs of the basket management table (FIG. 4) is indicated in a state where it can be edited. In the case of new creation of a sharing group, it is a blank column, and a new URL directory used by a member is inputted.

In the member list 224, a list of the sharing group members (members using the basket) and a radio button are indicated. Values in the column 504 of the user names at records in the user entry table (FIG. 5) extracted with the basket ID are listed.

In this embodiment, in the case of new creation of a sharing group, only an administrator (creator) user is indicated in the member list 224. In the case where the "OK" button 226 is pressed, an instruction to save the contents shown on the page as they are or to newly register them is resultantly selected and inputted by the user. In the case where the "add member" button 227 is pressed, an instruction to newly add and register a member in the sharing group is resultantly selected and inputted by the user. In the case where the "delete" button 228 is pressed, an instruction to delete the registration of the member selected by the radio button from the sharing group is resultantly selected and inputted by the user.

Only the administrator can press the "add member" button 227 and the "delete" button 228. In the case where the "set sharing conditions" button 229 is pressed, an instruction to set or change sharing conditions is resultantly selected and inputted by the user. Also, with respect to the sharing conditions, the user can make only a setting concerning himself or herself. Member selection by the radio button is reflected in a processing only in the case of deletion.

Figure 21:
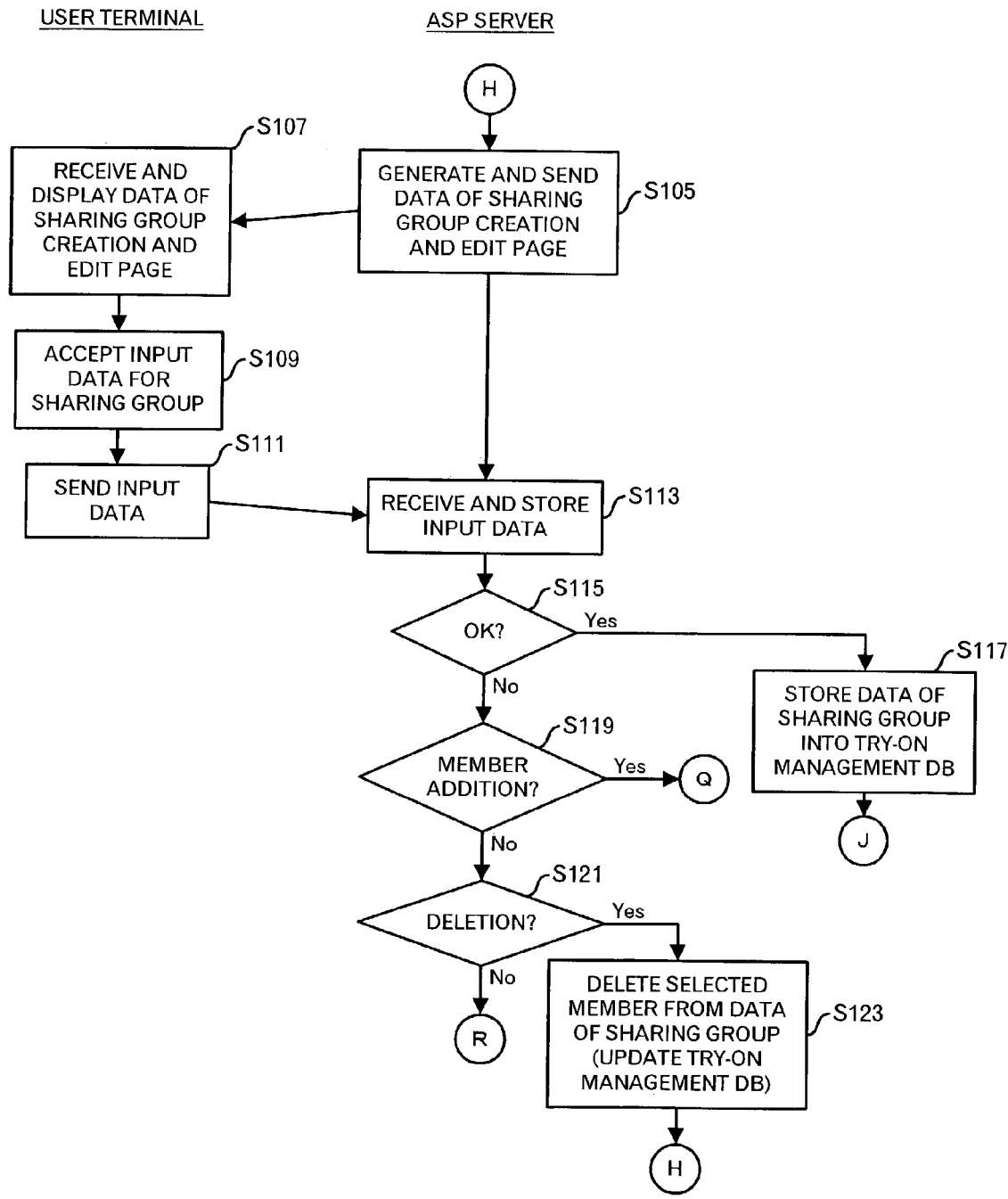
FIG. 21 is a drawing showing a sixth portion of the processing flow in the embodiment of the invention.

Returning to the processing flow of FIG. 21, the user terminal A (3) receives input data concerning the sharing group by the user (step S109). The user terminal A (3) transmits the received input data of the user to the ASP server 5 (step S111). The ASP server 5 receives the input data concerning the sharing group from the user terminal A (3), and temporarily stores it into the storage device (step S113).

The ASP server 5 makes following judgments concerning the instruction of the user on the basis of the input data concerning the sharing group received at the step S113. First, it is judged whether or not the instruction is OK, that is, whether or not the "OK" button 226 is pressed on the sharing group creation and edit page (FIG. 22) in order to save the contents shown on the page as they are or to newly register them (step S115). In the case where it is judged that it is the OK, the data of the sharing group is stored into the try-on management DB 51 (step S117). Specifically, in the case of new creation of a sharing group, a record is added to the basket management table (FIG. 4) and the user entry table (FIG. 5).

In the case of the edit of a sharing group, corresponding records of the basket management table (FIG. 4) and the user entry table (FIG. 5) are updated. The processing returns to the step S49 (FIG. 15) through terminal J, and the ASP server 5 newly generates data of the sharing group list page (FIG. 16) and transmits it to the user terminal A (3).

In the case where it is judged at the step S115 that it is not the OK, it is judged whether or not the instruction is member addition, that is, whether or not the "add member" button 227 is pressed on the sharing group creation and edit page (FIG. 22) in order to newly add a member (step S119). In the case where it is judged that it is the member addition, the processing proceeds to processing of FIG. 23 through terminal Q.

In the case where it is judged that it is not the member addition, it is judged whether or not the instruction is deletion, that is, whether or not the "delete" button 228 is pressed on the sharing group creation and edit page (FIG. 22) in order to delete the registration of the member (step S121). In the case where it is judged that it is the deletion, the data of the member selected by the radio button is deleted from the data of the sharing group (step S123). Specifically, the corresponding record of the user entry table (FIG. 5) is deleted, and a value in the column 414 of the numbers of user entries at the corresponding record in the basket management table (FIG. 4) is decremented by one.

The processing returns to the step S105 through the terminal H, and the ASP server 5 newly generates data of the sharing group creation and edit page (FIG. 22) and transmits it to the user terminal A (3). In the case where it is judged at the step S121 that it is not the deletion, that is, it is the setting of sharing conditions, and the processing proceeds to processing of FIG. 25 through terminal R.

Next, by using FIG. 23, a description will be given of a processing (processing subsequent to the terminal Q) in the case where it is judged at the step S119 that it is the member addition. The ASP server 5 generates data of a member addition page, and transmits it to the user terminal A (3) (step S125). The user terminal A (3) receives the data of the member addition page from the ASP server 5 and displays it on the display device (step S127).

FIG. 24 shows an example of the member addition page. The example of the member addition page shown in FIG. 24 includes a user ID input column 240, a name input column 242, an E-mail address input column 244, a "register" button 246 and a "cancel" button 248.

A user ID of a newly added user is inputted in the user ID input column 240. That is, in this embodiment, only a user already registered in the user management DB 53 and having a user ID can be registered as an addition member of the sharing group. Similarly, a name of the user is inputted in the name input column 242, and an e-mail address of the user is inputted in the E-mail address input column 244.

In the case where the "register" button 246 is pressed, an instruction to register a new member on the basis of the input data is resultantly selected and inputted by the user. In the case where the "cancel" button 248 is pressed, an instruction to stop the registration processing of a new member is resultantly selected and inputted by the user.

Figure 23:
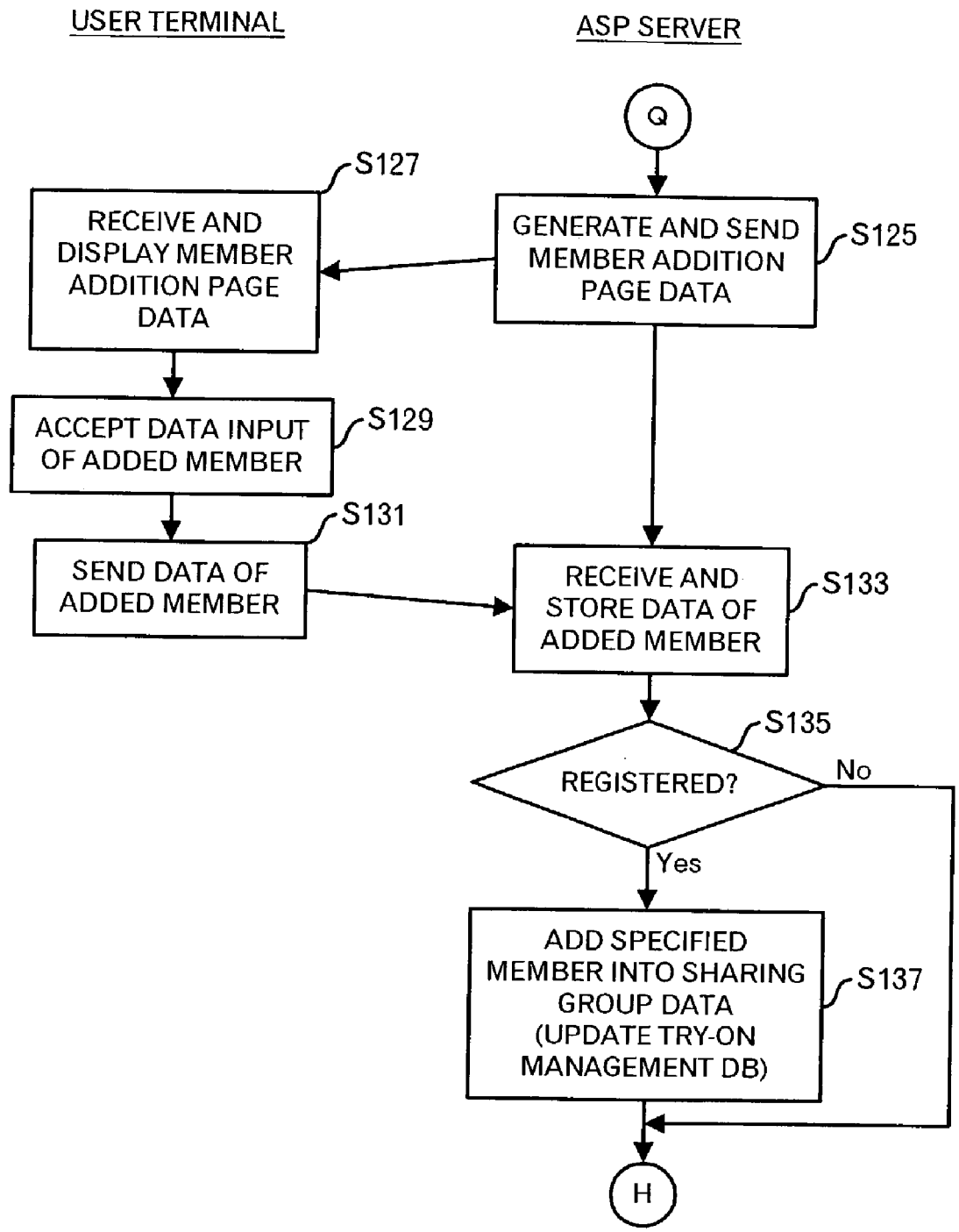
FIG. 23 is a drawing showing a seventh portion of the processing flow in the embodiment of the invention.

Returning to the processing flow of FIG. 23, the user terminal A (3) receives the data input concerning the added member by the user (step S129). The user terminal A (3) transmits the data concerning the added member to the ASP server 5 (step S131). The ASP server 5 receives the data concerning the added member from the user terminal A (3), and temporarily stores it into the storage device (step S133).

Here, it is judged whether or not the instruction of the user on the member addition page (FIG. 24) is registration (step S135). In the case where it is judged that it is not the registration, that is, in the case where it is the instruction of cancel, the processing returns to the processing of the step S105 (FIG. 21) through the terminal H. In the case where it is judged that it is the instruction of registration, the data of the specified member is added to the data of the sharing group (step S137). Specifically, a record is added to the user entry table (FIG. 5) of the try-on management DB 51, and a value in the column 414 of the numbers of user entries at the corresponding record in the basket management table (FIG. 4) is incremented by one.

The processing returns to the step S105 (FIG. 21) through the terminal H, and the ASP server 5 newly generates data of the sharing group creation and edit page (FIG. 22) and transmits it to the user terminal A (3).

Next, by using FIG. 25, a description will be given of a processing (processing subsequent to the terminal R) in the case where it is judged at the step S121 that it is not the deletion (FIG. 21) (that is, in the case where it is judged that it is the setting of sharing conditions). The ASP server 5 generates data of a sharing condition setting page and transmits it to the user terminal A (3) (step S139). The user terminal A (3) receives the data of the sharing condition setting page from the ASP server 5 and displays it on the display device (step S141).

FIG. 26 shows an example of the sharing condition setting page. The example of the sharing condition setting page shown in FIG. 26 includes a user information 260, a setting part 262 of an open range on the try-on screen, a setting part 264 of an open range on the try-on list, a setting part 265 of a range of self-try-on clothes utilizable (i.e. copiable) by another person, a setting part 266 of a range available for another user to try a cloth on a self-image, a setting part 267 of try-on available members on the sharing screen, a "register" button 268, and a "cancel" button 269.

A user ID, a name and an E-mail address of a user making these sharing settings are indicated in the user information 260. This user information is information of the user himself or herself who attempts to make the settings, and is constituted by a value in the column 502 of the user IDs, a value in the column 504 of the user names, and a value in the column 506 of the E-mail addresses at a corresponding record in the user entry table (FIG. 5) of the try-on management DB 51.

In the parts from the setting part 262 of the open range on the try-on screen to the setting part 267 of the try-on available member on the sharing screen, the user sets sharing conditions. When a setting result is registered, a value in the column 510 of the sharing conditions at the corresponding record in the user entry table (FIG. 5) of the try-on management DB 51 is updated. A value in the column 510 of the sharing conditions is a numerical value of five digits, and values of the respective digits correspond to sharing conditions 1 to 5, that is, the respective setting values from the setting part 262 of the open range on the try-on screen to the setting part 267 of the try-on available member on the sharing screen. Specifically, they are as follow:

In the setting part 262 of the open range on the try-on screen, body parts of "whole body", "upper body" and "lower body" are indicated, and can be selected by the radio button. The user as a member of the sharing group sets a range in which his or her own image is allowed to be seen by another member on the shared try-on page. Since such a setting that the member of the sharing group forbids another member to see his or her own image completely is not suitable, here, there is no selection item of "nothing". A setting value is "1" in the case where "whole body" is selected, "2" in the case where "upper body" is selected, and "3" in the case where "lower body" is selected, and it is registered at the leftmost digit of the five-digit numerical value in the column 510 of the sharing conditions in the user entry table (FIG. 5).

In the setting part 264 of the open range on the try-on list, body parts of "whole body", "upper body" and "lower body" and "nothing" are indicated, and can be selected by the radio button. The user as the member of the sharing group sets a range of his or her own try-on list, in which another member is allowed to see a commodity or commodities on the shared try-on page. A setting value is "1" in the case where "whole body" is selected, "2" in the case where "upper body" is selected, "3" in the case where "lower body" is selected, and "0" in the case where "nothing" is selected, and it is registered at the second digit from the left in the five-digit numerical value in the column 510 of the sharing conditions in the user entry table (FIG. 5).

In the setting part 265 of the range of self-try-on clothes utilizable (i.e. copiable) by another person, body parts of "whole body", "upper body", "lower body" and "nothing" are indicated, and can be selected by the radio button. The user as the member of the sharing group sets a range of self-try-on clothes (commodities), in which another member is allowed to use (copy) on the shared try-on page. A setting value is "1" in the case where "whole body" is selected, "2" in the case where "upper body" is selected, "3" in the case where "lower body" is selected, and "0" in the case where "nothing" is selected, and it is registered at the third digit from the left of the five-digit numerical value in the column 510 of the sharing conditions in the user entry table (FIG. 5).

With respect to a commodity tried on to a part which is not opened in the try-on list, another member can not see it and naturally can not use it, and the setting can be made only in the range set in the above described setting part 264 of the open range on the try-on list. For example, in the case where "upper body" is selected in the setting part 264 of the open range on the try-on list, either one of "upper body" and "nothing" can be set in the setting part 265 of the range of self-try-on clothes utilizable (i.e. copiable) by another person.

In the setting part 266 of the range available for another person to try a cloth on the self-image, body parts of "whole body", "upper body", "lower body" and "nothing" are indicated, and can be selected by the radio button. The user as the member of the sharing group sets a range of parts of the self-image, in which another member is enabled to perform a try-on operation on the shared try-on page. A setting value is "1" in the case where "whole body" is selected, "2" in the case where "upper body" is selected, "3" in the case where "lower body" is selected, and "0" in the case where "nothing" is selected, and it is registered at the fourth digit from the left of the five-digit numerical value in the column 510 of the sharing conditions in the user entry table (FIG. 5).

Since it is not suitable to perform a try-on operation for another member by seeing only one of the image and the try-on list, setting may be made possible only in a common range in the ranges set in the above described setting part 262 of the open range on the try-on screen and the setting part 264 of the open range on the try-on list. In this case, for example, when "upper body" is selected in the setting part 262 of the open range on the try-on screen and "lower body" is selected in the setting part 264 of the open range on the try-on list, only "nothing" can be set in the setting part 266 of the range available for another person to try a cloth on the self-image.

Sharing members other than the administrator and check boxes corresponding to the respective members are indicated in the setting part 267 of the try-on available member on the sharing screen. Only the administrator can set this setting item, and the administrator makes a setting as to whether another member is enabled to perform a try-on operation on the shared try-on page. In the state where the check box is checked off, the member can perform the try-on operation on the shared try-on page. A setting value is "1" in the case where a check is placed, and "0" in the case where a check is not placed, and it is registered at the rightmost digit of the five-digit numerical value in the column 510 of the sharing conditions at the record corresponding to the member of the setting object in the user entry table (FIG. 5).

The administrator himself or herself is set to be capable of trying on, and the setting value is "1" and is registered at the rightmost digit of the five-digit numerical value in the column 510 of sharing conditions at the record corresponding to the administrator. Also, with respect to the administrator, a setting as to whether or not try-on is to be performed may be set by the administrator himself or herself.

All initial values for the administrator and the other members in the case where the administrator newly creates a sharing group (i.e. sharing try-on scene) and in the case where the other members are registered by the administrator are "1". That is, the value in the column 510 of the sharing conditions of the user entry table (FIG. 5) is "11111".

In the case where the "register" button 268 is pressed, an instruction to register sharing settings on the basis of the inputted data is resultantly selected and inputted by the user. In the case where the "cancel" button 269 is pressed, an instruction to stop the sharing settings is resultantly selected and inputted by the user.

Figure 25:
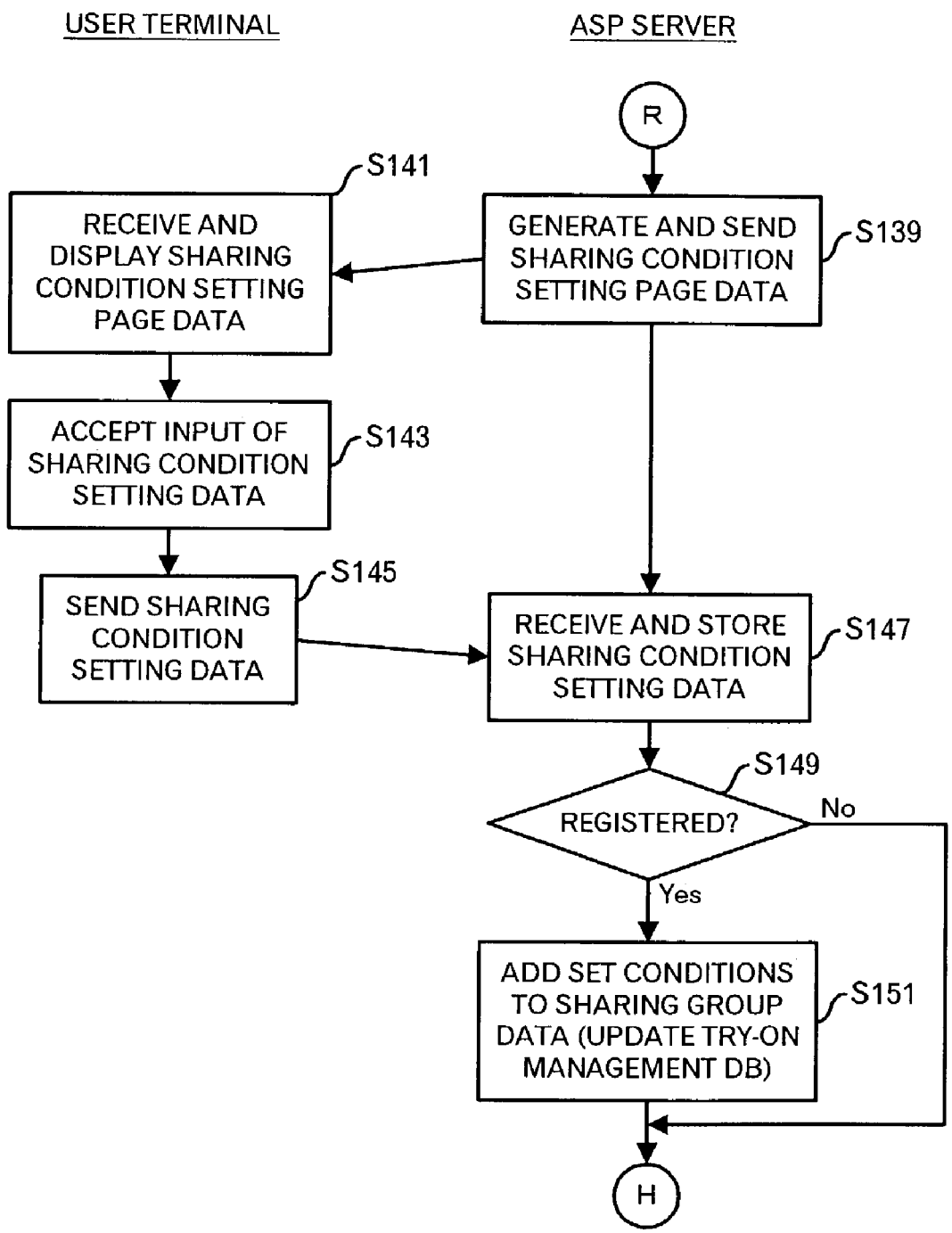
FIG. 25 is a drawing showing an eighth portion of the processing flow in the embodiment of the invention.

Returning to the processing flow of FIG. 25, the user terminal A (3) receives the input of the sharing setting data by the user (step S143). The user terminal A (3) transmits the sharing setting data inputted in accordance with the instruction of the user to the ASP server 5 (step S145). The ASP server 5 receives the sharing setting data from the user terminal A (3) and temporarily stores it into the storage device (step S147).

Here, it is judged whether or not the instruction of the user on the sharing condition setting page (FIG. 26) is registration (step S149). In the case where it is judged that it is not the registration, that is, in the case where it is the instruction of cancel, the processing returns to the processing (FIG. 21) of the step S105 through the terminal H. In the case where it is judged that it is the instruction of registration, the conditions set in the data of the sharing group are added (step S151). Specifically, a value in the column 510 of the sharing conditions at the corresponding record in the user entry table (FIG. 5) of the try-on management DB 51 is updated.

The processing returns to the step S105 through the terminal H (FIG. 21), and the ASP server 5 generates data of the sharing group creation and edit page (FIG. 22) and transmits it to the user terminal A (3). In the case where an operation (such as input of sharing setting data, and the like) on the sharing condition setting page (FIG. 26) is performed by a sharing member other than the administrator, the processing returns to the step S79 (FIG. 17), and the ASP server 5 generates data of the shared try-on page (FIG. 19) and transmits it to the user terminal A (3).

Figure 27:
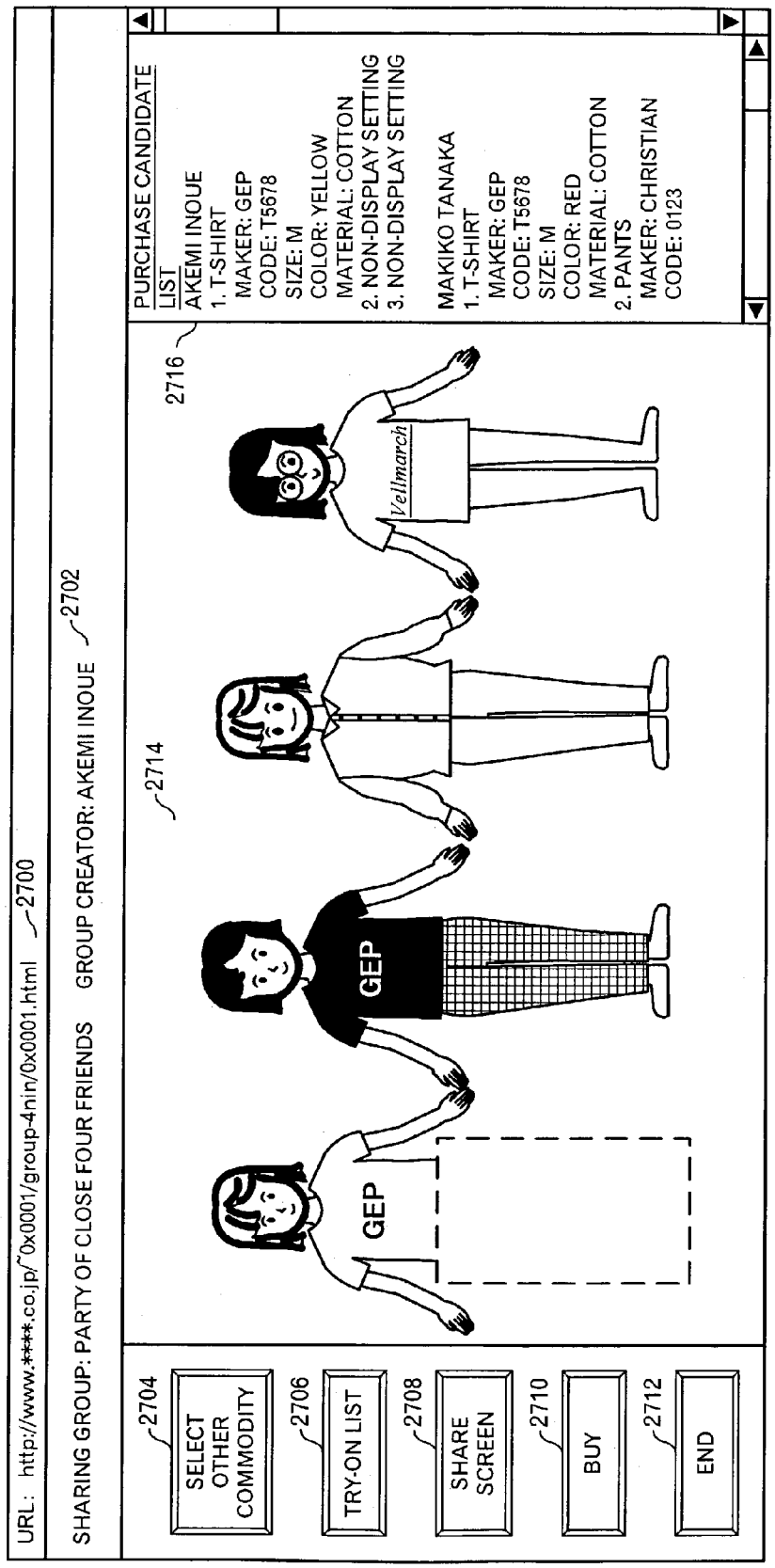
FIG. 27 is a drawing showing a second example of the shared try-on page.
Figure 28:
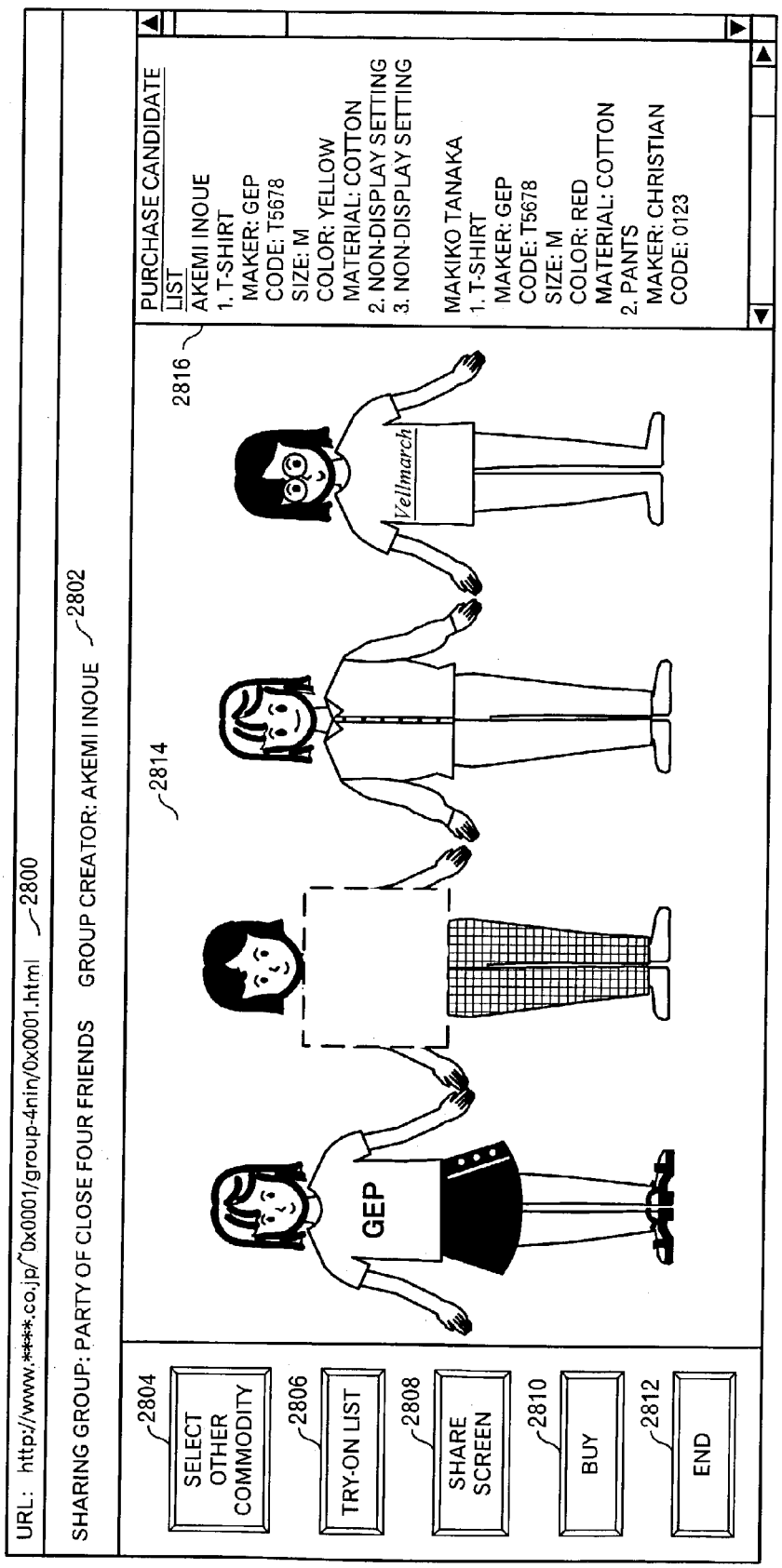
FIG. 28 is a drawing showing a third example of the shared try-on page.

FIGS. 27 and 28 show examples of the shared try-on page after the sharing setting. The example of the shared try-on page after the first sharing setting shown in FIG. 27 includes a URL 2700, a page title 2702, an "select other commodity" button 2704, a "try-on list" button 2706, a "share screen" button 2708, a "buy" button 2710, an "end" button 2712, a virtual try-on image 2714 and a purchase candidate list 2716.

This is different from the above described shared try-on page shown in FIG. 19 in the virtual try-on image 2714 and the purchase candidate list 2716. First, in the virtual try-on image 2714, there is shown an image in which the lower body of the leftmost user is hidden. This results from the setting of the setting part 262 on the sharing condition setting page (FIG. 26), in which "upper body" is set by the user, and the setting is reflected in this way as the image.

In this embodiment, user images shown in the virtual try-on image 2714 are defined as a first user, a second user and so on in sequence from the left, and also in the purchase candidate list 2716, data is indicated for every user in the sequence. Then, in the virtual try-on image 2714, the tried-on commodity at the lower body of the leftmost user is indicated as "non-display setting" in the purchase candidate list 2716. This results from the setting of the setting part 264 on the sharing condition setting page (FIG. 26), in which "upper body" is set by the user, and the above setting is reflected as browsed data like this.

Even in the case where the "try-on list" button 2706 is pressed, similarly, the commodity data corresponding to the not-shown part is not shown. In this case, with respect to the value in the column 510 of the sharing conditions at the corresponding record in the user entry table (FIG. 5), both values at the first digit and the second digit from the left are set to "2". At the user terminal of the first user, the screen as in FIG. 19 is displayed.

The example of the shared try-on page after the second sharing setting shown in FIG. 28 includes a URL 2800, a page title 2802, an "select other commodity" button 2804, a "try-on list" button 2806, a "share screen" button 2808, a "buy" button 2810, an "end" button 2812, a virtual try-on image 2814, and a purchase candidate list 2816.

Similarly to the example of FIG. 27, this is different from the shared try-on page shown in FIG. 19 in the virtual try-on image 2814 and the purchase candidate list 2816. First, in the virtual try-on image 2814, there is shown an image in which the upper body of the second user from the left is hidden. This results from the setting in the setting part 262 on the sharing condition setting page (FIG. 26), in which "lower body" is set by the user, and the setting is reflected as the image like this.

In the purchase candidate list 2816, the tried-on commodity to the lower body of the first user is indicated as "non-display setting", and data of a tried-on commodity to the upper body of the second user is indicated. This results from the setting in the setting part 264 of the first user on the sharing condition setting page (FIG. 26), in which "upper body" is set, and from the setting in the setting part 264 of the second user, in which "whole body" is set, and the settings are reflected as browsed data like this. In this case, with respect to values of the column 510 of the sharing conditions at the corresponding records in the user entry table (FIG. 5), concerning the first user, the first digit from the left is set to "1", and the second digit is set to "2". Concerning the second user, the first digit from the left is set to "3", and the second digit is set to "1". In the case where information opened to the other sharing members is set in this way, the setting is reflected in the shared try-on page.

Next, by using FIG. 29, a description will be given of a processing (processing subsequent to the terminal M) in the case where it is judged at the step S91 (FIG. 20) that it is the try-on list. The ASP server 5 generates data of the try-on list page and transmits it to the user terminal A (3) (step S153). The user terminal A (3) receives the data of the try-on list page from the ASP server 5 and displays it on the display device (step S155).

FIG. 30 shows an example of the try-on list page. The example of the try-on list page shown in FIG. 30 includes a try-on list (i.e. sharing group) name 300, a try-on list 302, a "stop try-on" button 304, a "copy tried-on commodity" button 306 and a "shift to try-on screen" button 308. The try-on list (i.e. sharing group) name 300 indicates a name of the shared try-on page (i.e. sharing group), which the user presently browses. The try-on list 302 includes try-on person names, parts, shops, commodities and options, and shows list information indicating what commodity (such as yellow M-size T-shirt, or the like) of what place (e.g. shop) is tried on to which part (such as upper body, or the like) of which person (i.e. which user). The respective lines can be selected by the radio button.

In the case where a line is selected and the "stop try-on" button 304 is pressed, an instruction to stop try-on of the selected commodity is resultantly selected and inputted by the user. In the case where a line is selected and the "copy tried-on commodity" button 306 is pressed, an instruction to copy the selected commodity and cause another member to try on is resultantly selected and inputted by the user. In the case where the "shift to try-on screen" button 308 is pressed, an instruction to return to the shared try-on page is resultantly selected and inputted by the user.

Figure 29:
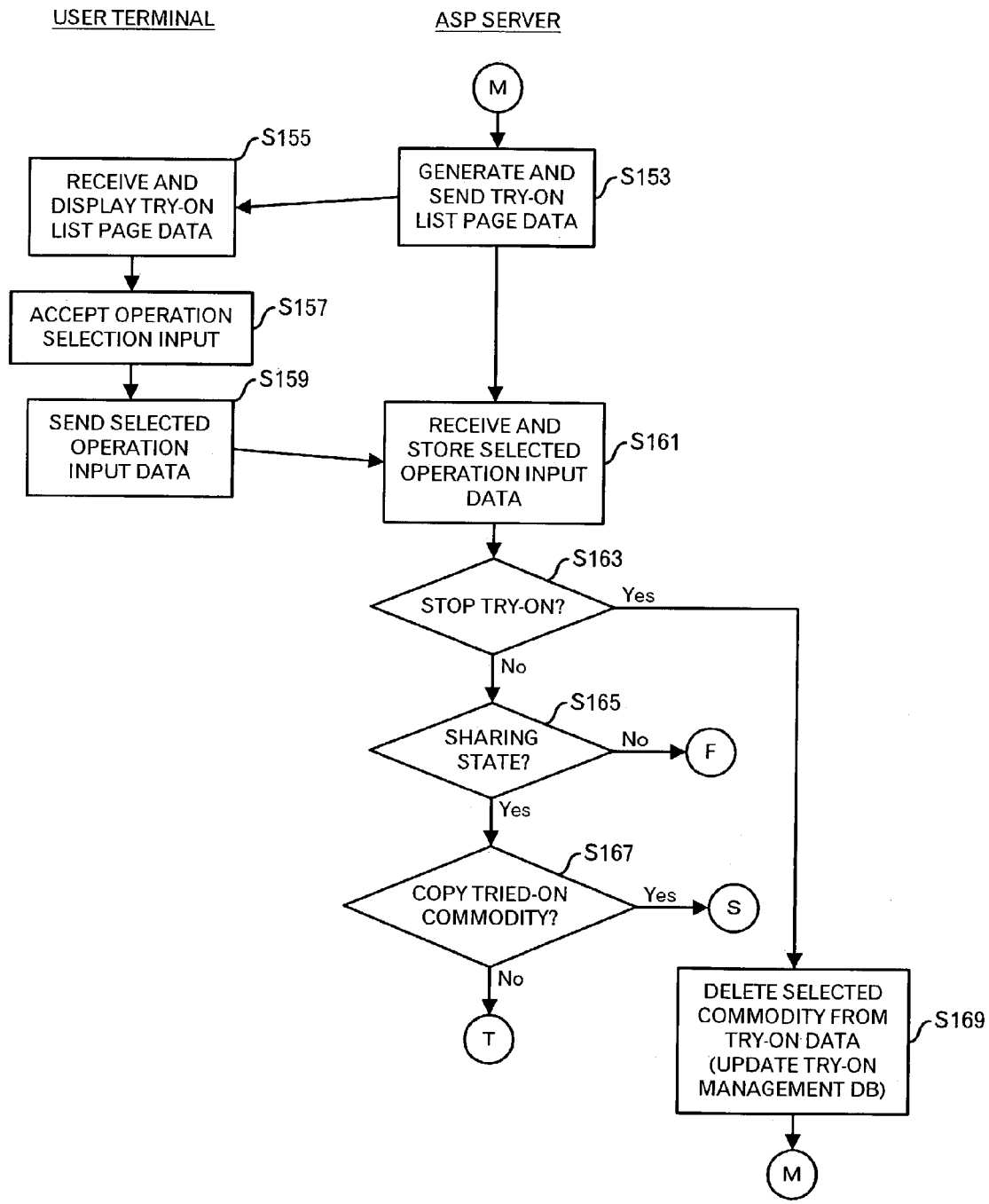
FIG. 29 is a drawing showing a ninth portion of a processing flow in the embodiment of the invention.

Returning to the processing flow of FIG. 29, the user terminal A (3) accepts an operation selection input by the user (step S157). The user terminal A (3) transmits selected operation input data to the ASP server 5 (step S159). The ASP server 5 receives the selected operation input data from the user terminal A (3) and temporarily stores it into the storage device (step S161).

Here, it is judged whether or not the instruction of the user on the try-on list page (FIG. 30) is "stop try-on" (step S163). In the case where it is judged that it is not the "stop try-on", it is judged whether or not a sharing state exists (step S165). This processing flow is a flow commonly used even in the case where a private try-on list page is used, and this is a judgment processing performed since buttons included in the pages are different between the private try-on list page and the sharing group try-on list page. That is, at step S165, in the case where it is judged that the sharing state does not exist (that is, instruction data from the private try-on list page is received), the processing proceeds to processing of FIG. 57 through the terminal F.

In the case where it is judged that the sharing state exists (that is, instruction data from the sharing try-on list page is received), it is judged whether or not the instruction of the user on the try-on list page (FIG. 30) is copy of a tried-on commodity (step S167). In the case where it is judged that it is the copy of the tried-on commodity, the processing proceeds to processing of FIG. 34 through terminal S.

In the case where it is judged that it is not the copy of the tried-on commodity, that is, in the case where the "shift to try-on screen" button 308 is pressed and it is the instruction to return to the shared try-on page, the processing returns to the step S79 (FIG. 17) through terminal T, and the ASP server 5 generates shared try-on page data and transmits it to the user terminal A (3).

At the step S163, in the case where it is judged that it is the "stop try-on", the selected commodity is deleted from the try-on data (step S169). Specifically, the corresponding record of the try-on entry table (FIG. 6) of the try-on management DB is deleted, and the value in the column 512 of the numbers of try-on entries at the corresponding record in the user entry table (FIG. 5) is decremented by one.

The processing returns to the step S153 through the terminal M, and the ASP server 5 newly generates data of the try-on list page and transmits it to the user terminal A (3).

Examples of the try-on list page reflecting the processing results are shown below in FIGS. 31 to 33.

FIG. 31 shows an example of the try-on list page subsequent to the processing at the step S169. Similarly to the example of the try-on list page shown in FIG. 30, the example of the try-on list page shown in FIG. 31 includes a try-on list (i.e. sharing group) name 310, a try-on list 312, a "stop try-on" button 314, a "copy tried-on commodity" button 316, and a "shift to try-on screen" button 318.

This is different from the try-on list page shown in FIG. 30 in that the top line of the try-on list 312 indicates "none". For example, on the try-on list page shown in FIG. 30, in the case where the top line of the try-on list 302 is selected and the "stop try-on" button 304 is pressed, the processing result by the ASP server 5 is reflected in the try-on list as shown in FIG. 31.

FIG. 32 shows an example of the try-on list page subsequent to the sharing setting (FIG. 26). Similarly to the example of the try-on list page shown in FIG. 30, the example of the try-on list page shown in FIG. 32 includes a try-on list (i.e. sharing group) name 320, a try-on list 322, a "stop try-on" button 324, a "copy tried-on commodity" button 326, and a "shift to try-on screen" button 328.

This is different from the try-on list page shown in FIG. 30 in that there is no line concerning the lower body and the foot of the first user (Akemi Inoue) in the try-on list 322. For example, on the sharing condition setting page shown in FIG. 26, in the case where "upper body" is set in the setting part 264 of the open range on the try-on list, the processing result on the basis of the setting is reflected in the try-on list as shown in FIG. 32.

FIG. 33 shows an example of the try-on list page subsequent to the try-on person (here, part) selection (FIG. 18). The example shown in FIG. 33 includes a try-on list (i.e. sharing group) name 330, a try-on list 332, a "stop try-on" button 334, a "copy tried-on commodity" button 336, and a "shift to try-on scene" button 338. In this embodiment, the try-on person selection page (FIG. 18) shifts to the shared try-on page (FIG. 19), and does not directly shift to the try-on list page.

The example of the try-on list page is the example of the try-on list page in the case where on the try-on person selection page shown in FIG. 18, the line of the upper body of the third user (Kiyomi Tsujimoto) is selected, the "try-on" button 186 is pressed, the processing proceeds to the shared try-on page, and the "try-on list" button is pressed by the user.

Here, the difference between the try-on list 184 of the try-on person selection page shown in FIG. 18 and the try-on list 330 of the try-on list page shown in FIG. 33 is commodity information of the upper body of the third user (Kiyomi Tsujimoto). The try-on list 330 of FIG. 33 indicates the same contents as the commodity information 182 of FIG. 18. That is, it is understood that the try-on operation of the selected commodity to the third user (Kiyomi Tsujimoto) is performed. As stated above, the result of the try-on operation is reflected in the try-on list.

Next, by using FIG. 34, a description will be given of a processing (processing subsequent to the terminal S) in the case where it is judged at the step S167 (FIG. 29) that it is the copy of the tried-on commodity. The ASP server 5 generates data of a tried-on commodity copy page and transmits it to the user terminal A (3) (step S171). The user terminal A (3) receives the data of the tried-on commodity copy page and displays it on the display device (step S173).

FIG. 35 shows an example of the tried-on commodity copy page. The example of the tried-on commodity copy page shown in FIG. 35 includes copy origin information 350, a copy destination member list 352, a "copy" button 354 and a "cancel" button 356.

The copy origin information 350 includes information of try-on person's name and a tried-on commodity, and another member is also made to try on this commodity. Here, there is shown the example of the tried-on commodity copy page in the case where the "copy tried-on commodity" button 306 is pressed on the try-on list page shown in FIG. 30 (the line of the upper body of the first user (Akemi Inoue) is selected).

The copy destination member list 352 indicates sharing members other than the member indicated in the copy origin information 350 and check boxes corresponding to the respective members. Since the setting on the sharing condition setting page (FIG. 26) is reflected in the copy destination member list 352, there may be a user who is a member of the same sharing group but is not indicated in the copy destination member list 352.

For example, in the case where a commodity of the copy origin is a T-shirt, with respect to a user, for whom the setting part 266 of the range available for another person to try a cloth on the self-image is set to "lower body" or "nothing" on the sharing condition setting page (FIG. 26), a commodity to be tried on to the upper body, such as the T-shirt, can not be made to be tried on, and therefore, the name of the user is not indicated in the copy destination member list 352.

For example, in the case where the copy origin commodity is a T-shirt, with respect to a user, for whom the setting part 262 of the open range on the try-on screen and the setting part 264 of the open range on the try-on list are set to "lower body" or "nothing" on the sharing condition setting page (FIG. 26), even if a commodity to be tried on to the upper body, such as the T-shirt, is tried on, confirmation can not be made, and therefore, the name of the user is not indicated in the copy destination member list 352. In addition, the copy destination member list 352 is indicated in such a mode that inconsistency with the sharing setting does not occur.

When the check box corresponding to the member who is requested to try on the commodity is checked by the user and the "copy" button 354 is pressed, an instruction to cause the checked member to try on the tried-on commodity indicated in the copy origin information 350 is resultantly selected and inputted by the user.

It is possible to simultaneously select plural members as the check objects, and the selected members try on the same commodity. The part of the body, to which try-on is performed, is the same part as the part to which the commodity as the copy origin is tried on. When the "cancel" button 356 is pressed, an instruction to return to the try-on list page without performing anything is resultantly selected and inputted by the user.

Figure 34:
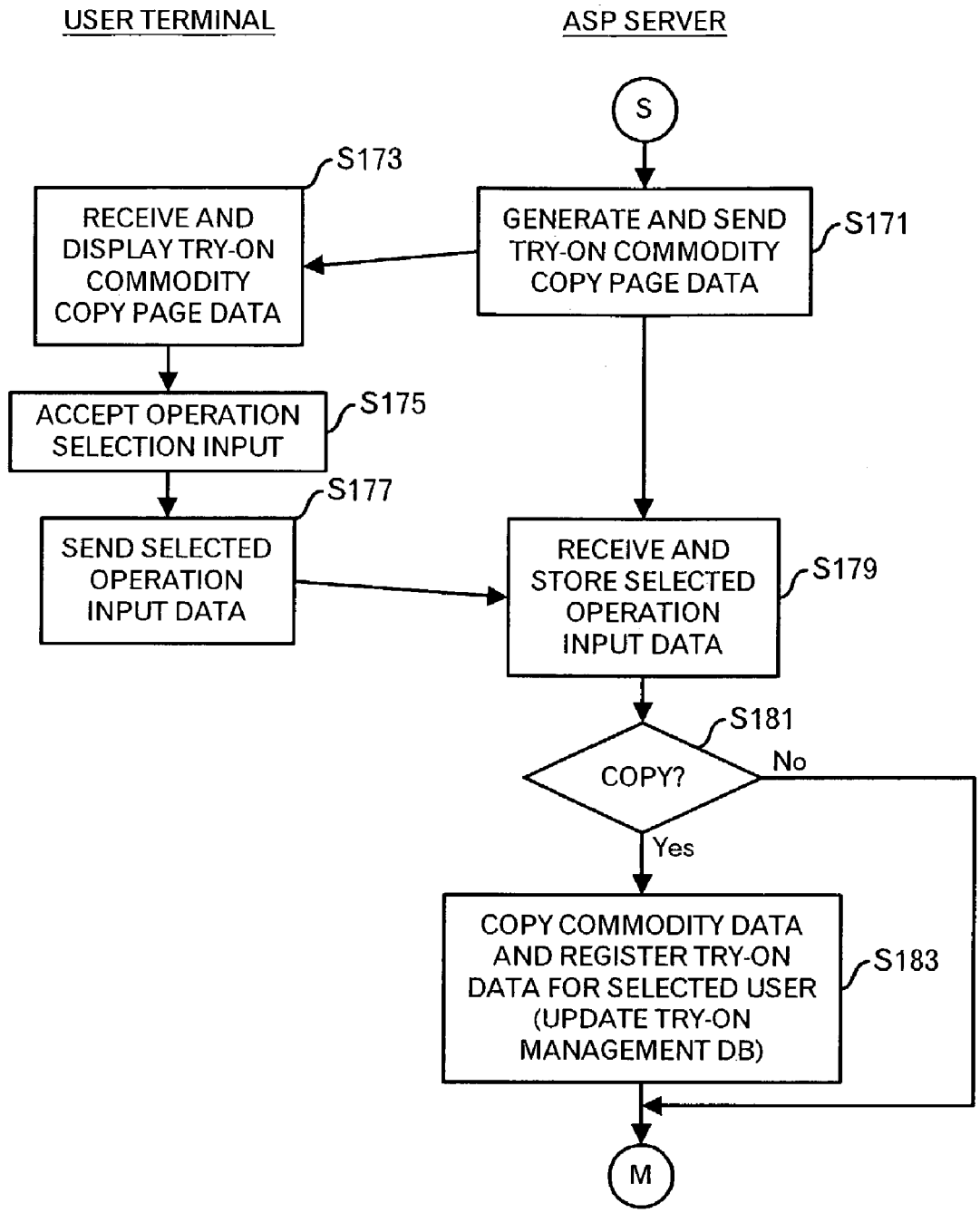
FIG. 34 is a drawing showing a tenth portion of the processing flow in the embodiment of the invention.

Returning to the processing flow of FIG. 34, the user terminal A (3) accepts an operation selection input by the user (step S175). The user terminal A (3) transmits selected operation input data to the ASP server 5 (step S177). The ASP server 5 receives the selected operation input data from the user terminal A (3) and temporarily stores it into the storage device (step S179).

Here, it is judged whether or not the instruction of the user on the tried-on commodity copy page (FIG. 35) is copy execution (step S181). In the case where it is judged that it is not the copy execution, since the instruction is cancel, the processing returns to the step S153 (FIG. 29) through the terminal M, and the ASP server 5 generates data of the try-on list page and transmits it to the user terminal A (3). In the case where it is judged that it is the copy execution, the commodity data is copied and try-on registration for the selected member is made (step S183). Specifically, the corresponding record of the try-on entry table (FIG. 6) of the try-on management DB 51 is updated.

In the case where try-on is performed to a part to which try-on has not been performed, a record is added to the try-on entry table (FIG. 6), and the value in the column 512 of the numbers of try-on entries at the corresponding record in the user entry table is incremented by one. The processing returns to the step S153 (FIG. 29) through the terminal M, and the ASP server 5 newly generates data of the try-on list page and transmits it to the user terminal A (3). In the user terminal of the other user, in accordance with a timer set in the shared try-on page data, the Web browser works so as to automatically and periodically obtain newest shared try-on page data. Accordingly, when the copy processing of the tried-on commodity is executed, a try-on mode after the copy is displayed on the shared try-on page.

FIG. 36 shows an example of the try-on list page after the tried-on commodity copy processing. Similarly to the example of the try-on list page shown in FIG. 30, the example of the try-on list page shown in FIG. 36 includes a try-on list (i.e. sharing group) name 360, a try-on list 362, a "stop try-on" button 364, a "copy tried-on commodity" button 366, and a "shift to try-on screen" button 368. This is different from the try-on list page shown in FIG. 30 in the information of the commodity concerning the upper body of the third user (Kiyomi Tsujimoto) in the try-on list 362.

Here, there is shown the example of the try-on list page in the case where the "copy" button 354 is pressed on the tried-on commodity copy page shown in FIG. 35 (second (third in the try-on list) user (Kiyomi Tsujimoto) of the copy destination member list 352 is checked). Thus, in the example of the try-on list page shown in FIG. 36, the information of the commodity concerning the upper body of the first user (Akemi Inoue) and the information of the commodity concerning the upper body of the third user (Kiyomi Tsujimoto) are the same information. That is, it is understood that the copy processing of the tried-on commodity is performed. As stated above, the result of the tried-on commodity copy processing is reflected in the try-on list.

Figure 37:
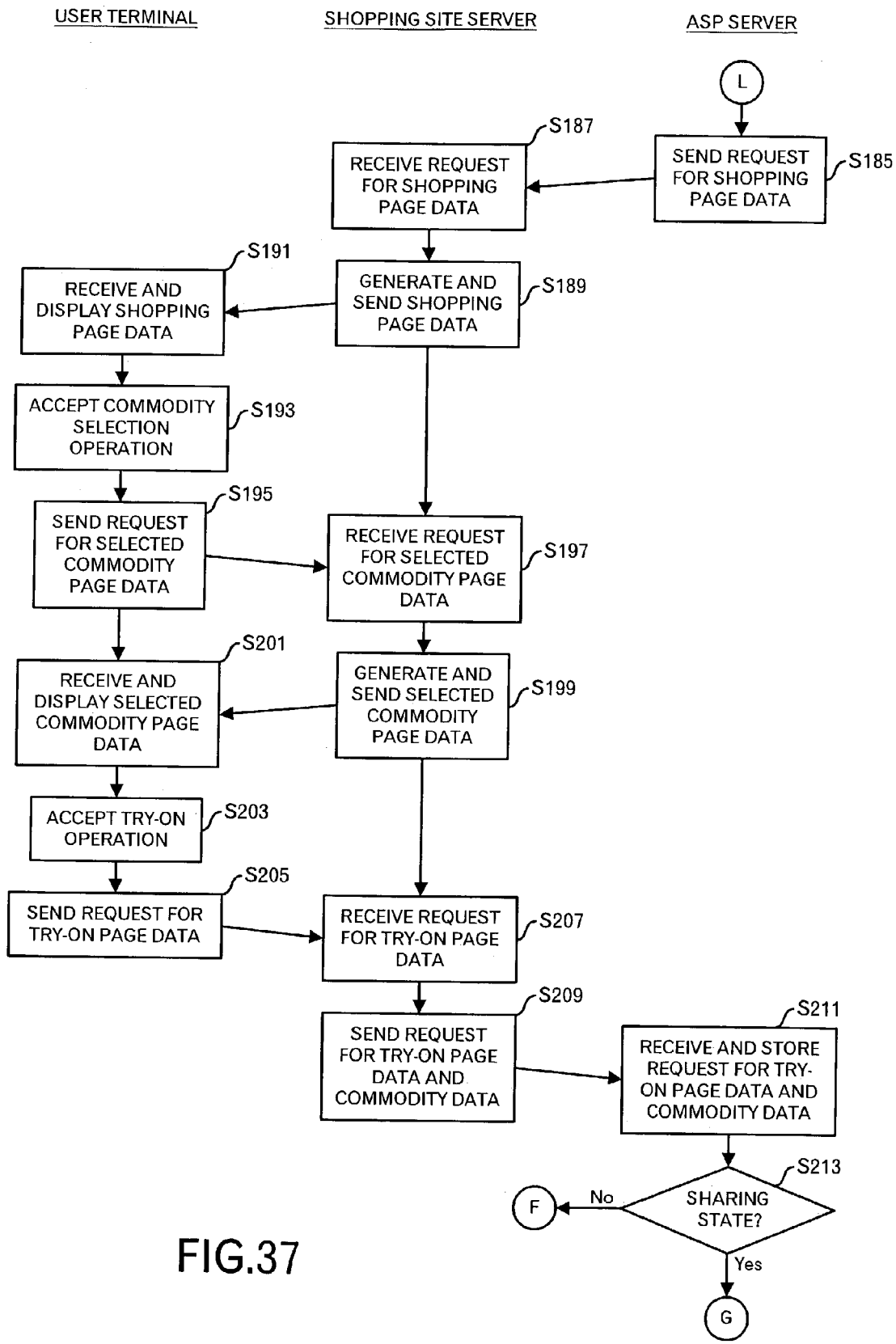
FIG. 37 is a drawing showing an eleventh portion of the processing flow in the embodiment of the invention.

Next, by using FIG. 37, a description will be given of a processing (processing subsequent to the terminal L) in the case where it is judged at the step S89 (FIG. 20) that the instruction is the other commodity selection. The ASP server 5 transmits a data request for the shopping page as the homepage of the shopping site to the shopping site server (for example, the shopping site B server (11)) (step S185). The shopping site B server (11) receives the data request for the shopping page from the ASP server 5, and temporarily stores it into the storage device (step S187). The shopping site B server (11) generates data of the shopping page and transmits it to the user terminal A (3) (step S189).

The user terminal A (3) receives the data of the shopping page and displays it on the display device (step S191). The user terminal A (3) accepts a commodity selection operation by the user (step S193). The user terminal A (3) having accepted the commodity selection operation transmits the request for the selected commodity page data to the shopping site B server (11) (step S195).

The shopping site B server (11) receives the request for the selected commodity page data from the user terminal A (3) (step S197), and stores, for example, the commodity number and the commodity type into the storage device. The shopping site B server (11) uses the commodity number and the commodity type to search the commodity DB 111, and generates selected commodity page data on the basis of the result and transmits it to the user terminal A (3) (step S199). The user terminal A (3) receives the selected commodity page data from the shopping site B server (11) and displays it on the display device (step S201). The selected commodity page has a structure as shown in FIG. 12.

The user terminal A (3) receives the try-on instruction by the user on the selected commodity page (step S203), and transmits the request for the try-on page data to the shopping site B server (11) (step S205). The shopping site B server (11) receives the request for the try-on page data from the user terminal A (3) (step S207), and stores, for example, the commodity number and the commodity type into the storage device.

The shopping site B server (11) transmits the try-on page data request to the ASP server 5 (step S209). The ASP server 5 receives the try-on page data request from the shopping site B server (11), and stores, for example, the shopping site code, the commodity number and the commodity type into the storage device (step S211).

It is assumed that in the processing from this step S185, the login state of the user to the ASP server 5 is kept by the cookie information saving function or the like of the Web browser in the user terminal A (3). The basket ID is also saved, and it is possible to judge whether the page used by the user before the processing of the step S185 is performed, is the shared try-on page or the private try-on page.

The ASP server 5 judges whether or not the page used by the user is the shared try-on page (that is, whether or not the sharing state exists) (step S213). In the case where it is judged that the sharing state exists, the processing returns to the processing of the step S67 through the terminal G (FIG. 17). In the case where it is judged that the sharing state does not exist, the processing proceeds to the processing of FIG. 57 through the terminal F.

Next, by using FIG. 38, a description will be given of a processing (processing subsequent to the terminal P) in the case where it is judged at the step S95 (FIG. 20) that it is the purchase. The ASP server 5 uses the basket ID to search the try-on entry table (FIG. 6) of the try-on management DB 51 and the purchase management table (FIG. 7) and extracts a record (step S215). The ASP server 5 generates data of a purchasing try-on list page on the basis of data of the extracted record, and transmits it to the user terminal A (3) (step S217). The user terminal A (3) receives the data of the purchasing try-on list page from the ASP server 5 and displays it on the display device (step S219).

FIGS. 39 and 40 show examples of the purchasing try-on list page. The example of the first purchasing try-on list page shown in FIG. 39 includes a page title 390, a purchasing try-on list 392, a "check out for respective commodity" link 394, an "check out for respective try-on persons" button 396; and a "keep try-on" button 398.

The page title 390 indicates a present date and a name of a sharing group. The purchasing try-on list 392 indicates a user name (i.e. try-on person name) performing try-on on the shared try-on page, information of a tried-on commodity, and information concerning payment.

Similarly to the example of the try-on list page shown in FIG. 32, the setting on the sharing condition setting page (FIG. 26) is reflected in the purchasing try-on list 392. Data of the list is constituted by, for example, data of the commodity DB 91 (FIG. 2), and corresponding records of the try-on entry table (FIG. 6) and the purchase management table (FIG. 7) of the try-on management DB 51. A sum obtained by subtracting the cumulative total of payment registered sums from a unit price is indicated in a column of an insufficient sum.

In a column of the payment registration reception deadline, for example, a date after three days from a date when the first payment registration was made is set as a due date, and the number of days from the present date to the due date is indicated. As a period (i.e. closing information) in which payment registration is received at the time of joint purchase, for example, "two more days" is displayed.

The check-out link 394 for respective commodity indicates links for settling the accounts of the respective commodities corresponding to the respective lines in the purchasing try-on list 392. When the "check out for respective commodity" link 394 is pressed, an instruction to purchase a tried-on commodity indicated on the corresponding line is resultantly selected and inputted by the user.

When the "check out for respective try-on persons" button 396 is pressed, an instruction to select a try-on person and settle the account for respective try-on person is resultantly selected and inputted by the user. When the "keep try-on" button 398 is pressed, an instruction to return to the shared try-on page is resultantly selected and inputted by the user. An example of a second purchasing try-on list page shown in FIG. 40 has also the same structure.

Figure 38:
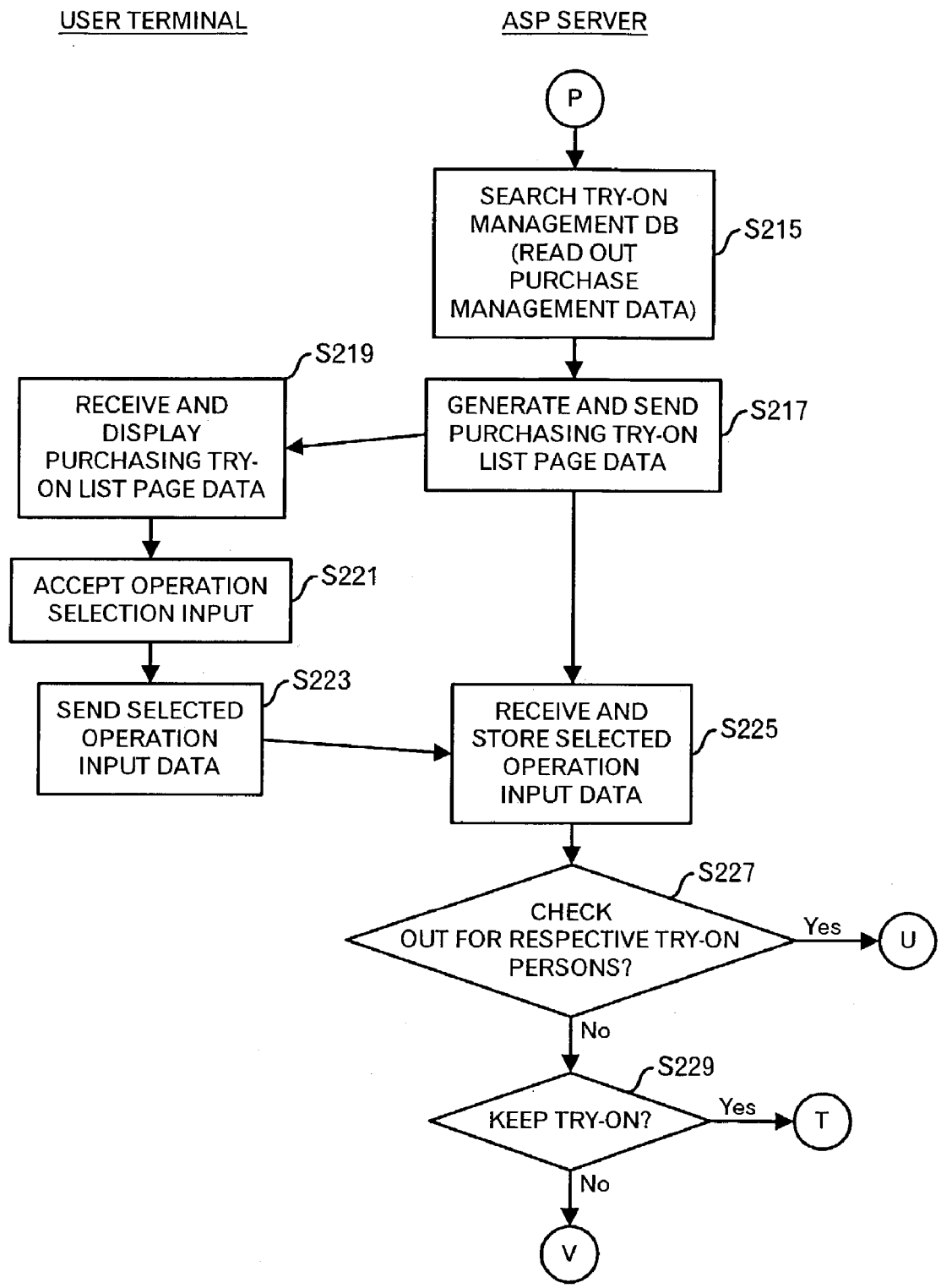
FIG. 38 is a drawing showing a twelfth portion of the processing flow in the embodiment of the invention.

Returning to the processing flow of FIG. 38, the user terminal A (3) accepts an operation selection input by the user (step S221). The user terminal A (3) transmits selected operation input data to the ASP server 5 (step S223). The ASP server 5 receives the selected operation input data from the user terminal A (3) and temporarily stores it into the storage device (step S225).

Here, it is judged whether or not the instruction of the user on the purchasing try-on list page is "check out for respective try-on persons" (step S227). In the case where it is judged that it is the "check out for respective try-on persons", the processing proceeds to processing of FIG. 50 through terminal U. In the case where it is judged that it is not the "check out for respective try-on persons", it is judged whether or not the instruction of the user on the purchasing try-on list page is "keep try-on" (step S229). In the case where it is judged that it is the "keep try-on", the processing returns to the step 79 (FIG. 17) through the terminal T. In the case where it is judged that it is not the "keep try-on", the processing proceeds to processing of FIG. 41 through terminal V.

Next, by using FIG. 41, a description will be given of a processing in the case where it is judged at the step S229 that it is not the "keep try-on" (in the case where the "check out for respective commodity" link 4004 is pressed on the purchasing try-on list page (for example, FIG. 40)). The ASP server 5 generates data of the "payment for selected commodity" page concerning the selected commodity, and transmits it to the user terminal A (3) (step S231). The user terminal A (3) receives the data of the "payment for selected commodity" page from the ASP server 5, and displays it on the display device (step S233).

FIG. 42 shows a first example of the "payment for selected commodity" page. The first example of the "payment for selected commodity" page shown in FIG. 42 includes a delivery destination address 4200, a payment registration history 4202, an check-out list 4204, a current payment sum input column 4206, a "register payment" button 4208, a "keep try-on" button 4210, a "return to try-on list" button 4212, an input column 4214 fro a sharing head count, an "register shared payment" button 4216, and a message 4218 to share the payment.

Here, there is shown the example of the "payment for selected commodity" page in the case where the "check out" link 4004 corresponding to the line of the sixth line (Hames shirt tried on by Kiyomi Tsujimoto) of the purchasing try-on list 4002 is pressed on the example of the second purchasing try-on list page shown in FIG. 40.

The delivery destination address 4200 indicates an address and a name of a destination of a commodity, which are set at the first payment registration concerning the commodity. The example of FIG. 42 indicates that it has not been set. The payment registration history 4202 indicates the history of payment registration concerning the commodity in a list form. The number of times of payment registration is also indicated. The example of FIG. 42 indicates a state in which there is no history of payment registration.

The check-out list 4204 indicates information of a commodity the account of which is to be settled and information concerning a payment sum. An input column of quantity is provided, and plural identical commodities can be purchased. By JAVA script or the like, a subtotal, an insufficient sum, and a sum in the message 4218 are calculated and displayed in accordance with a numerical value inputted in the input column of quantity.

The sum to be paid this time is inputted in the current payment sum input column 4206 by the user. When the "register payment" button 4208 is pressed, an instruction to perform payment registration concerning the sum inputted in the current payment sum input column 4206 to the commodity is resultantly selected and inputted by the user. In the case where the sum inputted in the current payment sum input column 4206 is less than a predetermined sum, the payment registration may be not received. The payment registration can not be made for such an input that an insufficient sum becomes minus.

When the "keep try-on" button 4210 is pressed, an instruction to return to the shared try-on page is resultantly selected and inputted by the user, and when the "return to try-on list" button 4212 is pressed, an instruction to return to the purchasing try-on list page is resultantly selected and inputted by the user.

The number of persons (i.e. the number of persons joining in the split of the payment) in the case where a joint purchase is made on a per capita basis with respect to the total sum of the commodity, is inputted by the user into the input column 4214 for the sharing head count. In the case where the "register shared payment" button 4216 is pressed, an instruction to perform payment registration of a sum for one person in the case where the sum is divided by the number inputted in the input column 4214 for the sharing head count is resultantly selected and inputted by the user. The message 4218 indicates the number of sharing members of the shared try-on page, which the user browses at present and the sum information in the case where the sum is divided by the number of persons.

Figure 41:
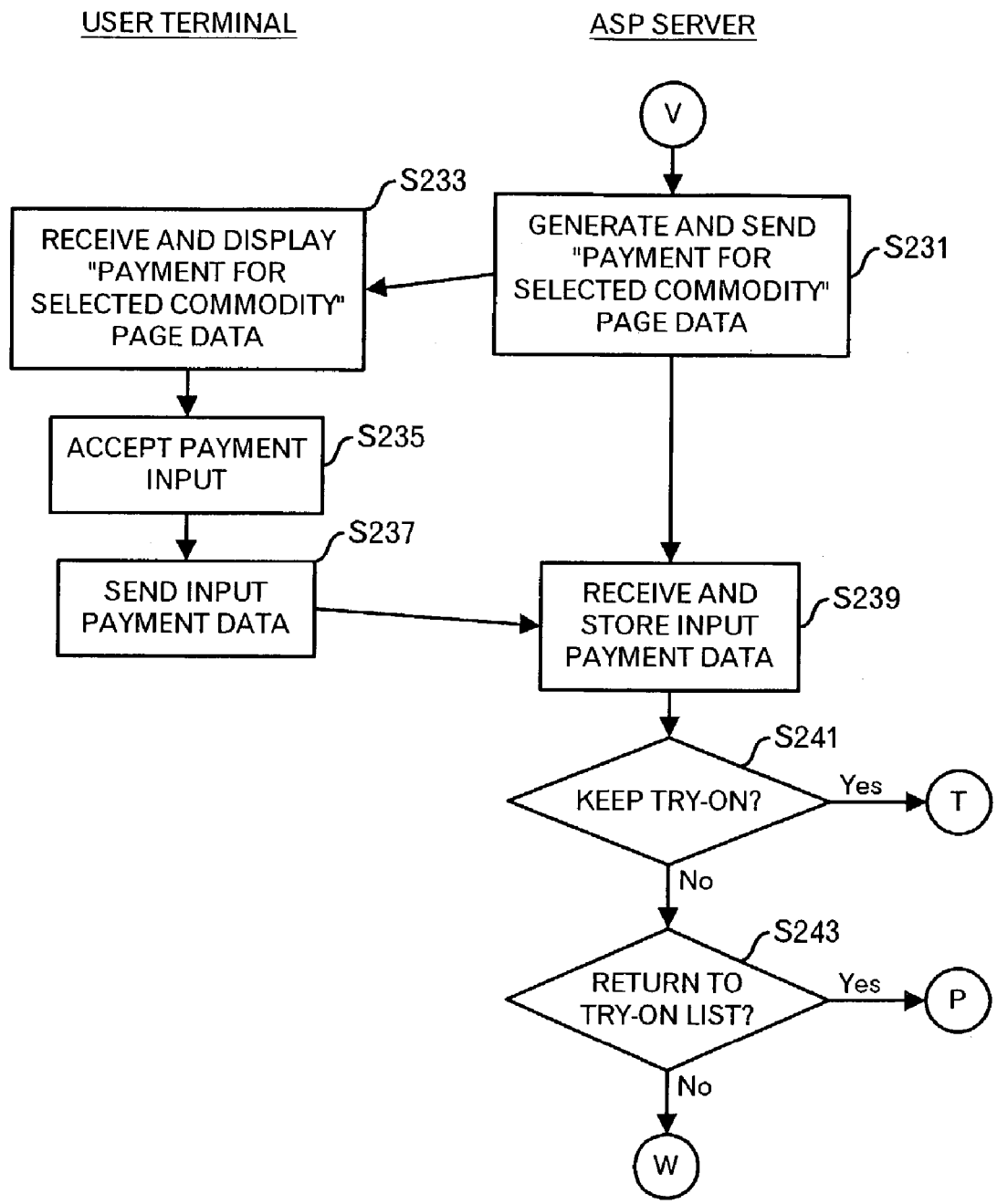
FIG. 41 is a drawing showing a thirteenth portion of the processing flow in the embodiment of the invention.

Returning to the processing flow of FIG. 41, the user terminal A (3) accepts a payment input by the user (step S235), and the user terminal A (3) transmits inputted payment data to the ASP server 5 (step S237). The ASP server 5 receives the inputted payment data from the user terminal A (3) and temporarily stores it into the storage device (step S239).

Here, it is judged whether or not the instruction of the user on the "payment for selected commodity" page is "keep try-on" (step S241). In the case where it is judged that it is the "keep try-on", the processing returns to the step 79 (FIG. 17) through the terminal T. In the case where it is judged that it is not the "keep try-on", it is judged whether or not the instruction of the user on the "payment for selected commodity" page is "return to try-on list" (step S243). In the case where it is judged that it is the "return to try-on list", the processing returns to the step S215 (FIG. 38) through the terminal P. In the case where it is judged that it is not the "return to try-on list", the processing proceeds to processing of FIG. 43 through terminal W.

By using FIG. 43, a description will be given of a processing of the case in which it is judged at the step S243 that it is not the "return to try-on list" (that is, in the case where the "register payment" button 4208 or the "register shared payment" button 4216 is pressed on the "payment for selected commodity" page (FIG. 42)). The ASP server 5 generates data of the "payment registration for selected commodity" page and transmits it to the user terminal A (3) (step S245). The user terminal A (3) receives the data of the "payment registration for selected commodity" page from the ASP server 5 and displays it on the display device (step S247).

FIG. 44 shows a first example of the "payment registration for selected commodity" page. The first example of the "payment registration for selected commodity" page shown in FIG. 44 includes a payment content 4400, a payment method setting part 4402, a destination address setting part 4404, a "register payment" button 4406, a "cancel" button 4408 and a message 4410.

Here, there is shown the example of the "payment registration for selected commodity" page in the case where the user (Kiyomi Tsujimoto) virtually trying on the commodity inputs, for example, "2000" to the current payment sum input column 4206 and presses the "register payment" button 4208 in the first example of the "payment for selected commodity" page shown in FIG. 42. That is, this is the example in the case where the registration of paying 2,000 yen of 5,400 yen necessary for the purchase of the commodity by herself is made, and the remainder of 3,400 yen is to be paid by the other sharing member.

The payment content 4400 indicates information of the commodity for which payment registration is about to be made and information concerning the payment sum. The data inputted in the "payment for selected commodity" page is reflected, so that "2,000" is indicated in a column of a current payment sum, "2,000" is indicated in a column of the cumulative total of payment registered sums, and "3,400" is indicated in a column of an insufficient sum.

For example, in the first example of the "payment for selected commodity" page shown in FIG. 42, in the case where for example, "3" is inputted in the input column 4214 for the sharing head count, and the "register shared payment" button 4216 is pressed, the current payment sum is automatically calculated, "1,800" is indicated in the column of the current payment sum, "1,800" is indicated in the column of the cumulative total of payment registered sums, and "3,600" is indicated in the column of the insufficient sum.

A payment method, such as a card or bank transfer, and information necessary for payment, such as a card number and a valid period, are inputted in the payment method setting part 4402.

Information of a delivery destination of a commodity is inputted in the destination address setting part 4404. Either "same as address" or "other" is selected by a radio button, and in the case of the "other", a destination as a delivery destination including a zip code, an address, a name and a telephone number is inputted. Here, "the same as registered address" means that the present login user (for example, Kiyomi Tsujimoto) uses the information registered in the user management DB (FIG. 3). That is, it is selected in the case where the user gives an instruction to deliver to himself or herself. For example, if a commodity is a gift or the like, the "other" is selected, and information necessary for the delivery is inputted.

In the case where plural payment registrations occur with respect to the same commodity, for example, in the case of the joint purchase, when the destination address is once registered, the destination address setting part 4404 is not included in the "payment for selected commodity" page with respect to the commodity, but the display of the registered delivery destination is included. That is, a user who additionally makes payment registration can make the payment registration after grasping the destination of the delivery.

When the "register payment" button 4406 is pressed, an instruction to make payment registration with the inputted contents is resultantly selected and inputted by the user, and when the "cancel" button 4408 is pressed, an instruction to stop the payment registration and to return to the "payment for selected commodity" page is resultantly selected and inputted by the user. The message 4410 indicates a message expressing whether or not an order can be made according to the existence of the insufficient sum.

Figure 43:
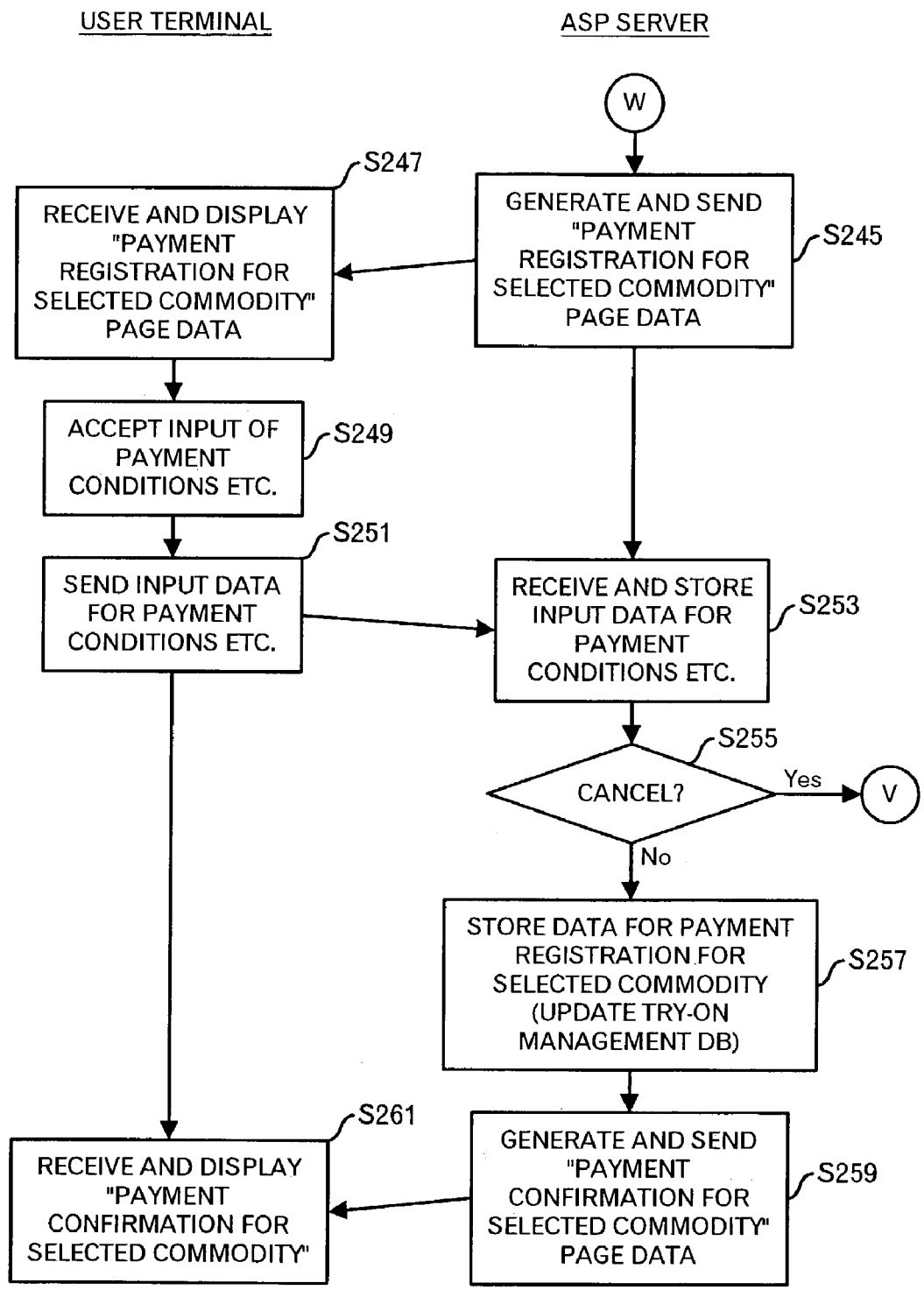
FIG. 43 is a drawing showing a fourteenth portion of the processing flow in the embodiment of the invention.

Returning to the processing flow of FIG. 43, the user terminal A (3) accepts an input of payment conditions or the like by the user (step S249), and the user terminal A (3) transmits input data of the payment conditions or the like to the ASP server 5 (step S251). The ASP server 5 receives the input data of the payment conditions or the like from the user terminal A (3) and temporarily stores it into the storage device (step S253).

Here, it is judged whether or not the instruction of the user on the "payment registration for selected commodity" page is "cancel" (step S255). In the case where it is judged that it is the "cancel", the processing returns to the step S231 (FIG. 41) through the terminal V. In the case where it is judged that it is not the "cancel", that is, in the case where an instruction to perform the payment registration processing with the contents inputted on the "payment registration for selected commodity" page is selected and inputted by the user, the ASP server 5 stores the payment registration data for selected commodity into the try-on management DB 51. Specifically, a record is added to the purchase management table (FIG. 7) or a corresponding record is updated. At that time, with respect to payment data in which a value in the column 726 of the sum statuses becomes "order enable", a record may be added to the order table (FIG. 8).

The ASP server 5 generates data of the confirmation page indicating that the payment registration for selected commodity is completed, and transmits it to the user terminal A (3) (step S259). The user terminal A (3) receives the data of the confirmation page indicating that the payment registration for selected commodity is completed from the ASP server 5 and displays it on the display device (step S261).

FIG. 45 shows a first example of a "payment confirmation for selected commodity" page. The first example of the "payment confirmation for selected commodity" page shown in FIG. 45 includes a confirmation message 4500, commodity information 4502, a delivery destination address 4504, payment information 4506, and a payment registration reception deadline 4508.

Here, there is shown the example of the "payment confirmation for selected commodity" page in the case where further necessary information (card number, etc.) is inputted and the "register payment" button 4406 is pressed in the example of the "payment registration for selected commodity" page shown in FIG. 44. The confirmation message 4500 indicates a message concerning completion of the payment registration and a payment sum. The commodity information 4502 indicates information of the object commodity of the payment registration.

The delivery destination address 4504 indicates information of the destination, which is set and registered in the destination address setting part 4404 of the first example of the "payment registration for selected commodity" page (FIG. 44). In this example, there is shown an extraction result of information relating to the address of the user (Kiyomi Tsujimoto) having performed the payment registration from the user management DB 53. The payment information 4506 indicates a name of a user having performed the payment registration on the first example of the "payment registration for selected commodity" page (FIG. 44), a payment sum, a payment method, a total sum, and an insufficient sum. Here, in the case where there are plural users having performed the payment registration, user names, payment sums, and payment methods are shown by a list as the history information, and the corresponding total sums and insufficient sums are indicated. In the case where there is no insufficient sum (i.e. total payment sum reaches the purchase price), the insufficient sum is not indicated.

The payment registration reception deadline 4508 indicates a period in which payment registration of other users is accepted. In the case where there is no insufficient sum (i.e. the total payment sum reaches the purchase price), the reception of the payment registration is ended and proceeds to an order processing, and therefore, the payment registration reception deadline 4508 is not included in this page.

FIG. 46 shows an example of the purchasing try-on list after the payment registration for selected commodity is made in accordance with the above example. The third example of the purchasing try-on list page shown in FIG. 46 includes a page title 4600, a purchasing try-on list 4602, a "check out for respective commodity" link 4604, a "check out for respective try-on persons" button 4606, and a "keep try-on" button 4608. This is different from the second example of the purchasing try-on list page shown in FIG. 40 in a cumulative total of payment registered sums, an insufficient sum and a payment registration reception deadline in the information at the sixth line (shirt of Hames tried on by Kiyomi Tsujimoto) of the purchasing try-on list 4602. That is, the execution result of the above-described payment registration processing for selected commodity is reflected like this.

Figure 47:
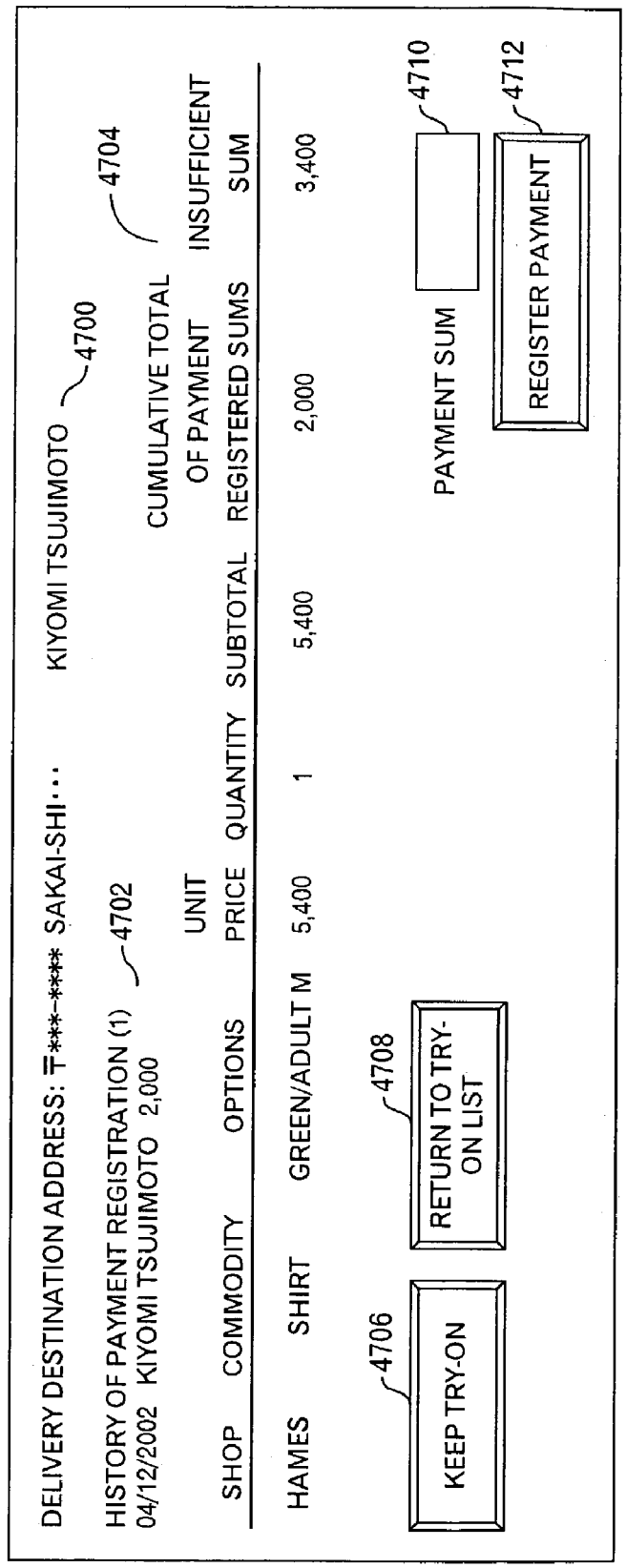
FIG. 47 is a drawing showing a second example of the "payment for selected commodity" page.

Here, FIGS. 47 to 49 show examples of the page in the case where for example, another user (for example, Chikage Ogi) further performs the "payment registration for selected commodity" for the sixth line (shirt of Hames tried on by Kiyomi Tsujimoto) of the purchasing try-on list 4602. The processing flow is the same as the foregoing processing from the step S231.

FIG. 47 shows a second example of the "payment for selected commodity" page. The second example of the "payment for selected commodity" page shown in FIG. 47 includes a destination 4700, a payment registration history 4702, a check-out list 4704, a "keep try-on" button 4706, a "return to try-on list" button 4708, a current payment sum input column 4710, and a "register payment" button 4712.

The destination 4700 indicates the address and name of the delivery destination of the commodity, which were set at the time of the first payment registration concerning the commodity. The payment registration history 4702 indicates the history of payment registration concerning the commodity in a list form. The number of times of payment registration is also indicated. In the example of FIG. 47, one item of the payment registration is indicated in the history.

The check-out list 4704 indicates information of a commodity the account of which is about to be settled and information concerning a payment sum. In a difference from the first example of the "payment for selected commodity" page shown in FIG. 42, an input column of quantity is not provided, and a change of quantity can not be made. With respect to the current payment sum input column 4710 and the respective buttons, the same processing as the first example of the "payment for selected commodity" page shown in FIG. 42 is performed.

In the case where the user having first made the payment registration makes the shared payment registration, instead of the current payment sum input column 4710 and the "register payment" button 4712, a "register shared payment" button may be included in this page.

FIG. 48 shows a second example of the "payment registration for selected commodity" page. The second example of the "payment registration for selected commodity" page shown in FIG. 48 includes a delivery destination address 4800, a payment content 4802, a payment method setting part 4804, an "order" button 4806, a "cancel" button 4808 and a message 4810.

Here, there is shown the example of the "payment registration for selected commodity" page in the case where the user (for example, Chikage Ogi) inputs, for example, "3400" in the current payment sum input column 4710 and presses the "register payment" button 4712 in the second example of the "payment for selected commodity" page shown in FIG. 47. That is, this is the example in the case where since the payment registration has been already performed for 2,000 yen of 5,400 yen necessary for the commodity purchase, the remainder of 3,400 yen is about to be paid.

The delivery destination address 4800 indicates information of the delivery destination of the commodity, which was set at the first payment registration. The payment content 4802 indicates information of the commodity for which the payment registration is about to be made and information concerning the payment sum. The data received on the "payment for selected commodity" page is reflected, so that "3,400" is indicated in the column of the current payment sum, "5,400" is indicated in the column of the cumulative total of payment registered sums, and "0" is indicated in the column of the insufficient sum. A payment method, such as a card or bank transfer, and information necessary for payment, such as a card number and a valid period, are inputted in the payment method setting part 4804.

In the example of this page, in the case where the cumulative total of payment registered sums reaches the sum necessary for the purchase, instead of the "register payment" button 4406 on the first example of the "payment registration for selected commodity" page shown in FIG. 44, the "order" button 4806 is included. When the "order" button 4806 is pressed, an instruction to perform payment registration with the inputted content is resultantly selected and inputted by the user, and when the "cancel" button 4808 is pressed, an instruction to stop the payment registration and to return to the "payment for selected commodity" page is resultantly selected and inputted by the user. The message 4810 indicates a message expressing whether or not an order can be made according to the existence of an insufficient sum.

FIG. 49 shows a second example of the "payment confirmation for selected commodity" page. The second example of the "payment confirmation for selected commodity" page shown in FIG. 49 includes a confirmation message 4900, commodity information 4902, a delivery destination address 4904, and payment information 4906.

Here, there is shown the example of the "payment confirmation for selected commodity" page in the case where the payment method is set and the "order" button 4806 is pressed in the example of the "payment registration for selected commodity" page shown in FIG. 48. The confirmation message 4900 indicates a message expressing that the order is completed. The commodity information 4902 indicates information of the object commodity of the payment registration (order).

The delivery destination address 4904 indicates information of the delivery destination, which was set and registered in the destination address setting part 4404 of the first example of the "payment registration for selected commodity" page (FIG. 44). The payment information 4906 indicates, as history information of payment registration concerning the purchase of the commodity, a list of names of users having performed the payment registration, the payment sum, and the payment method, and indicates the corresponding total sum and an insufficient sum.

Since this example shows the case where there is no insufficient sum (that is, the case where the total payment sum reaches the purchase price), the insufficient sum is not indicated. In the example of this page, since the reception of the payment registration is ended, and the processing proceeds to the order processing, differently from the example of the "payment confirmation for selected commodity" page shown in FIG. 45, the payment registration reception deadline is not included.

With respect to the user having set the payment method as the bank transfer, cheque, or the like, all users may be previously notified of the account for the bank transfer or the destination for the remittance, or they may be notified by e-mail or the like after the order.

Next, by using FIG. 50, a description will be given of a processing (processing subsequent to the terminal U) in the case where it is judged at the step S227 that the instruction is the check-out for respective try-on persons. The ASP server 5 generates data of a paid try-on person selection page and transmits it to the user terminal A (3) (step S263). The user terminal A (3) receives the data of the paid try-on person selection page from the ASP server 5 and displays it on the display device (step S265).

FIG. 51 shows an example of the paid try-on person selection page. The example of the paid try-on person selection page shown in FIG. 51 includes a paid try-on person selection list 5100, a "keep try-on" button 5102, a "return to try-on list" button 5104, and a "pay" button 5106.

Here, there is shown the example of the paid try-on person selection page in the case where the "check out for respective try-on persons" button 396 is pressed in the first example of the purchasing try-on list page shown in FIG. 39. The paid try-on person selection list 5100 indicates a list of names of the sharing try-on members and commodities tried on by the members. The members are selected by the radio button. Even if a person is a member of the sharing group, in the case where any commodity is not tried on, the person is not indicated in the paid try-on person selection list 5100.

When the "keep try-on" button 5102 is pressed, an instruction to return to the shared try-on page is resultantly selected and inputted by the user, and when the "return to try-on list" button 5104 is pressed, an instruction to return to the purchasing try-on list page is resultantly selected and inputted by the user.

Figure 50:
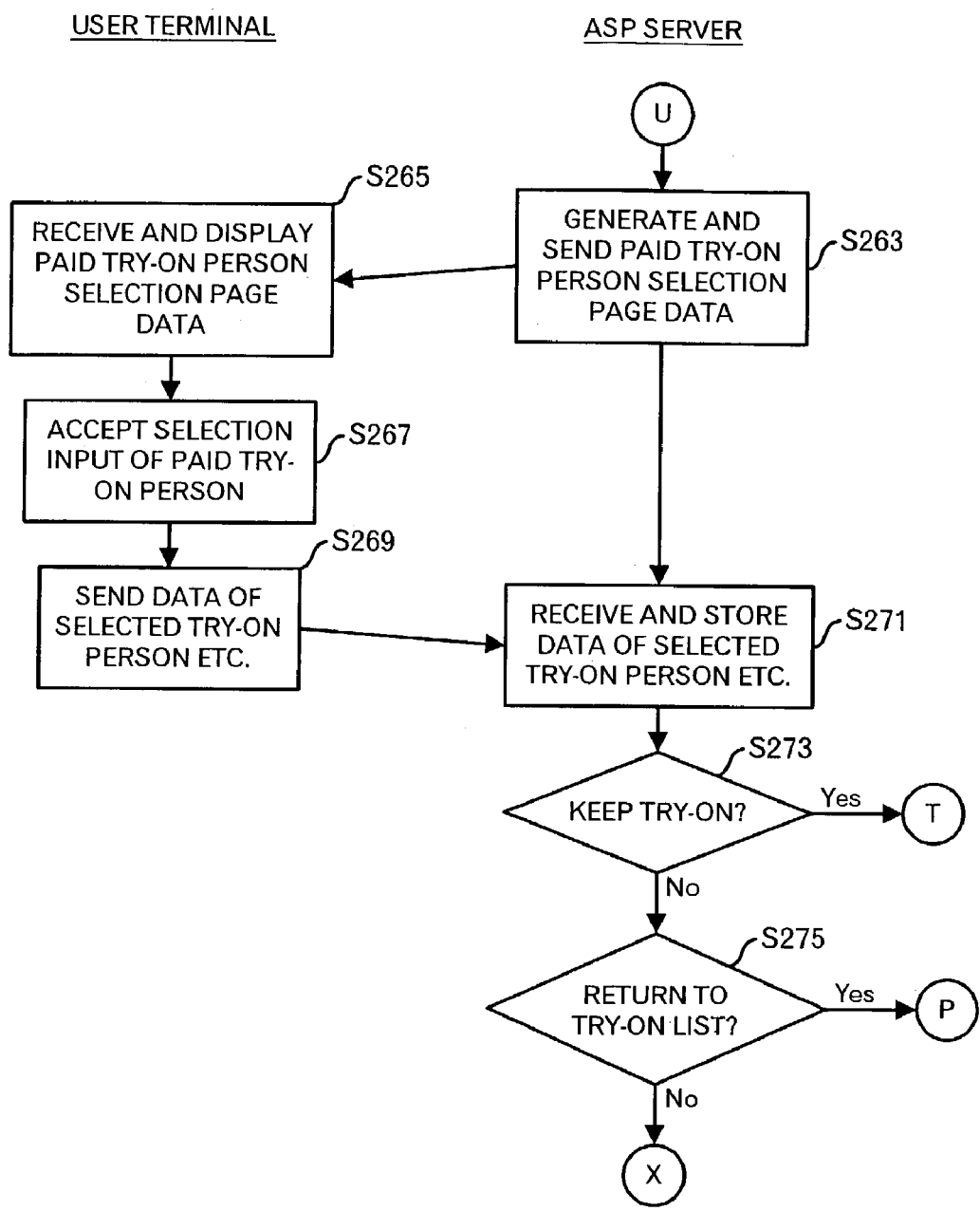
FIG. 50 is a drawing showing a fifteenth of the processing flow in the embodiment of the invention.

Returning to the processing flow of FIG. 50, the user terminal A (3) receives a selection input of an paid try-on person or the like by the user (step S267), and the user terminal A (3) transmits data of the selected try-on person or the like to the ASP server 5 (step S269). The ASP server 5 receives the data of the selected try-on person or the like from the user terminal A (3) and temporarily stores it into the storage device (step S271).

Here, it is judged whether or not the instruction of the user on the paid try-on person selection page is "keep try-on" (step S273). In the case where it is judged that it is the "keep try-on", the processing returns to the step S79 (FIG. 17) through the terminal T. In the case where it is judged that it is not the "keep try-on", it is judged whether or not the instruction of the user on the paid try-on person selected page is the "return to try-on list" (step S275). In the case where it is judged that it is the "return to try-on list", the processing returns to the step S215 (FIG. 38) through the terminal P. In the case where it is judged that it is not the "return to try-on list", the processing proceeds to processing of FIG. 52 through terminal X.

By using FIG. 52, a description will be given of a processing of the case where it is judged at the step S275 that it is not the "return to try-on list". The ASP server 5 generates data of a "payment for selected try-on person" page concerning the commodity tried on by the selected member and transmits it to the user terminal A (3) (step S277). The user terminal A (3) receives the data of the "payment for selected try-on person" page from the ASP server 5 and displays it on the display device (step S279).

FIG. 53 shows an example of the "payment for selected try-on person" page. The example of the "payment for selected try-on person" page includes a delivery destination address 5300, a payment registration history 5302, a check-out list 5304, a total sum 5306, a cumulative total 5308 of payment registered sums, an insufficient sum 5310, a current payment sum input column 5312, a "register payment" button 5314, a "keep try-on" button 5316, a "return to try-on list" button 5318, an input column 5320 for sharing head count, an "register shared payment" button 5322, and a message 5324 for shared payment.

Here, there is shown the example of the "payment for selected try-on person" page in the case where a radio button corresponding to the line of the first try-on person user (Akemi Inoue) in the paid try-on person selection list 5100 is selected and the "pay" button 5106 is pressed in the example of the paid try-on person selected page shown in FIG. 51.

The delivery destination address 5300 indicates an address and a name of a delivery destination of a commodity, which are set at the first payment registration concerning the try-on person. The example of FIG. 53 indicates that they have not been set. The payment registration history 5302 indicates the history of payment registration concerning the try-on person in a list form. The number of times of payment registration is also indicated. The example of FIG. 53 shows a state where there is no history of payment registration.

The check-out list 5304 indicates information of a commodity the account of which is about to be settled and information concerning a payment sum in a list form. An input column of quantity is provided, and it is possible to indicate user's intention to purchase plural identical commodities or not to purchase a specific commodity by inputting "0". In the case where the user to be paid tries on plural commodities (for example, a T-shirt and a skirt, etc.), this page is different from the "payment for selected commodity" page shown in FIGS. 42 and 47 in the number of commodities (i.e. number of lines) shown in this check-out list 5304. Thus, as the check-out list 5304 includes the plural lines, and the total 5306, the cumulative total 5308 of payment registered sums, and the insufficient sum 5310 are indicated in the lower stage of the check-out list 5304.

Similar to the "payment for selected commodity" page shown in FIG. 42, by the JAVA script etc., a subtotal, the total 5306, the insufficient sum 5310, and the sum in the message 5324 are calculated and displayed in accordance with the numerical value inputted in the input column of quantity.

A sum to be paid this time is inputted in the current payment sum input column 5312 by the user. When the "register payment" button 5314 is pressed, an instruction to perform payment registration concerning the sum inputted in the current payment sum input column 5312 is resultantly selected and inputted by the user. In the case where the sum inputted in the current payment sum input column 5312 is less than a predetermined sum, the payment registration may be not received. The payment registration can not be performed for such an input that the insufficient sum becomes minus.

When the "keep try-on" button 5316 is pressed, an instruction to return to the shared try-on page is resultantly selected and inputted by the user, and when the "return to try-on list" button 5318 is pressed, an instruction to return to the purchasing try-on list page is resultantly selected and inputted by the user.

The number of persons (the number of persons joining in the shared payment) in the case where a joint purchase is made on a per capita basis with respect to the total sum of the commodities is inputted in the input column 5320 for the sharing head count by the user. In the case where the "register shared payment" button 5322 is pressed, an instruction to perform payment registration of a sum for one person when the payment is split by the number inputted in the input column 5320 for the sharing head count is resultantly selected and inputted by the user. The message 5324 for the shared payment indicates the number of sharing members on the shared try-on page, which the user presently browses and sum information in the case where the payment is split by the number of persons.

Figure 52:
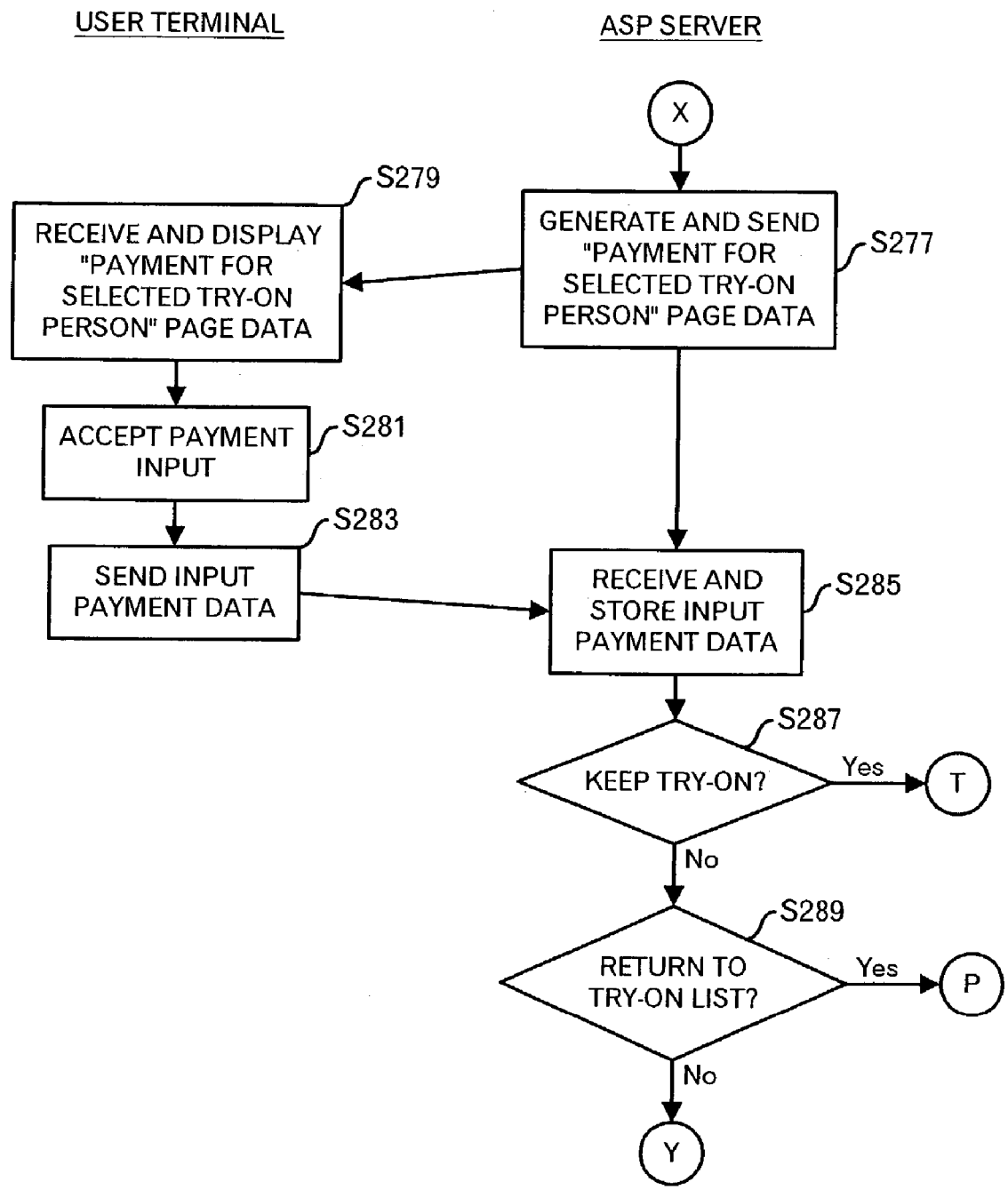
FIG. 52 is a drawing showing a sixteenth of the processing flow in the embodiment of the invention.

Returning to the processing flow of FIG. 52, the user terminal A (3) accepts the payment input, such as quantity, by the user (step S281), and the user terminal A (3) transmits the inputted payment data to the ASP server 5 (step S283). The ASP server 5 receives the inputted payment data from the user terminal A (3) and temporarily stores it into the storage device (step S285).

Here, it is judged whether or not the instruction of the user on the "payment for selected try-on person" page is "keep try-on" (step S287). In the case where it is judged that it is the "keep try-on", the processing returns to the step 79 (FIG. 17) through the terminal T. In the case where it is judged that it is not the "keep try-on", it is judged whether or not the instruction of the user on the "payment for selected try-on person" page is "return to try-on list" (step S289). In the case where it is judged that it is the "return to try-on list", the processing returns to the step S215 (FIG. 38) through the terminal P. In the case where it is judged that it is not the "return to try-on list", the processing proceeds to processing of FIG. 54 through terminal Y.

By using FIG. 54, a description will be given of a processing in the case where it is judged at the step S289 (FIG. 52) that it is not the "return to try-on list" (in the case where the "register payment" button 5314 or the "register shared payment" button 5322 is pressed on the "payment for selected try-on person" page (FIG. 53)). The ASP server 5 generates data of a "payment registration for selected try-on person" page and transmits it to the user terminal A (3) (step S291). The user terminal A (3) receives the data of the "payment registration for selected try-on person" page from the ASP server 5 and displays it on the display device (step S293).

FIG. 55 shows an example of the "payment registration for selected try-on person" page. The example of the "payment registration for selected try-on person" page includes a payment content 5500, a total 5502, a current payment sum 5504, a cumulative total 5506 of payment registered sums, an insufficient sum 5508, a payment method setting part 5510, a destination address setting part 5512, an "order" button 5514, a "cancel" button 5516 and a message 5518.

Here, there is shown the example of the "payment registration for selected try-on person" page in the case where the user inputs, for example, "17900" in the current payment sum input column 5312 and presses the "register payment"

button 5314 in the example of the "payment for selected try-on person" page shown in FIG. 53. That is, the example shows the case where the payment registration of the sum total of 17,900 yen necessary for the commodity purchase is made.

The payment content 5500 indicates information of a commodity for which payment registration is about to be made, and information concerning a payment sum. Similar to the "payment for selected try-on person" page shown in FIG. 53, the total 5502, the current payment sum 5504, the cumulative total 5506 of payment registered sums, and the insufficient sum 5508 are indicated at the lower stage of the payment content 5500. The data inputted on the "payment for selected try-on person" page is reflected, so that "17,900" is indicated in the current payment sum 5504, "17,900" is indicated in the column of the cumulative total of payment registered sums, and "0" is indicated in the column of the insufficient sum.

Processing in the case where the "register shared payment" button 5322 is pressed on the "payment for selected try-on person" page, and processing in the payment method setting part 5510 and the destination address setting part 5512 have the same content as that in the "payment registration for selected commodity" page shown in FIG. 44.

When the "order" button 5514 is pressed, an instruction to make payment registration with the inputted content is resultantly selected and inputted by the user, and when the "cancel" button 5516 is pressed, an instruction to stop the payment registration and to return to the "payment for selected try-on person" page is resultantly selected and inputted by the user. The message 5518 indicates a message expressing whether or not an order can be made according to the existence of an insufficient sum. In the case where there is an insufficient sum, similarly to the above-described "payment registration for selected commodity", a "register payment" button is included in this page instead of the "order" button 5514, and the content of the message 5518 is also changed.

When payment registration is additionally made with respect to the same try-on person, similarly to the example of the "payment registration for selected commodity" page shown in FIG. 48, instead of the destination address setting part 5512, the registered delivery destination is indicated.

Figure 54:
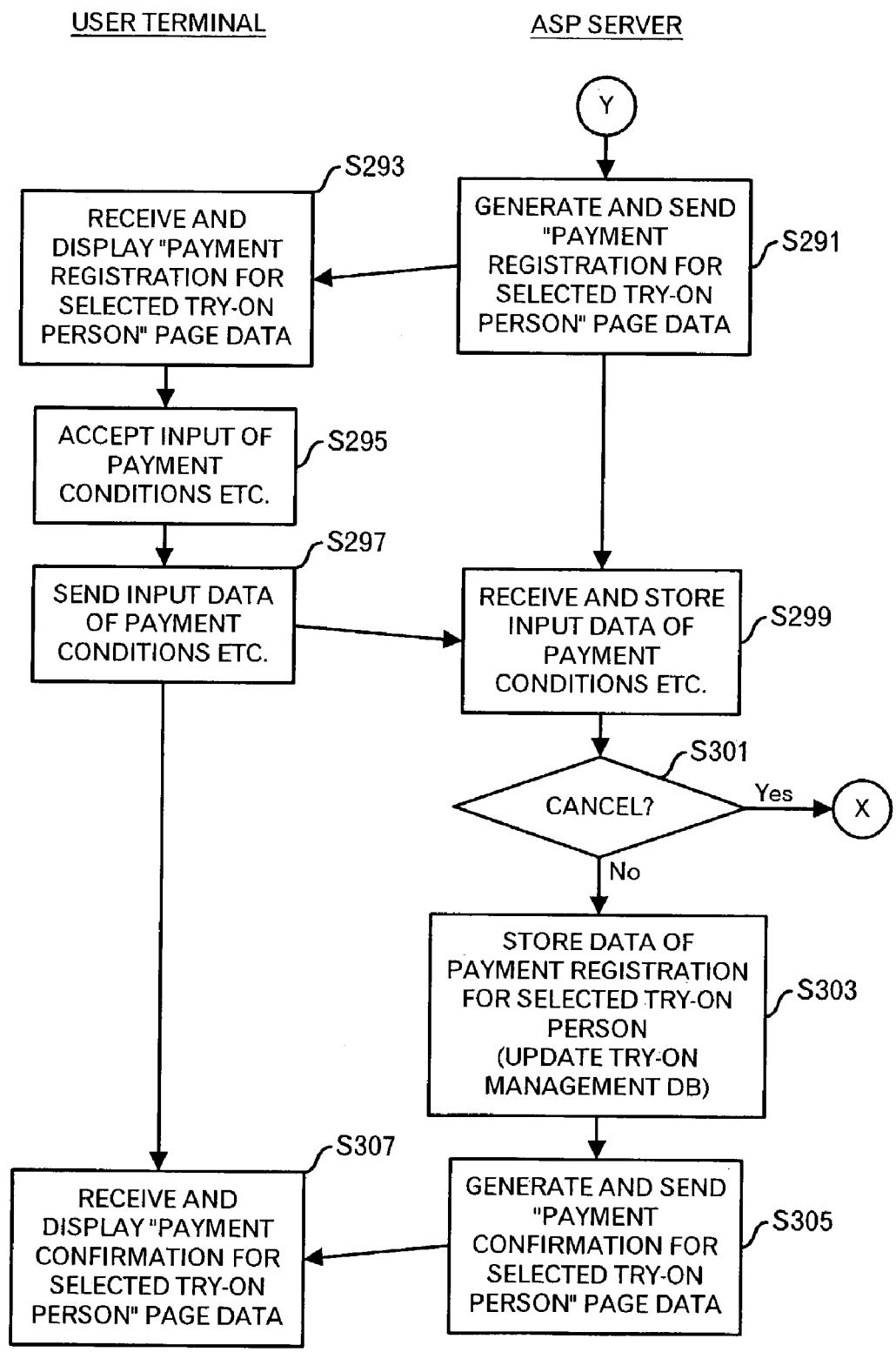
FIG. 54 is a drawing showing a seventeenth of the processing flow in the embodiment of the invention.

Returning to the processing flow of FIG. 54, the user terminal A (3) accepts an input of payment conditions or the like by the user (step S295), and the user terminal A (3) transmits input data of the payment conditions or the like to the ASP server 5 (step S297). The ASP server 5 receives the input data of the payment conditions or the like from the user terminal A (3) and temporarily stores it into the storage device (step S299).

Here, it is judged whether or not the instruction of the user on the "payment registration for selected try-on person" page is "cancel" (step S301). In the case where it is judged that it is the "cancel", the processing returns to the step S277 (FIG. 52) through the terminal X. In the case where it is judged that it is not the "cancel", that is, in the case where the instruction to make the payment registration processing with the content inputted on the "payment registration for selected try-on person" page is selected and inputted by the user, the ASP server 5 stores the payment registration data for selected try-on person into the try-on management DB 51 (step S303). Specifically, a record is added to the purchase management table (FIG. 7) or a corresponding record is updated. At that time, with respect to the payment data in which a value in the column 726 of the sum statuses becomes "order enable", a record may be added to the order table (FIG. 8).

The ASP server 5 generates data of a "payment confirmation for selected try-on person" page indicating that the payment registration for selected try-on person is completed, and transmits it to the user terminal A (3) (step S305). The user terminal A (3) receives the data of the payment confirmation page indicating that the payment registration for selected try-on person is completed from the ASP server 5 and displays it on the display device (step S307).

FIG. 56 shows an example of a "payment registration for selected try-on person" page. The example of the "payment registration for selected try-on person" page shown in FIG. 56 includes a confirmation message 5600, commodity information 5602, a delivery destination address 5604 and payment information 5606.

Here, there is shown the example of the "payment registration for selected try-on person" page in the case where necessary information (card number, etc.) is further inputted and the "order" button 5514 is pressed in the example of the "payment registration for selected try-on person" page shown in FIG. 55. The confirmation message 5600 indicates a message expressing that the order is completed. The commodity information 5602 indicates information of the object commodities of the payment registration (order). In a difference from the "payment for selected commodity", the information is displayed in a list form composed of one or plural lines, and the total sum is indicated at the lower part of the list.

The delivery destination address 5604 indicates information of the destination set and registered in the destination address setting part 5512 in the "payment registration for selected try-on person" page (FIG. 55). This example shows the result in which information concerning the address of the user (Akemi Inoue) having made the payment registration is extracted from the user management DB 53. The payment information 5606 indicates a user name who made payment registration on the respective "payment registration for selected try-on person" page (FIG. 55), a payment sum, a payment method, a total sum, and an insufficient sum. Here, in the case where there are plural users having made the payment registration, as history information, names of users having made the payment registration, payment sums and payment methods are displayed in a list, and the corresponding total sum and insufficient sum are indicted.

Similar to the payment for selected commodity, in the case where there is no insufficient sum (total payment sum reaches the purchase price), an insufficient sum is not indicated, and in the case where there is an insufficient sum, a period in which payment registration of other users is received is indicated as payment registration reception deadline.

The processing concerning the virtual try-on and the payment on the shared try-on page is performed in the manner as described above.

Next, by using FIG. 57, a description will be given of a processing (processing subsequent to the terminal D) in the case where it is judged at the step S35 (FIG. 13) that existing try-on data does not exist, and a case where it is judged at the step S47 (FIG. 15) that there is no sharing, or a case where it is judged at the step S165 (FIG. 29) that there is no sharing state (in the case where a "shift to try-on screen" button is pressed on a private try-on list page described later) or a case where it is judged at the step S213 (FIG. 37) that there is no sharing state (processing subsequent to the terminal F).

Subsequent to the terminal D, the ASP server 5 performs a DB storage processing of new private data (step S309). Specifically, a new record is added to the basket management table (FIG. 4) of the try-on management DB 51. A value in the column 412 of the private persons or groups may be registered as "private person", and a value in the column 410 of the screen URLs (directory), together with a value in the column 402 of the names, is inputted by a user by using a not-shown page, or the value may be automatically generated.

The ASP server 5 generates try-on part selection page data and transmits it to the user terminal A (3) (step S311). The user terminal A (3) receives the try-on part selection page data from the ASP server 5 and displays it on the display device (step S313).

FIG. 58 shows an example of the try-on part selection page. The example of the try-on part selection page shown in FIG. 58 includes a try-on list (individual) name 5800, commodity information 5802, a try-on list 5804, a "try-on" button 5806, and a "cancel" button 5808. The try-on list (individual) name 5800 indicates a name of a user, and it is possible to specify who performs try-on. The commodity information 5802 includes information of a commodity to be tried on, such as a name of a manufacturer or a selling shop, or a commodity kind.

The try-on list 5804 includes a part, a shop, a commodity and an option, and shows list information, which indicates what commodity (red 7-size skirt, etc.) of what place (shop) is tried on to which part (upper body, etc.) of a user. Each line can be selected by a radio button. In the case where the line is selected and the "try-on" button 5806 is pressed, a try-on instruction is resultantly selected and inputted by the user. In the case where the "cancel" button 5808 is pressed, the processing may return to the page, which the user browsed prior to this page or may proceed to the next without performing try-on.

There is also a case where a setting is made such that a T-shirt can not be tried on to the lower body. In the example of FIG. 58, although try-on is performed to the lower body and the foot, in the case of a new try-on processing through the step S309, "none" is indicated on all lines of the try-on list 5804.

Figure 57:
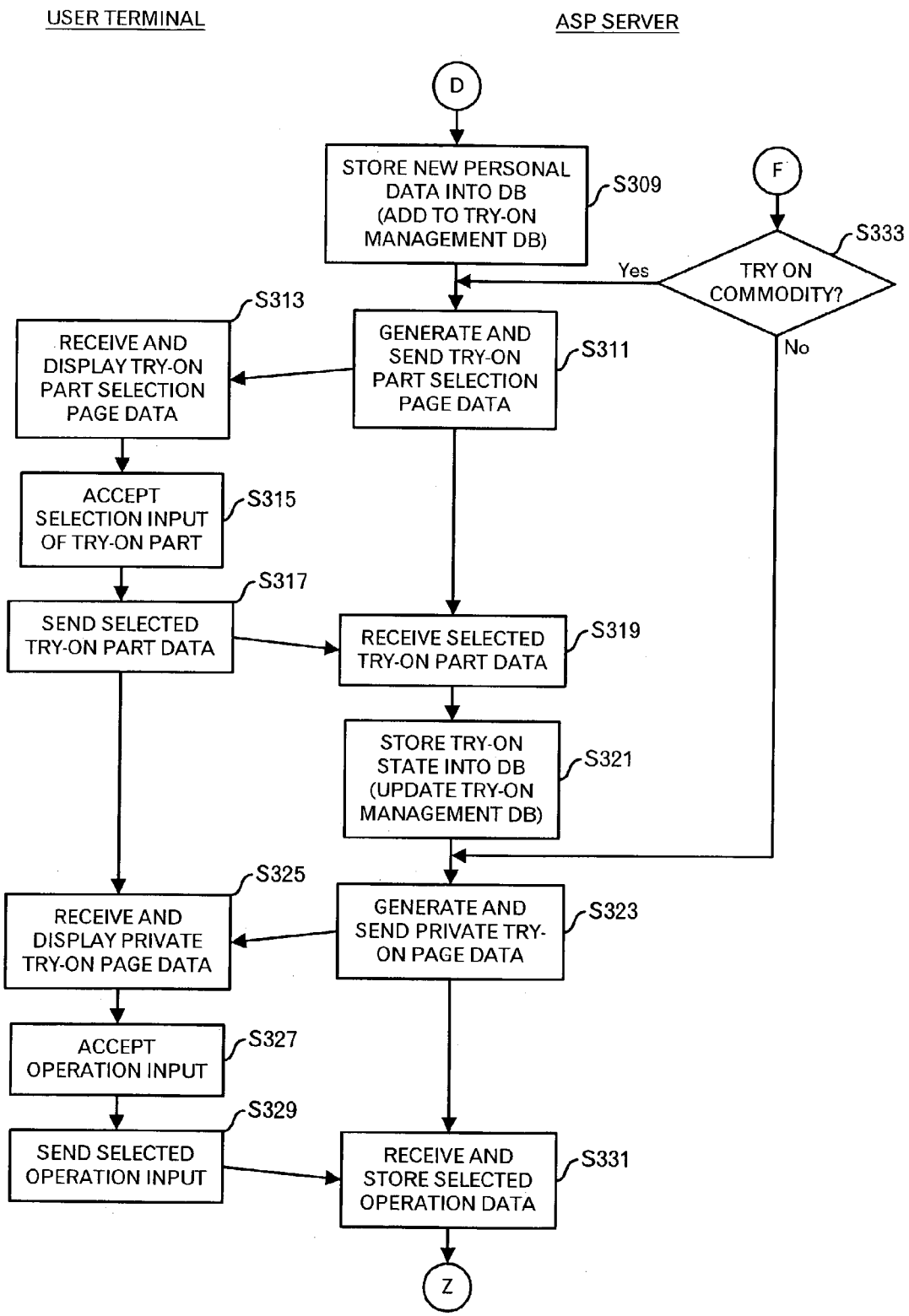
FIG. 57 is a drawing showing a eighteenth of the processing flow in the embodiment of the invention.

Returning to the processing flow of FIG. 57, the user terminal A (3) accepts a try-on part selection input by the user (step S315), and the user terminal A (3) transmits selected try-on part data to the ASP server 5 (step S317). The ASP server 5 receives the selected try-on part data from the user terminal A (3) and temporarily stores it into the storage device (step S319). Further, the ASP server 5 uses the received data to add a record to the try-on entry table (FIG. 6) of the try-on management DB 51 or to update the try-on entry table (FIG. 6) (step S321).

At this time, in the case where it is necessary to realize consistency with the purchase management table (FIG. 7) (for example, a commodity for which try-on is stopped is not purchased), if there is a record of the purchase management table corresponding to a record updated (erased by overwriting) in the try-on entry table (that is, a value of the basket ID and a value of the item number (NO.) are the same), that is deleted. Although there is no private record with respect to the user entry table, it may be generated similarly to that for the sharing group.

After the end of the DB update processing, the ASP server 5 generates private try-on page data, and transmits it to the user terminal A (3) (step S323). The user terminal A (3) receives the private try-on page data from the ASP server 5, and displays it on the display device (step S325).

FIG. 59 shows an example of the private try-on page. The example of the private try-on page shown in FIG. 59 includes a URL 5900, a page title 5902, an "select other commodity" button 5904, a "try-on list" button 5906, a "share screen" button 5908, a "buy" button 5910, an "end" button 5912, a virtual try-on image 5914, and a purchase candidate list 5916. The URL 5900 indicates an address of this page. The user creating the try-on page uses this address to browse the try-on page, and then, can select (or gets on and off) a tried-on commodity. The page title 5902 indicates a name of the user, and the user can confirm that he or she browses his own or her own try-on page.

In the case where the "select other commodity" button 5904 is pressed, an instruction to shift to a homepage managed by a shopping site (for example, the shopping site A server (9)) is resultantly selected and inputted by the user in order to select a commodity not tried on. A list of tie-up shopping sites may be displayed or a direct transition may be performed to one shopping site previously registered by the user.

In the case where the "try-on list" button 5906 is pressed, an instruction to shift to a try-on list page is resultantly selected and inputted by the user in order to perform an operation of getting on and off a commodity. In the case where the "share screen" button 5908 is pressed, an instruction to shift to the sharing group list page (FIG. 16) is resultantly selected and inputted by the user in order to shift to the sharing try-on scene. In the case of a user who does not have a sharing group managed by himself or herself, a shift to the sharing group creation and edit page (FIG. 22) is performed.

In the case where the "buy" button 5910 is pressed, an instruction to shift to a page on which the account of the tried-on commodity is settled is resultantly selected and inputted by the user. In the case where the "end" button 5912 is pressed, an instruction to end the try-on or browsing is resultantly selected and inputted by the user.

The virtual try-on image 5914 includes an image of a user and images of tried-on commodities. The purchase candidate list 5916 includes information of the commodity tried on by the user, and in cooperation with the virtual try-on image 5914, it is possible to see what commodity is tried on and how is the appearance. Although this embodiment has such a structure that a user performs an operation of getting on and off a commodity on the try-on list page, an operation of getting on and off may be performed by drag-and-drop of a mouse to a commodity image of the virtual try-on image 5914. In this case, it is necessary to manage layers and position information of the respective commodity images and user images by, for example, JAVA.

Returning to the processing flow of FIG. 57, the user terminal A (3) accepts an operation (i.e. selection) input by the user on the private try-on page (step S327), and the user terminal A (3) transmits received selected operation data to the ASP server 5 (step S329). The ASP server 5 receives the selected operation data of the user on the private try-on page from the user terminal A (3) and temporarily stores it into the storage device (step S331). The processing proceeds to processing of FIG. 60 through terminal Z.

Subsequent to the terminal F, the ASP server 5 judges whether or not the request from the user terminal A (3) is try-on of a commodity (step S333). That is, it is judged whether or not the try-on page is displayed after the selected commodity is tried on (through the step S47 (FIG. 15) or through the step S213 (FIG. 37)) or only the display of the try-on page (through the step S165 (FIG. 29)) is sufficient. In the case where it is judged that it is the commodity try-on, the processing proceeds to the processing of the step S311. In the case where it is judged that it is not the commodity try-on, the processing proceeds to the processing of the step S323.

Subsequent to the terminal Z, on the basis of the selected operation data received at the step S331, the ASP server 5 makes following judgments concerning the instruction of the user. First, it is judged whether or not the instruction is other commodity selection, that is, on the private try-on page (FIG. 59), whether or not the "select other commodity" button 5904 is pressed to shift to a commodity selection homepage managed by a shopping site (for example, the shopping site A server (9)) (step S335). In the case where it is judged that it is the other commodity selection, the processing proceeds to the processing of FIG. 37 (common to the processing in the sharing try-on) through the terminal L.

In the case where it is judged that it is not the other commodity selection, it is judged whether or not the instruction is display instruction of the try-on list, that is, whether or not the "try-on list" button 5906 is pressed on the private try-on page (FIG. 59) (step S337). In the case where it is judged that it is the display instruction of the try-on list, the processing proceeds to the processing (common to the processing in the sharing try-on) of FIG. 29 through the terminal M.

FIG. 61 shows an example of a private try-on list page. The example of the private try-on list page shown in FIG. 61 includes a try-on list name 6100, a try-on list 6102, a "stop try-on" button 6104 and a "shift to try-on screen" button 6106. The try-on list name 6100 indicates a name (i.e. user's name) of the private try-on page, which the user presently browses. The try-on list 6102 includes a part, a shop, a commodity and an option, and shows list information indicating what commodity (such as green 9-size shirt, or the like) of what place (i.e. shop) is tried on to which part (such as upper body, or the like) of the user. Each line can be selected by a radio button. In the case where a line is selected and the "stop try-on" button 6104 is pressed, an instruction to stop the try-on of the selected commodity is resultantly selected and inputted by the user. In the case where the "shift to try-on screen" button 6106 is pressed, an instruction to return to the private try-on page is resultantly selected and inputted by the user.

FIG. 62 shows an example of a private try-on list page subsequent to the processing in the case where the foregoing "stop try-on" button 6104 is pressed. Similarly to the example of the private try-on list page shown in FIG. 61, the example of the private try-on list page shown in FIG. 62 includes a try-on list name 6200, a try-on list 6202, a "stop try-on" button 6204, and a "shift to try-on screen" button 6206. This is different from the private try-on list page shown in FIG. 61 in that "none" is indicated at the top line of the try-on list 6202. For example, in the case where the top line of the try-on list 6102 is selected and the "stop try-on" button 6104 is pressed on the private try-on list page shown in FIG. 61, the processing result by the ASP server 5 is reflected in the try-on list as shown in FIG. 62.

Figure 60:
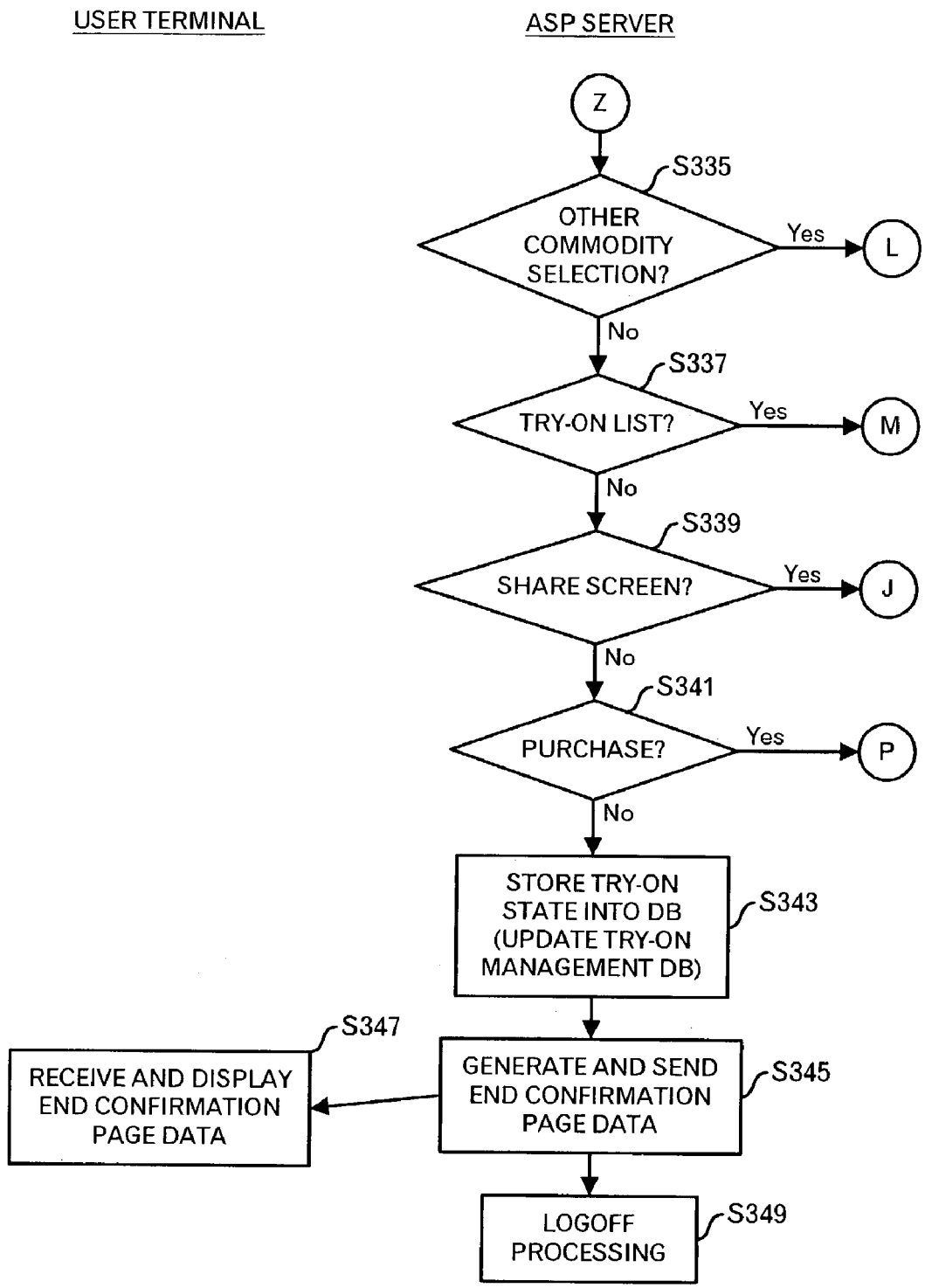
FIG. 60 is a drawing showing a nineteenth of the processing flow in the embodiment of the invention.

In the case where it is judged at the step S337 of FIG. 60 that the instruction is not the display instruction of the try-on list, it is judged whether or not the instruction is screen sharing, that is, whether or not the "share screen" button 5908 is pressed in order to shift to the shared try-on page on the private try-on page (FIG. 59) (step S339). In the case where it is judged that it is the screen sharing, the processing proceeds to the processing (common to processing in sharing try-on) of the step S49 (FIG. 15) through the terminal J.

In the case where it is judged that it is not the screen sharing, it is judged whether or not the instruction is commodity purchase, that is, whether or not the "buy" button 5910 is pressed in order to perform the payment processing on the private try-on page (FIG. 59) (step S341). In the case where it is judged that it is the commodity purchase, the processing proceeds to the processing (common to the processing in the sharing try-on) of FIG. 38 through the terminal P.

In the case where it is judged that it is not the commodity purchase, that is, in the case where an instruction to end is given (in the case where the "end" button 5912 is pressed), the ASP server 5 updates the try-on management DB 51 as a saving processing of a try-on state (step S343). In the case where an end without saving is desired, before the try-on management DB 51 is updated, the user may be requested to confirm whether the saving processing should be executed.

The ASP server 5 generates not-shown end confirmation page data, and transmits it to the user terminal A (3) (step S345). The user terminal A (3) receives the end confirmation page data from the ASP server 5, and displays it on the display device (step S347). The "cancel" button may be set on the end confirmation page, and in the case where the "cancel" button is pressed, the page returns to the private try-on page (FIG. 59). After the end confirmation page data is transmitted, the ASP server 5 performs a logoff processing of the user (step S349).

By doing so, sharing of the virtual try-on scene by plural persons can be realized, and it becomes possible to realize such a situation that plural persons are allowed to mutually see their try-on states of commodities, coordinates by plural persons, such as pair look, are checked, or a person purchases a commodity in a case where the commodity tried on by another person suits the person's taste. That is, also in the on-line shopping, it is possible to realize a situation close to real shopping by plural persons. By performing the sharing setting, on-line shopping in various modes becomes possible, for example, a portion, which is desired not to be seen by other persons, is hidden. At the time of purchasing a tried-on commodity, various price payment modes, such as payment for each commodity or each try-on person, or shared payment, become possible also in the on-line shopping.

Although the one embodiment of the invention has been described, the invention is not limited to this. For example, the system configuration shown in FIG. 1 is one example, and another configuration may be adopted as long as the above processing modes can be realized. For example, the database structure is also an example, and another structure may be adopted as long as similar data is stored, and an item may be added or deleted as the need arises. For example, the part of the body and the sharing setting items are also examples, and there is also a case where addition or modification is made as the need arises. The structure of each page is also an example, and for example, images of users simultaneously displayed on the shared try-on page may be for any number of persons. In the case where the number of persons (the number of images) simultaneously displayed is desired to be limited in view of resolution or size, a display may be carried out over plural pages. Each server may be composed of one server, or plural servers. For example, the ASP server 5 or the shopping site server may be configured by plural servers.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A method for sharing an image of a virtual try-on scene of a specific person, said method comprising:

upon receiving, from a terminal of said specific person, a registration request for enabling a first user to browse said image of said virtual try-on scene of said specific person, registering said first user as being capable of browsing said image of said virtual try-on scene of said specific person;

upon receiving, from said terminal of said specific person, a setting request for enabling virtual try-on of a second user with said specific person, registering said second user as being capable of carrying out said virtual try-on with said specific person;

upon receiving, from a terminal of said second user, setting information for allowing said first user to carry out a virtual try-on operation to an image of said second user, allowing said first user to carry out a virtual try-on operation to said image of said second user;

upon receiving, from a terminal of said first user, an instruction of said virtual try-on operation, which is allowed for said first user, to said image of said second user, updating virtual try-on information concerning said second user according to said instruction of said virtual try-on operation; and upon receiving a browsing request of said image of said virtual try-on scene of said specific person with said second person from said terminal of said first user, generating an image of a virtual try-on scene based on the updated virtual try-on information concerning said second user and virtual try-on information concerning said specific person, and transmitting the generated image of said virtual try-on scene to said terminal of said first user.

2. The method as set forth in claim 1, further comprising:

receiving, from said terminal of said second user, designation of portions of an image of said second user, which are disclosed to said first user;

wherein said generating comprises generating an image of said second user according to said portions of said image of said second user, which are disclosed to said first user.

3. An apparatus for sharing an image of a virtual try-on scene of a specific person, the apparatus comprising:

means for registering, upon receiving, from a terminal of said specific person, a registration request for enabling a first user to browse said image of said virtual try-on scene of said specific person, said first user as being capable of browsing said image of said virtual try-on scene of said specific person;

means for registering, upon receiving, from said terminal of said specific person, a setting request for enabling virtual try-on of a second user with said specific person, said second user as being capable of carrying out said virtual try-on with said specific person;

means for allowing, upon receiving, from a terminal of said second user, setting information for allowing said first user to carry out a virtual try-on operation to an image of said second user, said first user to carry out a virtual try-on operation to said image of said second user;

means for updating, upon receiving, from a terminal of said first user, an instruction of said virtual try-on operation, which is allowed for said first user, to said image of said second user, virtual try-on information concerning said second user according to said instruction of said virtual try-on operation; and means for generating, upon receiving a browsing request of said image of said virtual try-on scene of said specific person with said second person from said terminal of said first user, an image of a virtual try-on scene based on the updated virtual try-on information concerning said second user and virtual try-on information concerning said specific person, and for transmitting the generated image of said virtual try-on scene to said terminal of said first user.

4. A program, embodied on a medium, causing a computer to share an image of a virtual try-on scene of a specific person, said program comprising instructions for:

upon receiving, from a terminal of said specific person, a registration request for enabling a first user to browse said image of said virtual try-on scene of said specific person, registering said first user as being capable of browsing said image of said virtual try-on scene of said specific person;

upon receiving, from said terminal of said specific person, a setting request for enabling virtual try-on of a second user with said specific person, registering said second user as being capable of carrying out said virtual try-on with said specific person;

upon receiving, from a terminal of said second user, setting information for allowing said first user to carry out a virtual try-on operation to an image of said second user, allowing said first user to carry out a virtual try-on operation to said image of said second user;

upon receiving, from a terminal of said first user, an instruction of said virtual try-on operation, which is allowed for said first user, to said image of said second user, updating virtual try-on information concerning said second user according to said instruction of said virtual try-on operation; and upon receiving a browsing request of said image of said virtual try-on scene of said specific person with said second person from said terminal of said first user, generating an image of a virtual try-on scene based on the updated virtual try-on information concerning said second user and virtual try-on information concerning said specific person, and transmitting the generated image of said virtual try-on scene to said terminal of said first user.

5. The program as set forth in claim 4, further comprising instructions for:

receiving, from said terminal of said second user, designation of portions of an image of said second user, which are disclosed to said first user;

wherein said generating comprises generating an image of said second user according to said portions of said image of said second user, which are disclosed to said first user.

* * * * *

UNITED STATES PATENT AND TRADEMARK OFFICE
CERTIFICATE OF CORRECTION

| | | |
|---|---|---|
| PATENT NO. | : 7,133,839 B2 | Page 1 of 1 |
| APPLICATION NO. | : 10/359676 | |
| DATED | : November 7, 2006 | |
| INVENTOR(S) | : Norio Inoue et al. | |

It is certified that error appears in the above-identified patent and that said Letters Patent is hereby corrected as shown below:

Title Page, Item (57) Abstract: delete the entire Abstract and insert --A state close to real shopping by plural persons is realized in on-line shopping. This invention includes if a registration request of a first user enabling browsing of an image of a virtual try-on scene is received, registering information concerning the first user, and if a browsing request of the image of the virtual try-on scene is received from a terminal of the first user registered as being capable of browsing the image of the virtual try-on scene, creating the image of the virtual try-on scene on the basis of at least one of the information concerning the registered first user and information concerning a specific person appearing on the virtual try-on scene and transmitting it to the terminal of the first user.--

Signed and Sealed this

Eighth Day of April, 2008

JON W. DUDAS
*Director of the United States Patent and Trademark Office*